United States Patent
Ueki et al.

(10) Patent No.: US 10,746,363 B2
(45) Date of Patent: Aug. 18, 2020

(54) DAYLIGHTING FILM, DIE FOR FORMING DAYLIGHTING FILM, AND MANUFACTURING METHOD FOR DAYLIGHTING FILM

(71) Applicant: SHARP KABUSHIKI KAISHA, Sakai, Osaka (JP)

(72) Inventors: Tomoko Ueki, Sakai (JP); Tsuyoshi Kamada, Sakai (JP); Shun Ueki, Sakai (JP); Hideomi Yui, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 210 days.

(21) Appl. No.: 15/748,153

(22) PCT Filed: Jul. 27, 2016

(86) PCT No.: PCT/JP2016/072012
§ 371 (c)(1),
(2) Date: Jan. 26, 2018

(87) PCT Pub. No.: WO2017/018447
PCT Pub. Date: Feb. 2, 2017

(65) Prior Publication Data
US 2018/0231202 A1    Aug. 16, 2018

(30) Foreign Application Priority Data

Jul. 28, 2015    (JP) .................................. 2015-148809

(51) Int. Cl.
*F21S 11/00*    (2006.01)
*G02B 5/00*    (2006.01)
(Continued)

(52) U.S. Cl.
CPC ............ *F21S 11/007* (2013.01); *B29C 41/02* (2013.01); *B29C 41/38* (2013.01); *E06B 5/00* (2013.01);
(Continued)

(58) Field of Classification Search
CPC ..................................................... F21S 11/007
See application file for complete search history.

(56) References Cited

U.S. PATENT DOCUMENTS

| 1,922,932 A | * | 8/1933 | Delano | ..................... F21V 5/00 |
| | | | | 359/592 |
| 9,970,613 B2 | * | 5/2018 | Yui | ........................ F21S 11/007 |

(Continued)

FOREIGN PATENT DOCUMENTS

| JP | 2008-040021 A | 2/2008 |
| WO | 97/31276 A1 | 8/1997 |

(Continued)

*Primary Examiner* — Christopher E Mahoney
(74) *Attorney, Agent, or Firm* — ScienBiziP, P.C.

(57) ABSTRACT

Provided is a daylighting film (10) including: a base (11) having light-transmissive performance; a plurality of first protrusion portions (12) that have light-transmissive performance and are provided to be adjacent to each other on one surface (11a) of the base (11); a gap portion (13) provided between the first protrusion portions (12); and at least one second protrusion portion (14) that is provided in at least one gap portion (13) to be adjacent to the first protrusion portions (12) on the one surface (11a) of the base (11) and that is formed of the same material as that of the first protrusion portions (12), in which a height of the second protrusion portion (14) from the one surface (11a) of the base (11) is smaller than a height of each of the first protrusion portions (12) from the one surface (11a) of the base (11).

5 Claims, 48 Drawing Sheets

(51) Int. Cl.
*B29C 41/38* (2006.01)
*E06B 5/00* (2006.01)
*B29C 41/02* (2006.01)
B29K 101/10 (2006.01)
B29K 101/12 (2006.01)
B29L 11/00 (2006.01)

(52) U.S. Cl.
CPC ............... *F21S 11/00* (2013.01); *G02B 5/00* (2013.01); *B29K 2101/10* (2013.01); *B29K 2101/12* (2013.01); *B29K 2995/0031* (2013.01); *B29L 2011/00* (2013.01)

(56) References Cited

U.S. PATENT DOCUMENTS

| | | |
|---|---|---|
| 10,422,497 B2 * | 9/2019 | Hoffend, Jr. ........... F21S 11/007 |
| 2009/0009870 A1 | 1/2009 | Usami |
| 2011/0043919 A1 | 2/2011 | Ko et al. |
| 2016/0223154 A1 | 8/2016 | Nango et al. |
| 2016/0273724 A1 | 9/2016 | Sakuragi et al. |

FOREIGN PATENT DOCUMENTS

| | | |
|---|---|---|
| WO | 2014/196596 A1 | 12/2014 |
| WO | 2015/072420 A1 | 5/2015 |

* cited by examiner

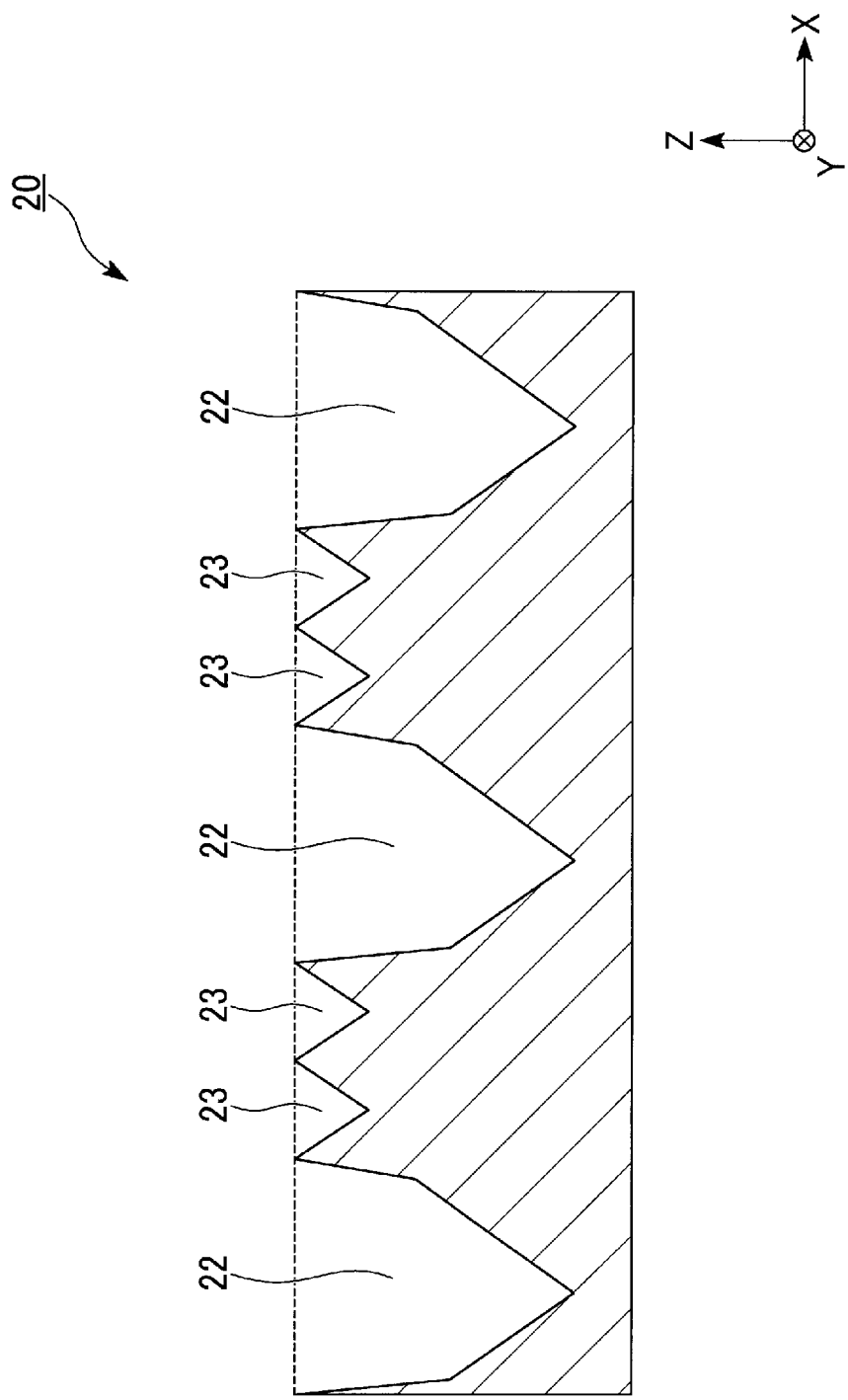

DAYLIGHTING FILM, DIE FOR FORMING DAYLIGHTING FILM, AND MANUFACTURING METHOD FOR DAYLIGHTING FILM

TECHNICAL FIELD

Some aspects of the present invention relate to a daylighting film, a die for forming a daylighting film, and a manufacturing method for a daylighting film.

This application claims priority based on Japanese Patent Application No. 2015-148809 filed in Japan on Jul. 28, 2015, the content of which is incorporated herein.

BACKGROUND ART

As a technique for efficiently guiding light incident on a window glass into a room, a technique described in PTL 1 has been known. According to the technique of PTL 1, a daylighting film obtained by forming a plurality of unit prisms on one surface of a light-transmissive support is attached to an inner surface (indoor side surface) of the window glass with the unit prisms facing the outside. Light incident from the unit prism side is refracted by surfaces of the unit prisms, transmitted through the unit prisms, the support, and the window glass, and enters into the room.

CITATION LIST

Patent Literature

PTL 1: Japanese Unexamined Patent Application Publication No. 2008-40021

SUMMARY OF INVENTION

Technical Problem

In the daylighting film indicated in PTL 1, however, not all the light incident on the window glass is able to be caused to travel toward a ceiling in the room, and there is also light that is refracted by the daylighting film or directly transmitted through the daylighting film and thereby travels toward a direction other than the ceiling direction in the room. Then, the light traveling toward the direction other than the ceiling direction in the room passes through a person at a position of the eyes in the room in some cases. In this case, the person in the room is dazzled.

As illustrated in FIG. 46, as a room 2003, an office is provided as an example and a shape of a cross section (X-Z cross section) of the room 2003 is a rectangular shape. A height H3 (a height from a floor 2003c to a ceiling 2003a) of the room 2003 is 2.7 m, for example. A window 2002 is provided, for example, at a part of 1.8 m from the ceiling 2003a on a wall 2003b side. A height H2 of the window 2002 is 1.8 m, for example. A daylighting film 2001 is provided at a part (a part of 0.6 m from the ceiling 2003a, for example) where a human view field is not blocked on an inner surface of the window 2002. A height H1 of the daylighting film 2001 is 0.6 m, for example.

In a room model 2000, it is assumed that a person moves in a place away from the wall 2003b, for example, by 1 m. In a part D near the window, it is assumed that there is no person. The part D near the window has 1 m, for example. A region where the person moves is assumed on the basis of the part D near the window.

In addition, the position of the eyes of the person is assumed of 0.8 m to 1.8 m from the floor 2003c, for example.

A height Ha of eyes of a person 2005 standing on the floor 2003c is 1.8 m, for example. A height Hb of eyes of a person 2004 sitting on a chair is 0.8 m, for example. A range of the position of the eyes of the person is assumed on the basis of such heights Ha and Hb of the eyes.

The daylighting film 2001 has a function allowing external light to travel toward the ceiling 2003a. The light travelling toward the ceiling 2003a is reflected by the ceiling 2003a and illuminates the inside of the room, so that the light is used instead of illumination. However, actually, the light which has passed through the daylighting film 2001 travels not only toward the ceiling 2003a but also toward the wall 2003d or the floor 2003c. At this time, the light which has passed through the daylighting film 2001 also includes light directed to the position of the eyes of the person in the room. Such light causes the person in the room to be dazzled. In the room model 2000, a region where the person in the room is dazzled is set to a glare region AR. A range of the glare region AR is defined on the basis of the region where the person moves and the position of the eyes of the person.

The glare region AR is a region of 0.8 m to 1.8 m from the floor 2003c, for example, in a place which is away from the wall 2003b by 1 m, for example.

Next, definitions of a light incoming angle of light incident on the daylighting film 2001 and a light outgoing angle of light output from the daylighting film 2001 will be described with reference to FIG. 47.

FIG. 47 is an explanatory view of a light incoming angle and a light outgoing angle. For convenience, a base of the daylighting film 2001 is omitted in FIG. 47. In FIG. 47, an angle formed by a horizontal direction (X-direction) and light incident on the daylighting film 2001 is defined as a light incoming angle θin and an angle formed by the horizontal direction and light output from the daylighting film 2001 is defined as a light outgoing angle θout. In the light outgoing angle θout, a normal direction passing through a center (a center of an interface between a protrusion portion and a base) of the daylighting film 2001 is defined as 0° and the ceiling 2003a side of the horizontal direction is defined as a positive (+) angle, and the floor 2003c side of the horizontal direction is defined as a negative (−) angle. That is, in the light outgoing angle θout, a counterclockwise angle is defined as a positive angle and a clockwise angle is defined as a negative angle.

In order to solve the aforementioned problems, as illustrated in FIG. 48, for example, proposed is a daylighting film 3000 that includes a base 3010 having light-transmissive performance, a plurality of first protrusion portions 3011 which have light-transmissive performance and are formed to be adjacent to each other on one surface 3010a of the base 3010, and gap portions 3012 formed between the first protrusion portions 3011, and that includes second protrusion portions 3013 each of which is provided in each of regions between the first protrusion portions 3011 on the one surface 3010a of the base 3010, and a protection member 3014 that has light-transmissive performance and is provided on a side of the plurality of first protrusion portions 3011 opposite to the side on which the base 3010 is provided, in which each of the second protrusion portions 3013 has an inclined surface inclined with respect to the one surface 3010a of the base 3010, and a height of the second protrusion portion 3013 is smaller than a height of each of the first protrusion portions 3011.

The second protrusion portion 3013 substantially has one direction (Y-direction) as a longitudinal direction and the one direction is disposed in a direction substantially parallel to one side of the base 3010 that has a rectangular shape. In the daylighting film 3000, the second protrusion portion 3013 is formed as a protrusion portion which is extended in the Y-direction and has a stripe shape.

A shape of a cross section (X-Z cross section) of the second protrusion portion 3013 is a triangle. The second protrusion portion 3013 has an inclined surface 3013b that is inclined with respect to the one surface 3010a of the base 3010.

When a width of the second protrusion portion 3013 in a transverse direction (Z-direction) is w2 and a height of the second protrusion portion 3013 in the normal direction (X-direction) of the base 3010 is h2, the width w2 of the second protrusion portion 3013 is smaller than an interval s between the plurality of first protrusion portions 3011 and the height h2 of the second protrusion portion 3013 is smaller than a height h1 of the first protrusion portion 3011. On the one surface 3010a of the base 3010, a discontinuous region (a non-formation region where the second protrusion portion 3013 or the first protrusion portion 3011 is not formed) 3010c where the second protrusion portion 3013 and the first protrusion portion 3011 are not continuous exists between the second protrusion portion 3013 and the first protrusion portion 3011.

When an angle formed by an end surface 3013c of the second protrusion portion 3013 on the base 3010 side and a side surface 3013a of the second protrusion portion 3013 is an angle γ1 and an angle formed by the end surface 3013c of the second protrusion portion 3013 on the base 3010 side and a side surface 3013b (inclined surface) of the second protrusion portion 3013 is an angle γ2, the angle γ1 of the second protrusion portion 3013 is larger than the angle γ2 of the second protrusion portion 3013. For example, the angle γ1 is, for example, 70° to 100° and the angle γ2 is, for example, 10° to 30°

For the second protrusion portion 3013, a material similar to that of the first protrusion portion 3011 is able to be used, for example. A refractive index of the second protrusion portion 3013 is equivalent to or larger than a refractive index of the first protrusion portion 3011 or the base 3010. For example, the refractive index of the second protrusion portion 3013 is about 1.5.

As illustrated in FIG. 48, when a light ray passing the non-formation region 3010c of the first protrusion portion 3011 on the one surface 3010a of the base 3010 is La, the light La is incident on the daylighting film 3000 at an angle of θin, refracted by the non-formation region 3010c, and output from the other surface 3010b of the base 3010 to a downward direction, i.e. in a range where θout is negative. In this case, absolute values of the light incoming angle θin and the light outgoing angle θout are equal to each other. That is, the light La may be a light ray in an angle range where glare is provided, and may be a factor causing the person in the room to be dazzled.

On the one surface 3010a of the base 3010, the second protrusion portion 3013 is provided between the first protrusion portions 3011. A light Lb is incident on the daylighting film 3000 at an angle of θin, refracted by the side surface 3013b of the second protrusion portion 3013, and thereby changes a traveling direction from a downward direction to an upward direction, and is output from the other surface 3010b of the base 3010 to the upward direction, i.e. in a range where θout is positive. The ceiling is illuminated and a daylighting effect is obtained. In addition, a light Lc is incident on the daylighting film 3000 at an angle of θin, refracted by the side surface 3013a of the second protrusion portion 3013, and thereby changes a traveling direction further to the downward direction, and is output from the other surface 3010b of the base 3010 to the downward direction, i.e. in a range where θout is negative. At this time, the light outgoing angle θout has an absolute value larger than that of the light incoming angle θin and the light Lc reaches the floor at a position closer to a window surface than the angle range where glare is provided. Thus, the person in the room is not dazzled.

As a method for forming a protrusion portion of a daylighting film, a molding method (die molding method) using a die has been conventionally used.

Conventionally, protrusion portions are formed by using a die formed as illustrated in FIGS. 49A to 49C, for example.

First, as illustrated in FIG. 49A, a metal member 5010 having a rectangular parallelepiped shape is cut by using a bite 4010 or the like and a concave portion 5020 corresponding to a protrusion portion is formed.

When protrusion portions are disposed densely, the daylighting film has an enhanced daylighting effect. Thus, as illustrated in FIG. 49B, a plurality of concave portions 5020 are densely formed also on the metal member 5010 and a die 5000 is obtained.

As illustrated in FIG. 49C, for example, by using such a die 5000, resin 6010 formed of photosetting resin or thermosetting resin is applied onto one surface 5010a of the metal member 5010 of the die 5000, the resin 6010 is filled in the plurality of concave portions 5020, the resin 6010 is cured, and then, the cured resin 6010 is separated from the die 5000, so that a daylighting film 6000 having a plurality of protrusion portions 6020 formed is obtained.

When the plurality of concave portions 5020 are densely formed as in the die 5000, a part 5030 of the metal member 5010, which serves as a boundary between a concave portion 5020 and a concave portion 5020 that are adjacent to each other, becomes very thin. Thus, the part 5030 is easily deformed by small force. Thus, when the cured resin 6010 is separated from the die 5000, the part 5030 is deformed by stress caused by the separating force, so that the separated resin 6010, in particular, the protrusion portions 6020 are deformed. When the protrusion portions 6020 are not formed in a predetermined shape due to the deformation, it is difficult to control the shape of the protrusion portions 6020, so that not only a daylighting effect by the protrusion portions 6020 is not obtained but also a light ray passing through a glare region may increase. Thus, a daylighting film in which some degree of an interval between the protrusion portions 6020 is kept and a second protrusion that allows refraction in a direction in which an angle of an outgoing light ray does not fall in a glare range is disposed at a position of a gap is preferable from a viewpoint of both the daylighting effect and the glare.

When the second protrusion portion is provided, there are problems of not only complication of a manufacturing process but also increase in material costs or manufacturing costs. There is also a problem that, depending on a shape of the second protrusion portion, it is not effective for characteristics of the daylighting film.

Some aspects of the invention are made in order to solve the aforementioned problems and an object thereof is to provide a daylighting film that is able to prevent a person in a room from being dazzled, a die for forming a daylighting film used for forming the daylighting film, and a manufacturing method for a daylighting film using the die for forming a daylighting film.

Solution to Problem

A daylighting film according to an aspect of the invention includes: a base having light-transmissive performance; a plurality of first protrusion portions that have light-transmissive performance and are provided to be adjacent to each other on one surface of the base; a gap portion provided between the first protrusion portions; and at least one second protrusion portion that is provided in at least one gap portion to be adjacent to the first protrusion portions on the one surface of the base and that is formed of the same material as that of the first protrusion portions, in which a height of the second protrusion portion from the one surface of the base is smaller than a height of each of the first protrusion portions from the one surface of the base.

In the daylighting film according to an aspect of the invention, it is preferable that each of the first protrusion portion and the second protrusion portion has at least a pair of inclined surfaces that are inclined in mutually different directions with respect to the one surface of the base and face each other, and one of the pair of inclined surfaces of the first protrusion portion and one of the pair of inclined surfaces of the second protrusion portion are equal in inclination with respect to the one surface of the base, or the other of the pair of inclined surfaces of the first protrusion portion and the other of the pair of inclined surfaces of the second protrusion portion are equal in inclination with respect to the one surface of the base.

In the daylighting film according to an aspect of the invention, it is preferable that the first protrusion portion and the second protrusion portion are similar in a shape of at least a part corresponding to the pair of inclined surfaces.

A die for forming a daylighting film according to an aspect of the invention includes: a main body portion made of metal; a plurality of first concave portions provided to be adjacent to each other on a side of one surface of the main body portion, and at least one second concave portion provided in at least a part between the first concave portions to be adjacent to the first concave portions, in which a depth of the second concave portion from the one surface of the main body portion is smaller than a depth of each of the first concave portions from the one surface of the main body portion.

In the die for forming a daylighting film according to an aspect of the invention, it is preferable that each of the first concave portion and the second concave portion has at least a pair of inner side surfaces that are inclined in mutually different directions with respect to the one surface of the main body portion and face each other, and one of the pair of inner side surfaces of the first concave portion and one of the pair of inner side surfaces of the second concave portion are equal in inclination with respect to the one surface of the main body portion, or the other of the pair of inner side surfaces of the first concave portion and the other of the pair of inner side surfaces of the second concave portion are equal in inclination with respect to the one surface of the main body portion.

In the die for forming a daylighting film according to an aspect of the invention, it is preferable that the first concave portion and the second concave portion are similar in a shape of at least a part corresponding to the pair of inner side surfaces.

A manufacturing method for a daylighting film according to an aspect of the invention is a manufacturing method for a daylighting film using the die for forming a daylighting film according to the aspect of the invention, and the method includes the steps of: applying resin having light-transmissive performance onto the one surface of the main body portion and filling the resin in the first concave portion and the second concave portion; curing the resin and forming a daylighting film that is formed of the resin and has a first protrusion portion and a second protrusion portion; and separating the daylighting film from the die for forming a daylighting film.

Advantageous Effects of Invention

According to some aspects of the invention, it is possible to provide a daylighting film that is able to prevent a person in a room from being dazzled, a die for forming a daylighting film used for forming the daylighting film, and a manufacturing method for a daylighting film using the die for forming a daylighting film.

BRIEF DESCRIPTION OF DRAWINGS

FIG. 12 is a sectional view illustrating another example of a schematic configuration of the die for forming a daylighting film that is the second embodiment of the invention.

DESCRIPTION OF EMBODIMENTS

Embodiments of a daylighting film, a die for forming a daylighting film, a manufacturing method for a daylighting film according to some aspects of the invention will be described.

Note that, the embodiments will be described specifically for better understanding of the spirit of the invention, and do not limit the invention unless particularly stated.

Further, for convenience, the drawings used in the following description illustrate parts that constitute a main portion in an enlarged manner to allow better understanding of features of the invention in some cases, and dimensional ratios and the like of the components cannot be said to be the same as actual ones.

First Embodiment (Daylighting Film)

Figure 1:
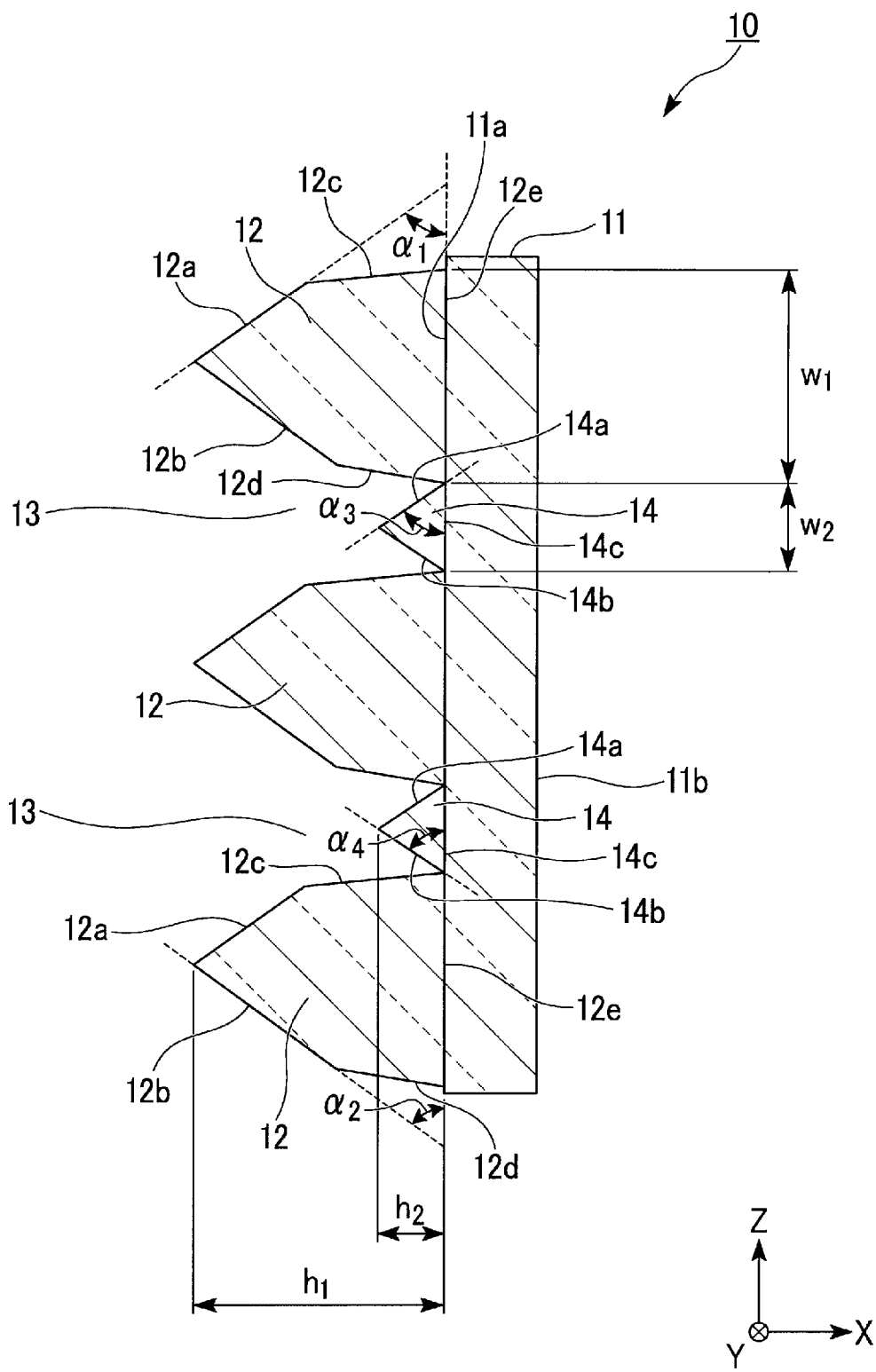
FIG. 1 is a sectional view illustrating a schematic configuration of a daylighting film that is a first embodiment of the invention.
Figure 2:
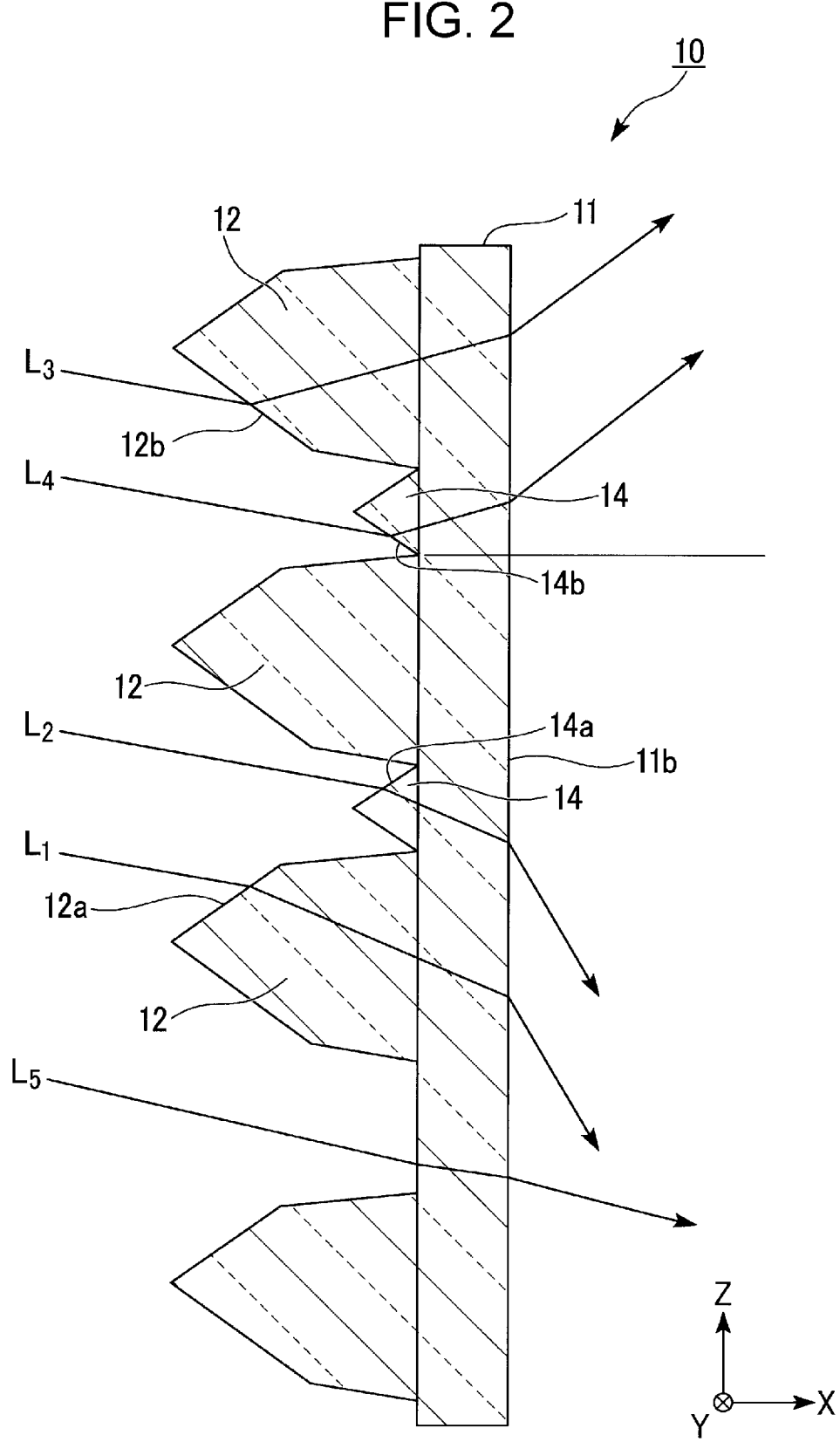
FIG. 2 is a schematic sectional view illustrating a traveling direction of a light ray in the daylighting film that is the first embodiment of the invention.

FIG. 1 is a sectional view illustrating a schematic configuration of a daylighting film that is a first embodiment of the invention. FIG. 2 is a schematic sectional view illustrating a traveling direction of a light ray in the daylighting film that is the first embodiment of the invention.

In FIG. 1, it is assumed that an X-direction is a normal direction of a base of the daylighting film, a Y-direction is a direction orthogonal to the X-direction, and a Z-direction is a direction orthogonal to the X-direction and the Y-direction.

As illustrated in FIG. 1, the daylighting film 10 of the present embodiment includes a base 11 having light-transmissive performance, a plurality of first protrusion portions 12 that have light-transmissive performance and are provided to be adjacent to each other on one surface 11a of the base 11, gap portions 13 provided between the first protrusion portions 12, and a plurality of second protrusion portions 14 each of which is provided in each of the gap portions 13 so as to be adjacent to the first protrusion portions 12 on the one surface 11a of the base 11 and is formed of the same material as that of the first protrusion portions 12.

In the daylighting film 10, a height (a height of the second protrusion portion 14 in the normal direction (X-direction) of the bae 11) $h_2$ of the second protrusion portion 14 from the one surface 11a of the base 11 is smaller than a height (a height of the first protrusion portion 12 in the normal direction (X-direction) of the base 11) $h_1$ of the first protrusion portion 12 from the one surface 11a of the base 11.

In the daylighting film 10, an edge of the first protrusion portion 12 and an edge of the second protrusion portion 14 that are adjacent to each other are in contact.

The first protrusion portion 12 has a pair of inclined surfaces (side surfaces) 12a and 12b and a pair of inclined surfaces (side surfaces) 12c and 12d, in which the inclined surfaces of each pair are inclined in mutually different directions with respect to the one surface 11a of the base 11 and face each other.

The second protrusion portion 14 has a pair of inclined surfaces (side surfaces) 14a and 14b which are inclined in mutually different directions with respect to the one surface 11a of the base 11 and face each other.

The inclined surface 12a of the first protrusion portion 12 and the inclined surface 14a of the second protrusion portion 14 are preferably equal in inclination with respect to the one surface 11a of the base 11.

The inclined surface 12b of the first protrusion portion 12 and the inclined surface 14b of the second protrusion portion 14 are preferably equal in inclination with respect to the one surface 11a of the base 11.

As the base 11, generally, a base made of resins such as a thermoplastic polymer, thermosetting resin, and photopolymerizable resin is used. As the base 11, a light-transmissive base formed of an acrylic polymer, an olefinic polymer, a vinyl-based polymer, a cellulosic polymer, an amide-based polymer, a fluorinated polymer, a urethane-based polymer, a silicone-based polymer, an imide-based polymer, or the like is used, for example. Specifically, as the base 11, a light-transmissive base such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) film is used.

The light-transmissive performance of the base 11 in the present embodiment means that a total light transmittance defined by JIS K7361-1 is 90% or more. When the base 11 has the total light transmittance of 90% or more, the base 11 obtains sufficient transparency.

Each of the first protrusion portion 12 and the second protrusion portion 14 is made of an organic material that includes resin, for example, such as acryl resin, epoxy resin, or silicone resin and has light-transmissive performance and photosensitivity. As the organic material, a mixture obtained by mixing the resin described above with a polymerization initiator, a coupling agent, a monomer, an organic solvent, or the like may be used. Moreover, the polymerization initiator may contain various additional components, such as a stabilizer, an inhibitor, a plasticizer, a fluorescent brightener, a mold release agent, a chain transfer agent, or other photopolymerizable monomer. In addition, as the organic material, a light-transmissive organic material described in Japanese Patent No. 4129991 is used.

Each of the first protrusion portion 12 and the second protrusion portion 14 preferably has the total light transmittance of 90% or more under the provisions of JIS K7361-1. When each of the first protrusion portion 12 and the second protrusion portion 14 has the total light transmittance of 90% or more, the first protrusion portion 12 and the second protrusion portion 14 are able to obtain sufficient transparency.

Each of the plurality of first protrusion portions 12 substantially has one direction (Y-direction) as a longitudinal direction and the one direction is disposed in a direction parallel to one side of the base 11 that has a rectangular shape. In the case of the present embodiment, each of the plurality of first protrusion portions 12 is constituted as a protrusion portion which is extended in the Y-direction and has a stripe shape with a constant width. The longitudinal direction of each of the plurality of first protrusion portions 12 is disposed in a direction parallel to one side of the base 11 that has the rectangular shape. In each of the plurality of first protrusion portions 12, a shape of a cross section (X-Z cross section) parallel to a width direction of the first protrusion portion 12 is a trapezoid, triangle, or polygon with at least five vertexes. FIG. 1 illustrates a case where the shape of the cross section parallel to the width direction of the first protrusion portion 12 is a pentagon.

Each of the plurality of second protrusion portions 14 substantially has one direction (Y-direction) as a longitudinal direction and the one direction is disposed in a direction parallel to one side of the base 11 that has a rectangular shape. In the case of the present embodiment, each of the plurality of second protrusion portions 14 is constituted as a protrusion portion which is extended in the Y-direction and has a stripe shape with a constant width. The longitudinal direction of each of the plurality of second protrusion portions 14 is disposed in a direction parallel to one side of the base 11 that has the rectangular shape. In each of the plurality of second protrusion portions 14, a shape of a cross section (X-Z cross section) parallel to a width direction of the second protrusion portion 14 is a trapezoid, triangle, or polygon with at least five vertexes. FIG. 1 illustrates a case where the shape of the cross section parallel to the width direction of the second protrusion portion 14 is a triangle.

When a width of the first protrusion portion 12 in a transverse direction is $w_1$, the widths $w_1$ of the plurality of first protrusion portions 12 in the transverse direction are almost equal. The width $w_1$ of the first protrusion portion 12 in the transverse direction is, for example, 10 μm to 50 μm.

Heights (heights of the first protrusion portions 12 in the normal direction (X-direction) of the base 11) $h_1$ of the plurality of first protrusion portions 12 from the one surface 11a of the base 11 are almost equal. The height $h_1$ of the first protrusion portion 12 is, for example, 10 μm to 100 μm.

When an angle formed by the inclined surface (side surface) 12a of the first protrusion portion 12 and the one surface 11a of the base 11 is an angle $\alpha_1$, the angles $\alpha_1$ of the plurality of first protrusion portions 12 are all equal.

When an angle formed by the inclined surface (side surface) 12b of the first protrusion portion 12 and the one surface 11a of the base 11 is an angle $\alpha_2$, the angles $\alpha_2$ of the plurality of first protrusion portions 12 are all equal. The angle $\alpha_1$ of the first protrusion portion 12 is, for example, 60° to 80°. The angle $\alpha_2$ of the first protrusion portion 12 is, for example, 35° to 60°.

When a width of the second protrusion portion 14 in the transverse direction is $w_2$, the widths $w_2$ of the plurality of second protrusion portions 14 in the transverse direction may not be equal. The first protrusion portions 12 are formed at nonuniform intervals and the widths $w_2$ of the plurality of second protrusion portions 14 in the transverse direction may be different from each other accordingly.

The width $w_2$ of the second protrusion portion 14 in the transverse direction is smaller than the width $w_1$ of the first protrusion portion 12 in the transverse direction ($w_2<w_1$).

When an angle formed by the inclined surface (side surface) 14a of the second protrusion portion 14 and the one surface 11a of the base 11 is an angle $\alpha_3$, the angles $\alpha_3$ of the plurality of second protrusion portions 14 are almost equal.

When an angle formed by the inclined surface (side surface) 14b of the second protrusion portion 14 and the one surface 11a of the base 11 is an angle $\alpha_4$, the angles $\alpha_4$ of the plurality of second protrusion portions 14 are almost equal.

The angle $\alpha_3$ of the second protrusion portion 14 is almost equal to the angle $\alpha_1$ of the first protrusion portion 12. The angle $\alpha_4$ of the second protrusion portion 14 is almost equal to the angle $\alpha_2$ of the first protrusion portion 12.

Each of the gap portions 13 is filled with gas such as the air and a refractive index thereof is about 1. When the refractive index of the gap portion 13 is 1, the gap portion 13 is configured such that a critical angle in an interface (the inclined surface (side surface) 12a, 12b, 12c, or 12d of the first protrusion portion 12, the inclined surface (side surface) 14a or 14b of the second protrusion portion 14) between the gap portion 13 and each of the first protrusion portion 12 and the second protrusion portion 14 becomes minimum. In the case of the present embodiment, the gap portion 13 serves as an air layer which is formed from the air, but the gap portion 13 may serve as an inert gas layer which is formed from an inert gas such as nitrogen or may serve as a decompressive layer which is in a decompressive state.

The daylighting film 10 is attached to a glass base of a window glass such that an arrangement direction of the first protrusion portions 12 and the second protrusion portions 14 becomes a vertical direction.

As illustrated in FIG. 2, for example, a light $L_1$ which is incident into the first protrusion portion 12 from the inclined surface 12a of the first protrusion portion 12 among light coming from an upper part of the daylighting film 10 is refracted by the other surface 11b of the base 11, and output toward a lower part of the daylighting film 10. As a result, a light ray output from the base 11 does not become glare (the outgoing angle passes below a glare range). In comparison, a light ray $L_5$ which passes through a position of the gap portion 13 where the second protrusion portion 14 does not exist is output from the other surface 11b and then becomes glare. A light $L_2$ which is incident into the second protrusion portion 14 from the inclined surface 14a of the second protrusion portion 14 among light coining from the upper part of the daylighting film 10 is refracted by the other surface 11b of the base 11, and output toward the lower part of the daylighting film 10. As a result, the light ray output from the base 11 does not become glare (the outgoing angle passes below the glare range). In comparison, the light ray $L_5$ which passes through a position of the gap portion 13 where the second protrusion portion 14 does not exist is output from the other surface 11b and then becomes glare.

On the other hand, a light $L_3$ which is incident into the first protrusion portion 12 from the inclined surface 12h of the first protrusion portion 12 among light coining from the upper part of the daylighting film 10 is refracted by the other surface 11b of the base 11, and output toward the upper part of the daylighting film 10. A light $L_4$ which is incident into the second protrusion portion 14 from the inclined surface 14b of the second protrusion portion 14 among light coming from the upper part of the daylighting film 10 is refracted by the other surface 11b of the base 11, and output toward the upper part of the daylighting film 10.

The light that is output toward the upper part of the daylighting film 10 as described above is introduced to the ceiling in the room or the deep inside of the room and illuminates the inside of the room brightly.

In the present embodiment, the inclined surfaces 12a, 12b, 12c, and 12d of the first protrusion portion 12 on the opposite side to the base 11 are constituted as light incoming end surfaces and an end surface 12e of the first protrusion portion 12 on the base 11 side is constituted as a light outgoing end surface. The inclined surfaces 14a and 14b of the second protrusion portion 14 on the opposite side to the base 11 are constituted as light incoming end surfaces and an end surface 14c of the second protrusion portion 14 on the base 11 side is constituted as a light outgoing end surface.

The daylighting film 10 of the present embodiment includes the base 11 having light-transmissive performance, the plurality of first protrusion portions 12 that have light-transmissive performance and are provided to be adjacent to each other on the one surface 11a of the base 11, and the plurality of second protrusion portions 14 each of which is provided to be adjacent to the first protrusion portions 12 on the one surface 11a of the base 11 and is formed of the same material as that of the first protrusion portions 12, in which the angle $\alpha_3$ of each of the second protrusion portions 14 is almost equal to the angle $\alpha_1$ of each of the first protrusion portions 12 and the angle $\alpha_4$ of each of the second protrusion portions 14 is almost equal to the angle $\alpha_2$ of each of the first protrusion portions 12, so that the lights $L_2$ and $L_4$ incident into the second protrusion portion 14 are able to be output toward the upper part of the daylighting film 10 similarly to the lights $L_1$ and $L_3$ incident into the first protrusion portion 12, thus making it possible to allow external light to travel toward the ceiling in the room and prevent the person in the room from being dazzled.

Figure 3:
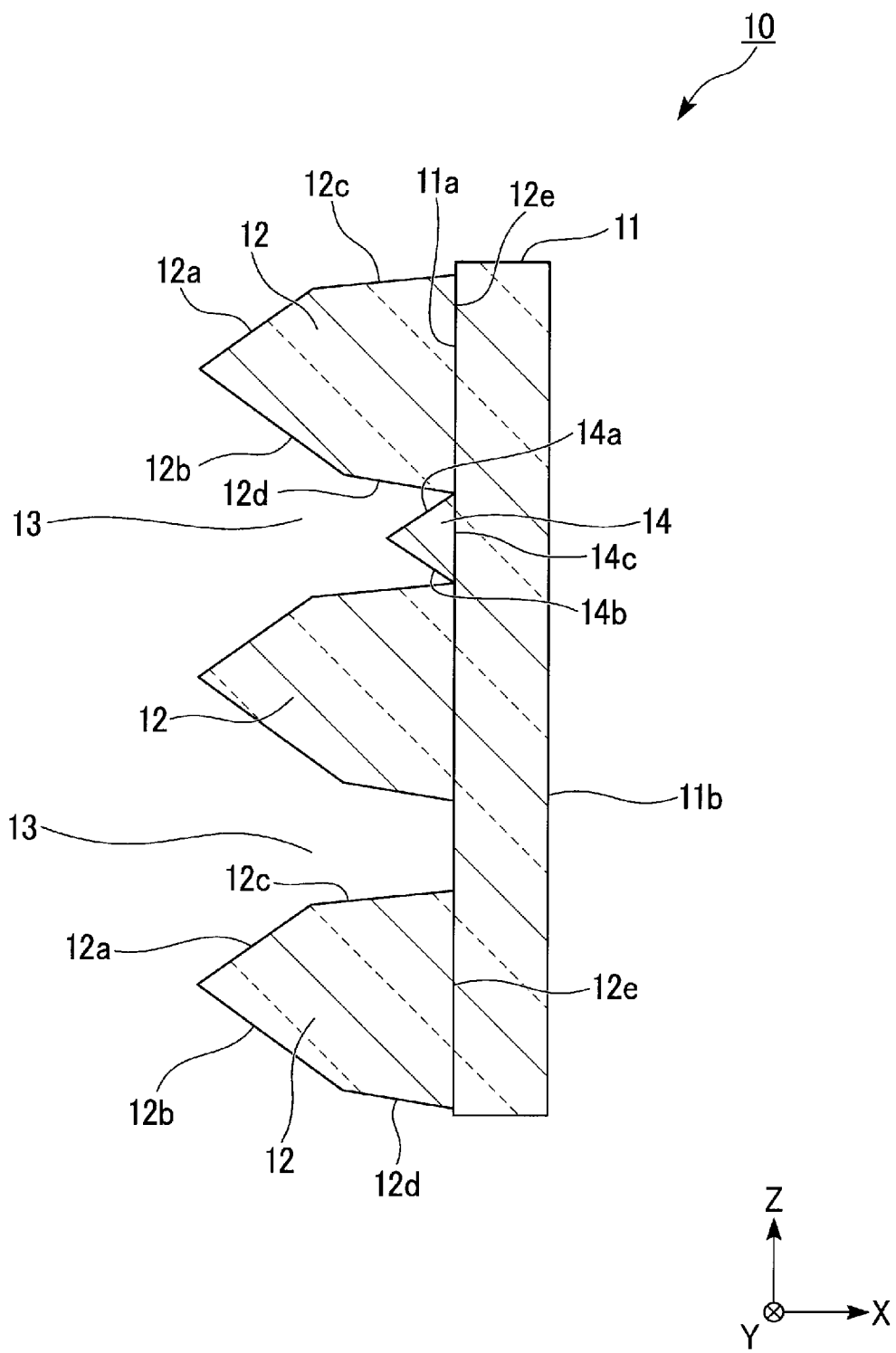
FIG. 3 is a sectional view illustrating another example of a schematic configuration of the daylighting film that is the first embodiment of the invention.
Figure 4:
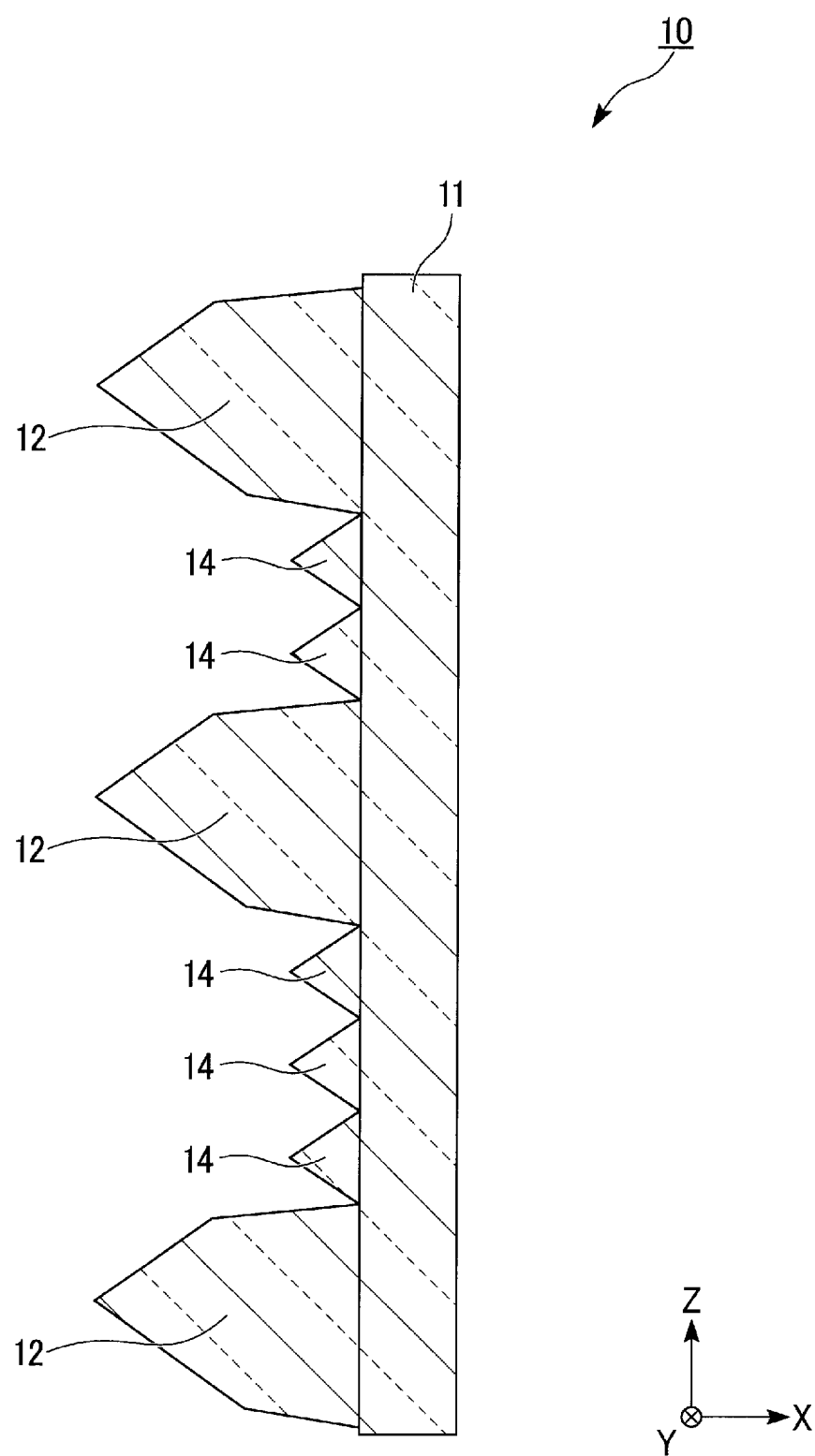
FIG. 4 is a sectional view illustrating another example of a schematic configuration of the daylighting film that is the first embodiment of the invention.

Note that, though a case where one second protrusion portion 14 is provided in each of all the gap portions 13 formed between the plurality of first protrusion portions 12 is exemplified in the present embodiment, the present embodiment is not limited thereto. In the present embodiment, as illustrated in FIG. 3, it is only required that the second protrusion portion 14 is provided in at least one of the gap portions 13 formed between the plurality of first protrusion portions 12. In addition, two or more second protrusion portions 14 may be provided in the gap portion 13 as illustrated in FIG. 4.

Figure 5A:
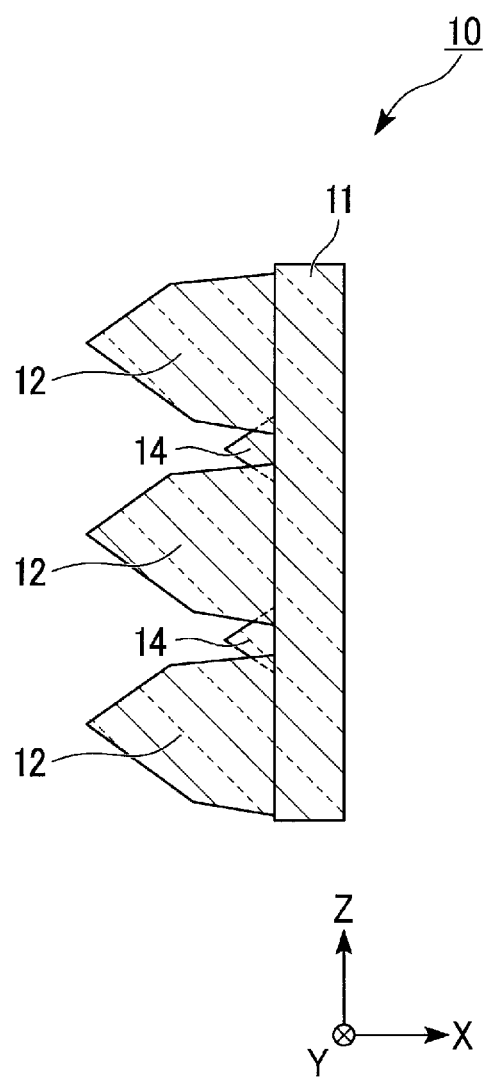
FIG. 5A is a first sectional view illustrating another example of a schematic configuration of the daylighting film that is the first embodiment of the invention.
Figure 5B:
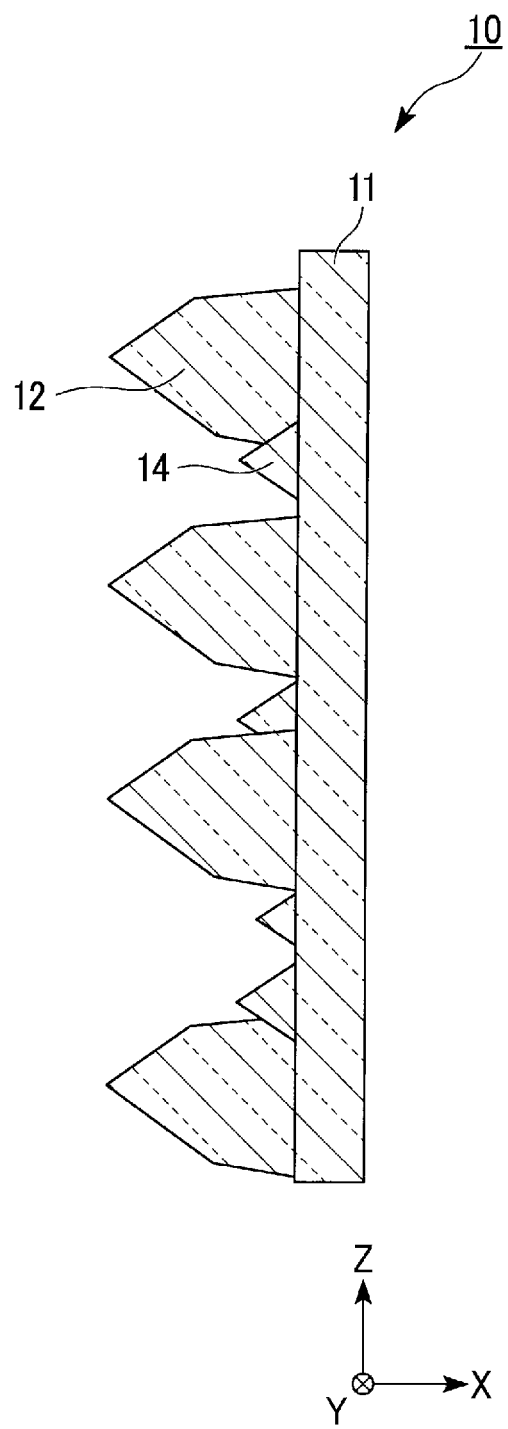
FIG. 5B is a second sectional view illustrating another example of a schematic configuration of the daylighting film that is the first embodiment of the invention.
Figure 6:
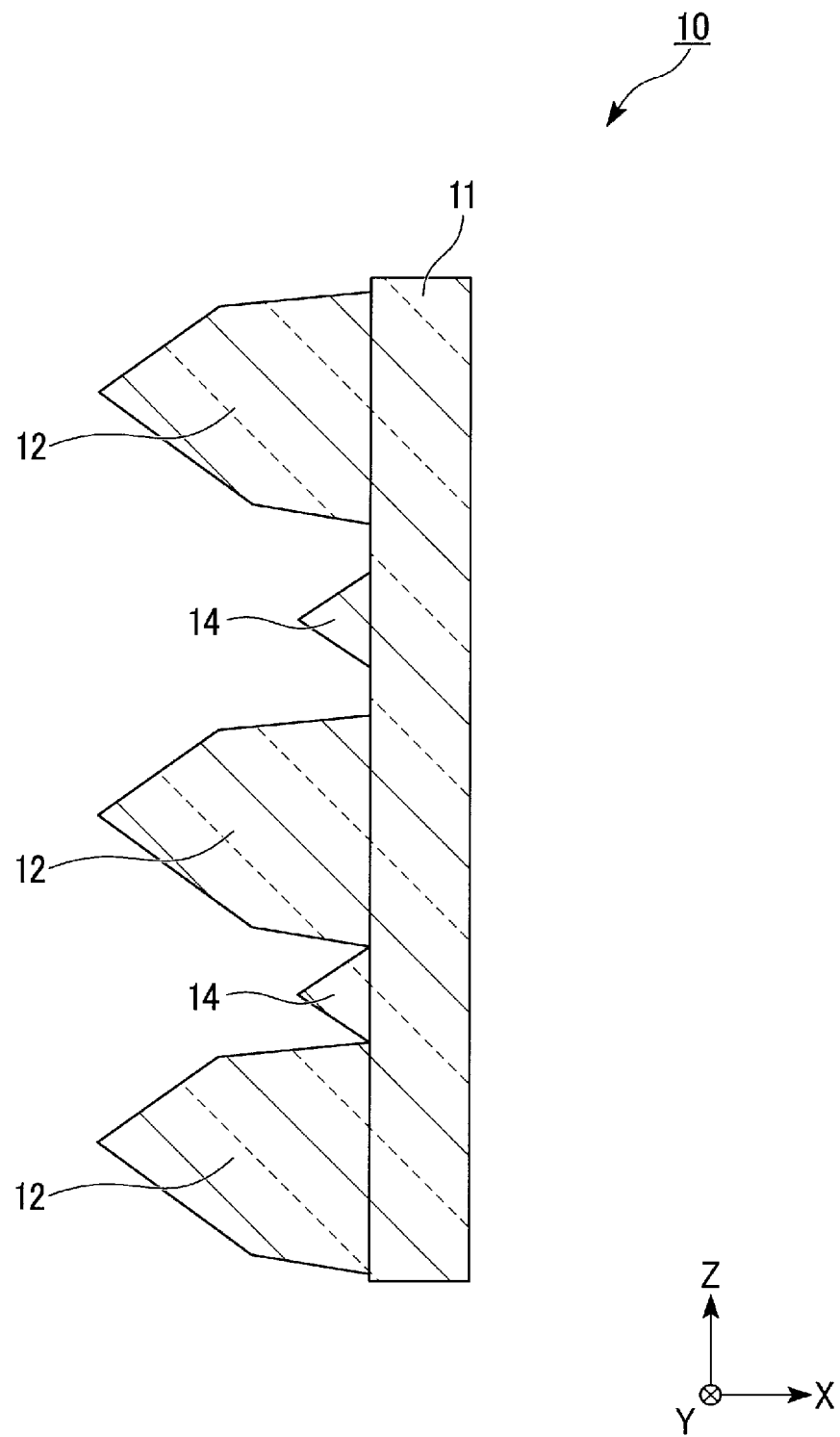
FIG. 6 is a sectional view illustrating another example of a schematic configuration of the daylighting film that is the first embodiment of the invention.

Though a case where an edge of the first protrusion portion 12 and an edge of the second protrusion portion 14 that are adjacent to each other are in contact is exemplified in the present embodiment, the present embodiment is not limited thereto. In the present embodiment, the edge of the first protrusion portion 12 and the edge of the second protrusion portion 14 that are adjacent to each other may be connected in such a manner that an end surface of the first protrusion portion 12 on the base 11 side and an end surface of the second protrusion portion 14 on the base 11 side that are adjacent to each other partially overlap each other as illustrated in FIG. 5A. In addition, an overlapping degree of the first protrusion portion 12 and the second protrusion portion 14 may vary individually as illustrated in FIG. 5B.

In all the first protrusion portions 12 and second protrusion portions 14 which are adjacent to each other, a part of the first protrusion portions 12 and second protrusion portions 14 which are adjacent to each other may not be in contact. For example, in a part of the first protrusion portions 12 and second protrusion portions 14 among the plurality of first protrusion portions 12 and second protrusion portions 14, a set of the first protrusion portion 12 and the second protrusion portion 14 which are adjacent to each other may be partially in contact. That is, the plurality of first protrusion portions 12 and second protrusion portions 14 include a configuration in which a set of the first protrusion portion 12 and the second protrusion portion 14 which are adjacent to each other is partially in contact, and a part of the other first protrusion portions 12 and second protrusion portions 14 which are adjacent to each other may not be in contact.

Figure 7:
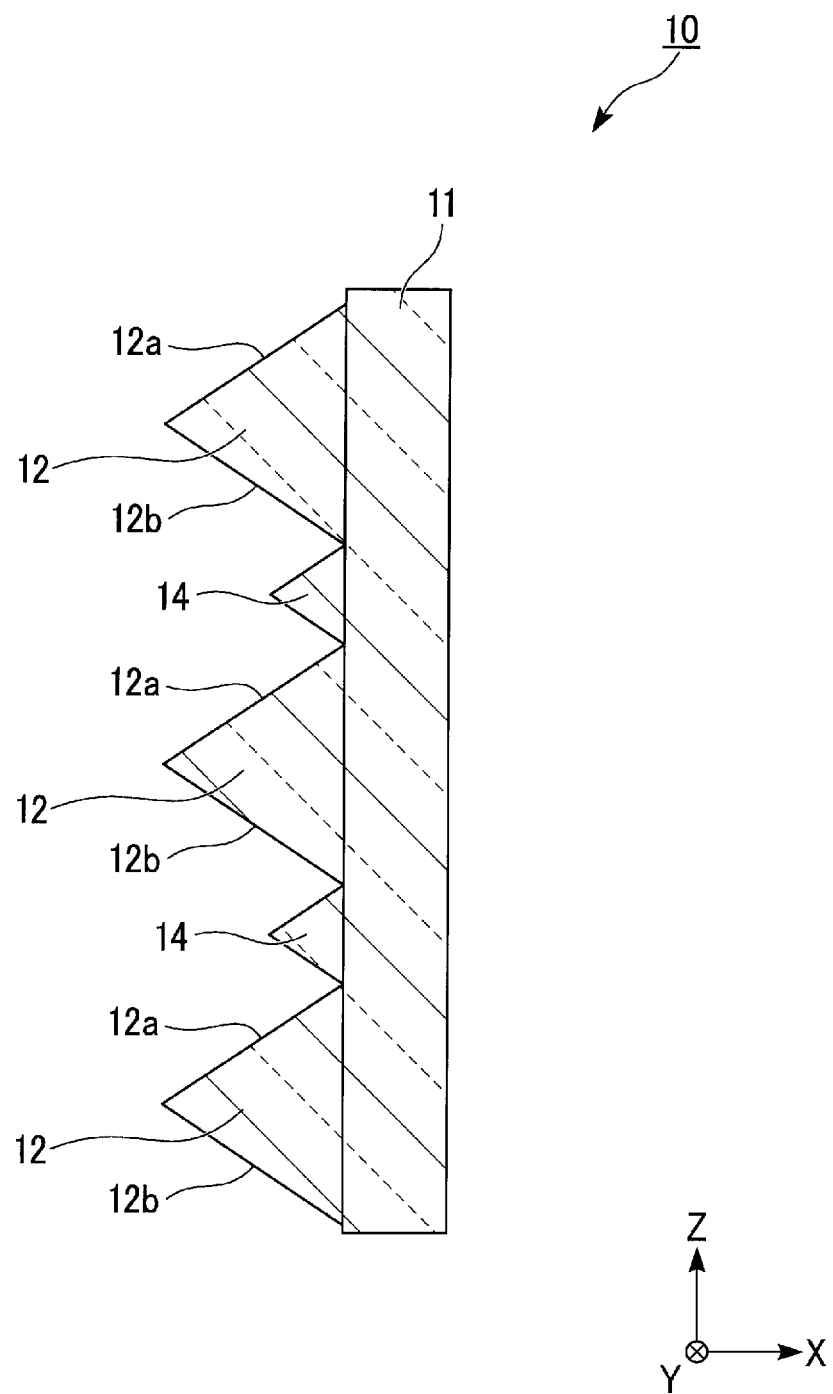
FIG. 7 is a sectional view illustrating another example of a schematic configuration of the daylighting film that is the first embodiment of the invention.

Though a case where each of the first protrusion portions 12 has a pair of facing inclined surfaces (side surfaces) 12a and 12b and a pair of facing inclined surfaces (side surfaces) 12c and 12d is exemplified in the present embodiment, the present embodiment is not limited thereto. In the present embodiment, it is only required that the first protrusion portion 12 has at least a pair of facing inclined surfaces 12a and 12b as illustrated in FIG. 7.

Figure 8A:
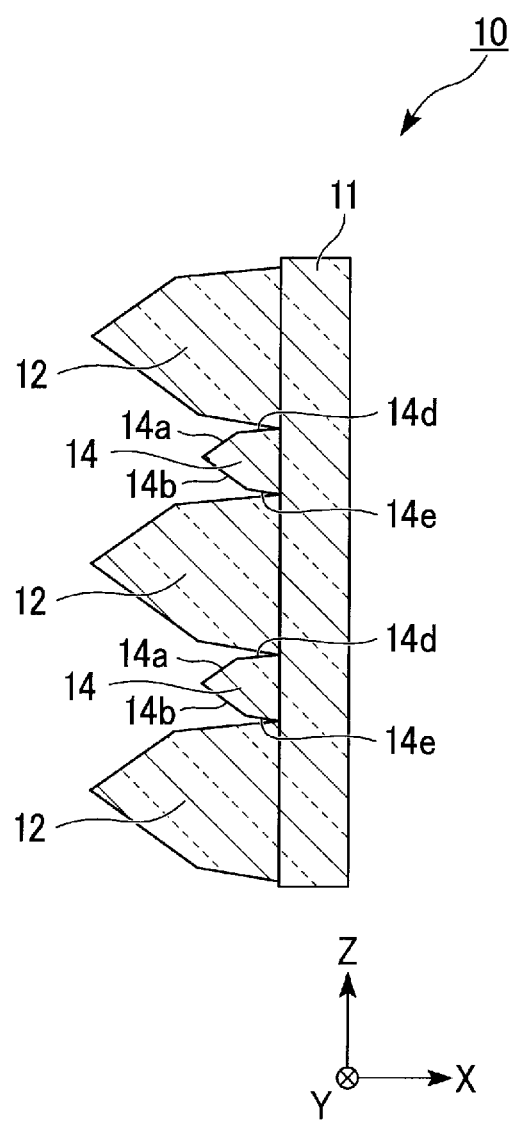
FIG. 8A is a first sectional view illustrating another example of a schematic configuration of the daylighting film that is the first embodiment of the invention.
Figure 8B:
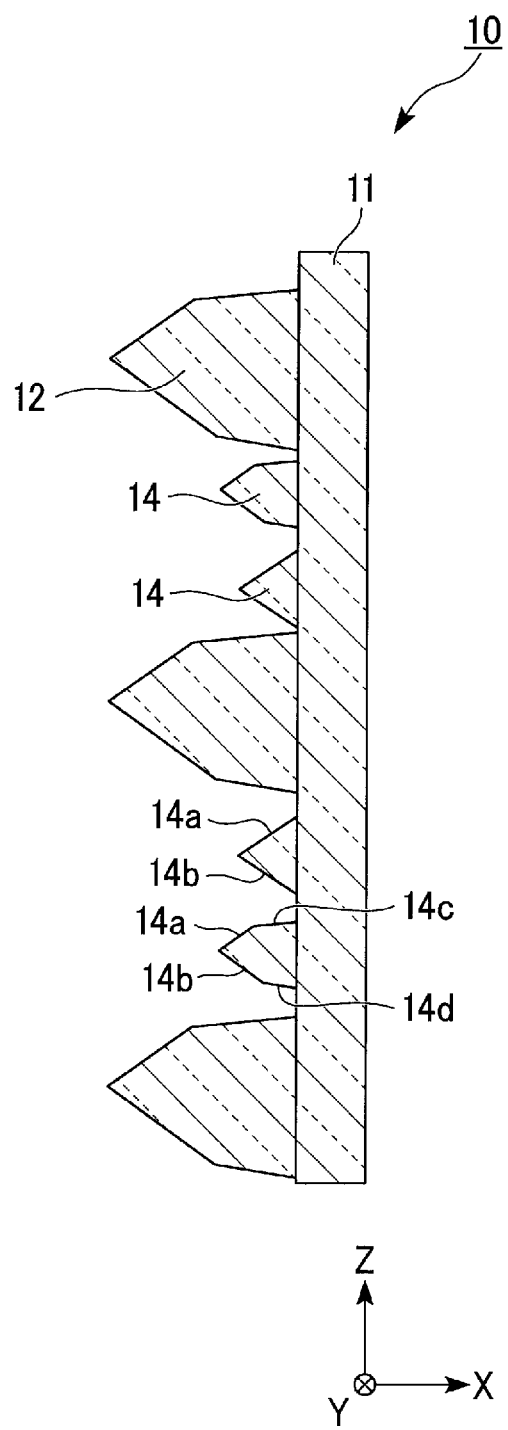
FIG. 8B is a second sectional view illustrating another example of a schematic configuration of the daylighting film that is the first embodiment of the invention.

Though a case where each of the second protrusion portions 14 has a pair of facing inclined surfaces (side surfaces) 14a and 14b is exemplified in the present embodiment, the present embodiment is not limited thereto. In the present embodiment, the second protrusion portion 14 may have two or more pairs of facing inclined surfaces. For example, as illustrated in FIG. 8A, the second protrusion portion 14 may have a pair of facing inclined surfaces 14a and 14b and a pair of facing inclined surfaces 14d and 14e. In addition, as illustrated in FIG. 8B, the second protrusion portion 14 having a pair of facing inclined surfaces (side surfaces) and the second protrusion portion 14 having two or more pairs of facing inclined surfaces (side surfaces) may be mixed.

Figure 9:
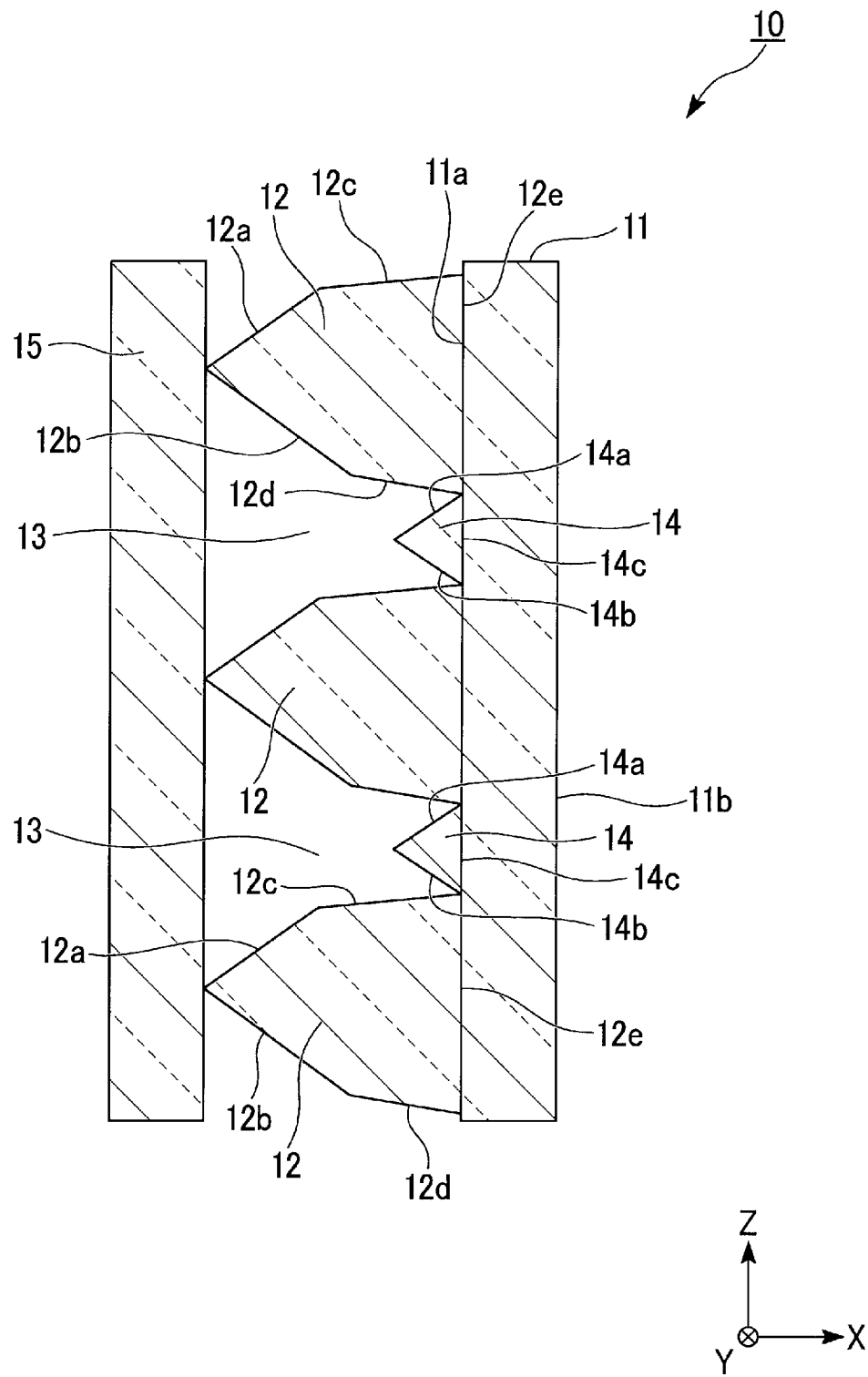
FIG. 9 is a sectional view illustrating another example of a schematic configuration of the daylighting film that is the first embodiment of the invention.

Though a case where the first protrusion portions 12 and the second protrusion portions 14 are exposed on the one surface 11a of the base 11 is exemplified in the present embodiment, the present embodiment is not limited thereto. In the present embodiment, as illustrated in FIG. 9, a protection member 15 having light-transmissive performance may be provided on a side of the plurality of first protrusion portions 12 and second protrusion portions 14 opposite to the side on which the base 11 is provided.

Second Embodiment (Die for Forming Daylighting Film)

Figure 10:
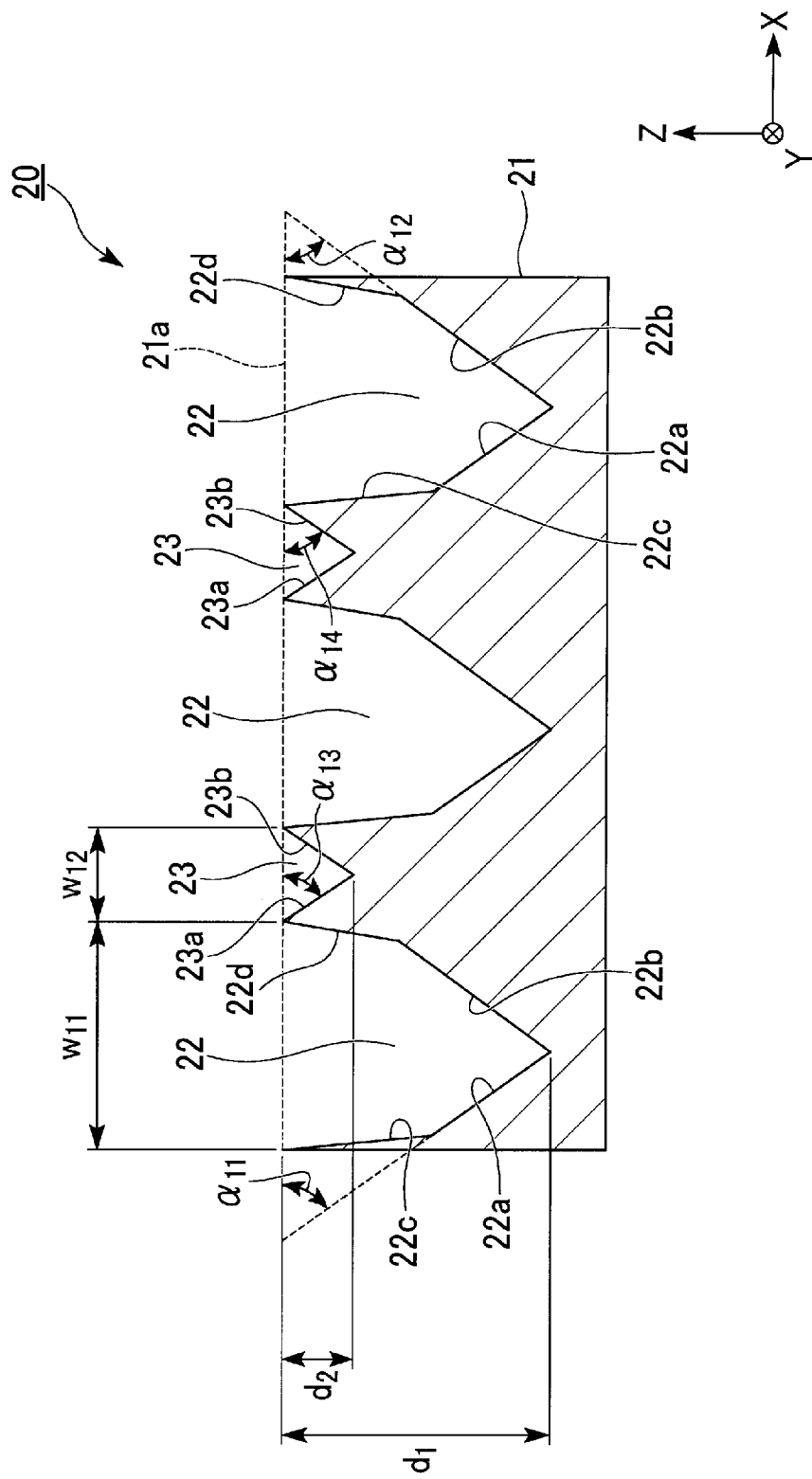
FIG. 10 is a sectional view illustrating a schematic configuration of a die for forming a daylighting film that is a second embodiment of the invention.

FIG. 10 is a sectional view illustrating a schematic configuration of a die for forming a daylighting film that is a second embodiment of the invention.

In FIG. 10, it is assumed that a Z-direction is a normal direction of a main body portion of the die for forming a daylighting film, a Y-direction is a direction orthogonal to the Z-direction, and an X-direction is a direction orthogonal to the Z-direction and the Y-direction.

As illustrated in FIG. 10, a die for forming a daylighting film (hereinafter, abbreviated as a "die") 20 of the present embodiment includes a main body portion 21 made of metal, a plurality of first concave portions 22 that are provided to be adjacent to each other on a side of one surface 21a (indicated with a broken line in FIG. 10) of the main body portion 21, and second concave portions 23 provided between the first concave portions 22 so as to be adjacent to the first concave portions 22.

In the die 20, a depth (a depth of the main body portion 21 in the normal direction (Z-direction)) $d_2$ of each of the second concave portions 23 from the one surface 21a of the main body portion 21 is smaller than a depth (a depth of the main body portion 21 in the normal direction (Z-direction)) $d_1$ of the first concave portion 22 from the one surface 21a of the main body portion 21.

In the die 20, an opening edge of the first concave portion 22 and an opening edge of the second concave portion 23 that are adjacent to each other are in contact.

The first concave portion 22 has a pair of inner side surfaces 22a and 22b and a pair of inner side surfaces 22c and 22d, in which the inner side surfaces of each pair are inclined in mutually different directions with respect to the one surface 21a of the main body portion 21 and face each other.

The second concave portion 23 has a pair of inner side surfaces 23a and 23b which are inclined in mutually different directions with respect to the one surface 21a of the main body portion 21 and face each other.

The inner side surface 22a of the first concave portion 22 and the inner side surface 23a of the second concave portion 23 are preferably equal in inclination with respect to the one surface 21a of the main body portion 21.

The inner side surface 22b of the first concave portion 22 and the inner side surface 23b of the second concave portion 23 are preferably equal in inclination with respect to the one surface 21a of the main body portion 21.

Each of the plurality of first concave portions 22 substantially has one direction (Y-direction) as a longitudinal direction and the one direction is disposed in a direction parallel to one side of the main body portion 21 that has a rectangular shape, for example. In the case of the present embodiment, each of the plurality of first concave portions 22 is constituted as a concave portion which is extended in the Y-direction and has a stripe shape with a constant width. The longitudinal direction of each of the plurality of first concave portions 22 is disposed in a direction parallel to one side of the main body portion 21 that has the rectangular shape. In each of the plurality of first concave portions 22, a shape of a cross section (X-Z cross section) parallel to a width direction of the first concave portion 22 is a trapezoid, triangle, or polygon with at least five vertexes. FIG. 10 illustrates a case where the shape of the cross section parallel to the width direction of the first concave portion 22 is a pentagon (when the one surface 21a of the main body portion 21 is set to be a bottom side).

Each of the plurality of second concave portions 23 substantially has one direction (Y-direction) as a longitudinal direction and the one direction is disposed in a direction parallel to one side of the main body portion 21 that has a rectangular shape, for example. In the case of the present embodiment, each of the plurality of second concave portions 23 is constituted as a concave portion which is extended in the Y-direction and has a stripe shape with a constant width. The longitudinal direction of each of the plurality of second concave portions 23 is disposed in a direction parallel to one side of the main body portion 21 that has the rectangular shape. In each of the plurality of second concave portions 23, a shape of a cross section (X-Z cross section) parallel to a width direction of the second concave portion 23 is a trapezoid, triangle, or polygon with at least five vertexes. FIG. 10 illustrates a case where the shape of the cross section parallel to the width direction of the second concave portions 23 is a triangle (when the one surface 21a of the main body portion 21 is set to be a bottom side).

When a width of the first concave portion 22 in the transverse direction is $w_{11}$, the widths $w_{11}$ of the plurality of first concave portions 22 in the transverse direction are almost equal. The width $w_{11}$ of the first concave portion 22 in the transverse direction is, for example, 10 µm to 50 µm.

Depths (depths in the normal direction (Z-direction) of the main body portion 21) $d_1$ of the plurality of first concave portions 22 from the one surface 21a of the main body portion 21 are almost equal. The depth $d_1$ of the first concave portion 22 is, for example, 10 µm to 100 µm.

When an angle formed by the inner side surface 22a of the first concave portion 22 and the one surface 21a of the main body portion 21 is an angle $\alpha_{11}$, the angles $\alpha_{11}$ of the plurality of first concave portions 22 are almost equal. When an angle formed by the inner side surface 22b of the first concave portion 22 and the one surface 21a of the main body portion 21 is an angle $\alpha_{12}$, the angles $\alpha_{12}$ of the plurality of first concave portions 22 are almost equal. The angle $\alpha_{11}$ of the first concave portion 22 is, for example, 60° to 80°. The angle $\alpha_{12}$ of the first concave portion 22 is, for example, 35° to 60°.

When a width of the second concave portion 23 in the transverse direction is $w_{12}$, the widths $w_{12}$ of the plurality of second concave portions 23 in the transverse direction may not be equal. The first concave portions 22 are formed in a nonuniform manner, resulting that the widths $w_{12}$ of the plurality of second concave portions 23 in the transverse direction may be different from each other. The width $w_{12}$ of the second concave portion 23 in the transverse direction is smaller than the width $w_{11}$ of the first concave portion 22 in the transverse direction ($w_{12} < w_{11}$).

When an angle formed by the inner side surface 23a of the second concave portion 23 and the one surface 21a of the main body portion 21 is an angle $\alpha_{13}$, the angles $\alpha_{13}$ of the plurality of second concave portions 23 are almost equal. When an angle formed by the inner side surface 23b of the second concave portion 23 and the one surface 21a of the main body portion 21 is an angle $\alpha_{14}$, the angles $\alpha_{14}$ of the plurality of second concave portions 23 are almost equal.

The angle $\alpha_{13}$ of the second concave portion 23 is almost equal to the angle $\alpha_{11}$ of the first concave portion 22. The angle $\alpha_{14}$ of the second concave portion 23 is almost equal to the angle $\alpha_{12}$ of the first concave portion 22.

The first concave portion 22 and the second concave portion 23 are cut by bites having the same shape. When the second concave portion 23 is cut by the bite having the same shape as that of the first concave portion 22, there are mainly two advantages. First, it is possible to perform molding with almost the same taper angles with respect to the base. Since the first protrusion portion 12 formed by the first concave portion 22 has such an angle that the sunlight is directed upward as much as possible, when the angles are the same, a daylighting effect is obtained also from the second protrusion portion 14 and a light ray in a glare direction is suppressed. Secondly, when the same bite is used, a tool for the second concave portion 23 does not need to be separately prepared and a tool does not need to be added. That is, the first concave portion 22 and the second concave portion 23 are able to be cut by the same bite and a bite does not need to be prepared in accordance with each of the concave portions. Further, the first concave portion 22 and the second concave portion 23 are able to be cut through the same step and no manufacturing step for providing the second protrusion portion 14 is added.

The metal forming the main body portion 21 is not particularly limited and examples thereof include copper and nickel.

With the die for forming a daylighting film 20 of the present embodiment, it is possible to easily form the daylighting film 10.

Figure 11:
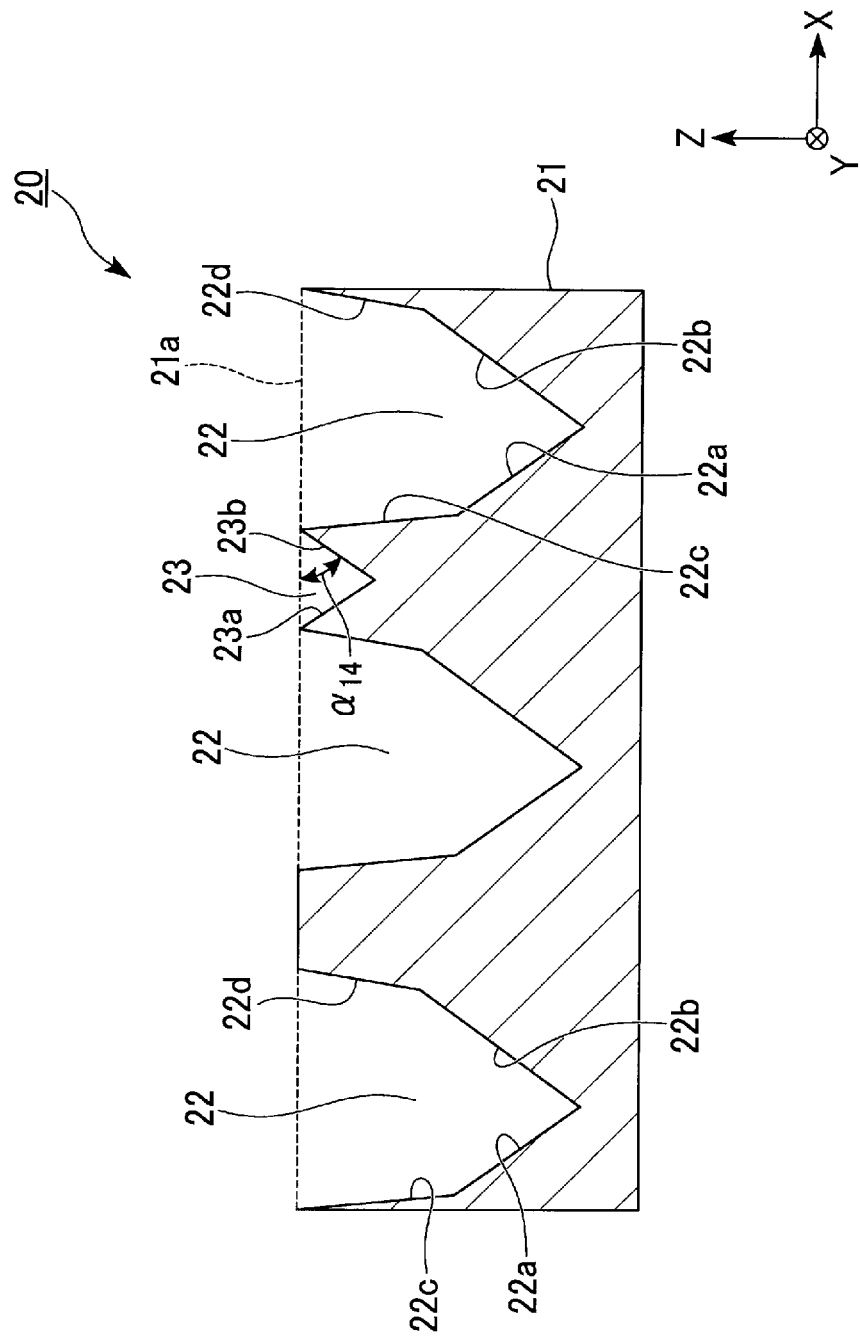
FIG. 11 is a sectional view illustrating another example of a schematic configuration of the die for forming a daylighting film that is the second embodiment of the invention.

Note that, though a case where one second concave portion 23 is provided in each of all regions between the plurality of first concave portions 22 in the main body portion 21 is exemplified in the present embodiment, the present embodiment is not limited thereto. In the present embodiment, as illustrated in FIG. 11, it is only required that the second concave portion 23 is provided in at least one of the regions between the plurality of first concave portions 22 in the main body portion 21. In addition, two or more second concave portions 23 may be provided in each of the regions between the plurality of first concave portions 22 in the main body portion 21 as illustrated in FIG. 12.

Figure 13A:
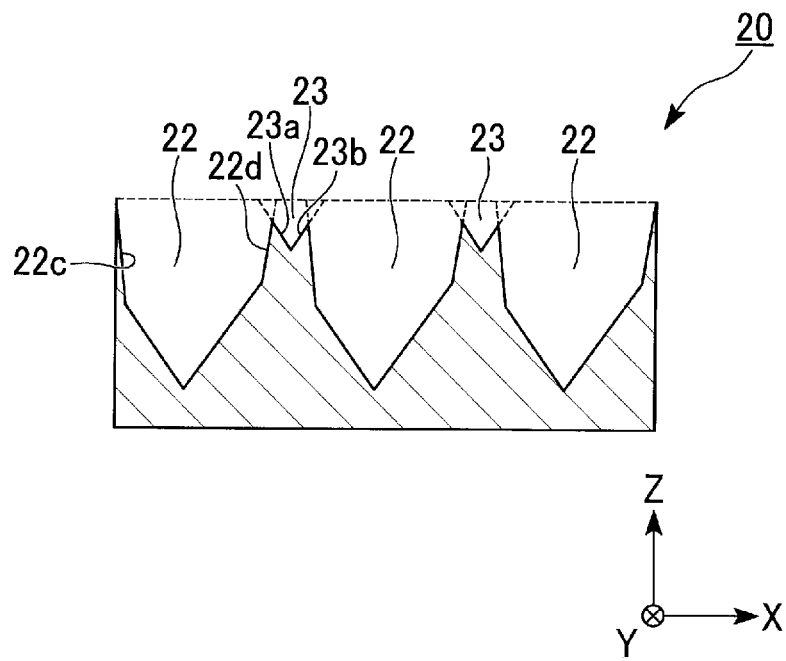
FIG. 13A is a first sectional view illustrating another example of a schematic configuration of the die for forming a daylighting film that is the second embodiment of the invention.
Figure 13B:
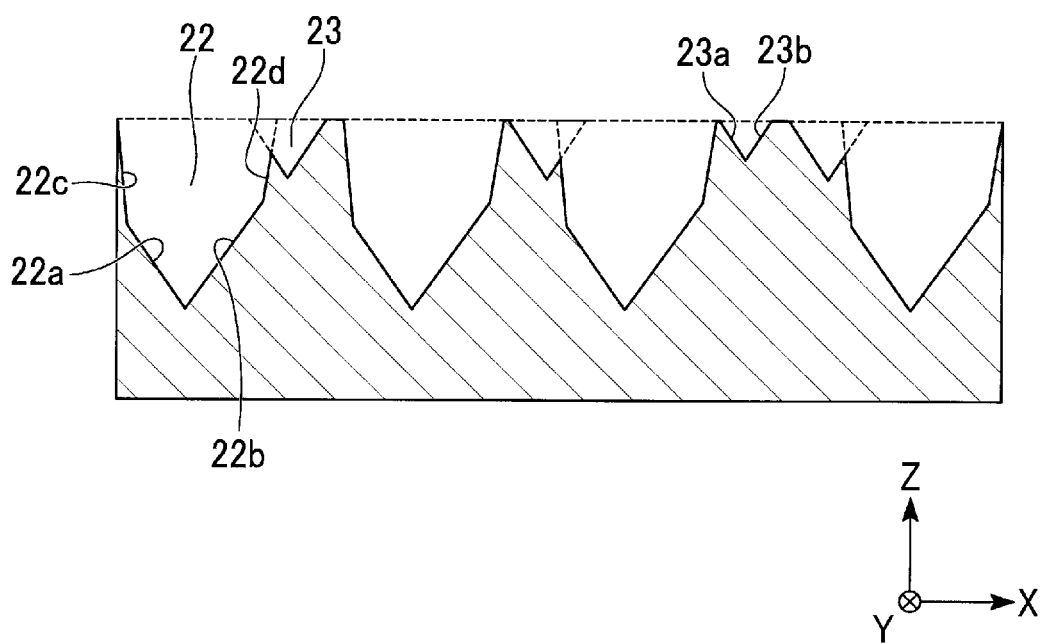
FIG. 13B is a second sectional view illustrating another example of a schematic configuration of the die for forming a daylighting film that is the second embodiment of the invention.

Though a case where an edge of the first concave portion 22 and an edge of the second concave portion 23 that are adjacent to each other are in contact is exemplified in the present embodiment, the present embodiment is not limited thereto. In the present embodiment, the edge of the first concave portion 22 and the edge of the second concave portion 23 that are adjacent to each other may be connected in such a manner that the inner side surface 22c of the first concave portion 22 on the side of the one surface 21a of the main body portion 21 and the inner side surface 23b of the second concave portion 23 that are adjacent to each other partially overlap each other, and that the inner side surface 22d of the first concave portion 22 on the side of the one surface 21a of the main body portion 21 and the inner side surface 23a of the second concave portion 23 that are adjacent to each other partially overlap each other as illustrated in FIG. 13A. In addition, an overlapping degree of the first concave portion 22 and the second concave portion 23 may vary individually as illustrated in FIG. 13B.

Figure 14:
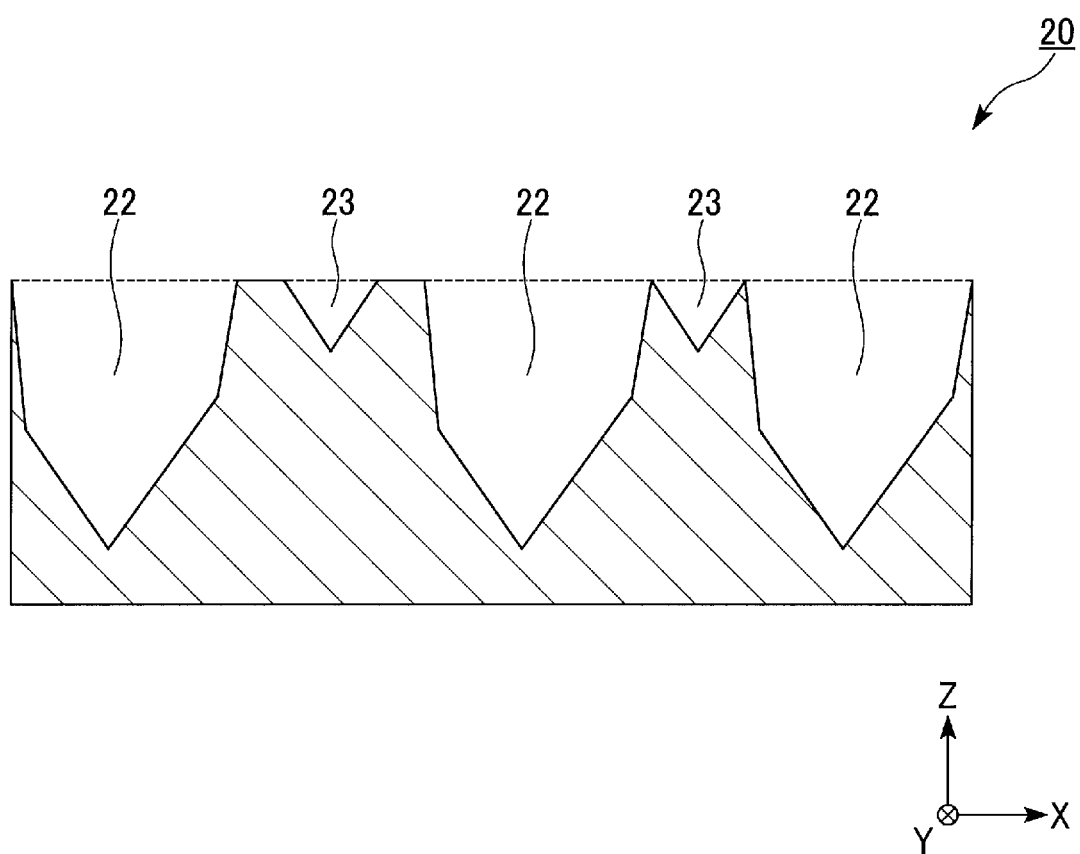
FIG. 14 is a sectional view illustrating another example of a schematic configuration of the die for forming a daylighting film that is the second embodiment of the invention.

In all the first concave portions 22 and second concave portions 23 which are adjacent to each other, a part of the first concave portions 22 and second concave portions 23 which are adjacent to each other may not be in contact. For example, in a part of the first concave portions 22 and second concave portions 23 among the plurality of first concave portions 22 and second concave portions 23, a set of the first concave portion 22 and the second concave portion 23 which are adjacent to each other may be partially in contact. That is, the plurality of first concave portions 22 and second concave portions 23 include a configuration in which a set of the first concave portion 22 and the second concave portion 23 which are adjacent to each other is partially in contact, and a part of the other first concave portions 22 and second concave portions 23 which are adjacent to each other may not be in contact as illustrated in FIG. 14.

Figure 15:
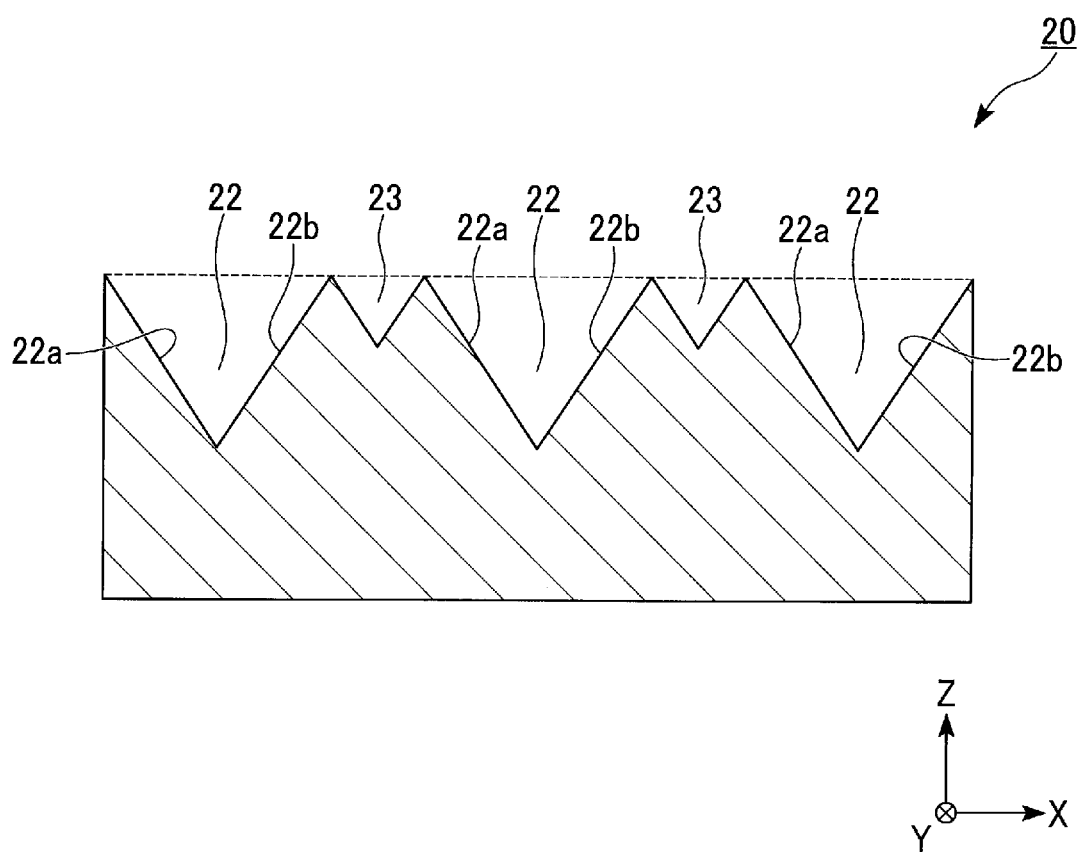
FIG. 15 is a sectional view illustrating another example of a schematic configuration of the die for forming a daylighting film that is the second embodiment of the invention.

Though a case where each of the first concave portions 22 has a pair of facing inner side surfaces 22a and 22b and a pair of facing inner side surfaces 22c and 22d is exemplified in the present embodiment, the present embodiment is not limited thereto. In the present embodiment, it is only required that the first concave portion 22 has at least a pair of facing inner side surfaces 22a and 22b as illustrated in FIG. 15.

Figure 16A:
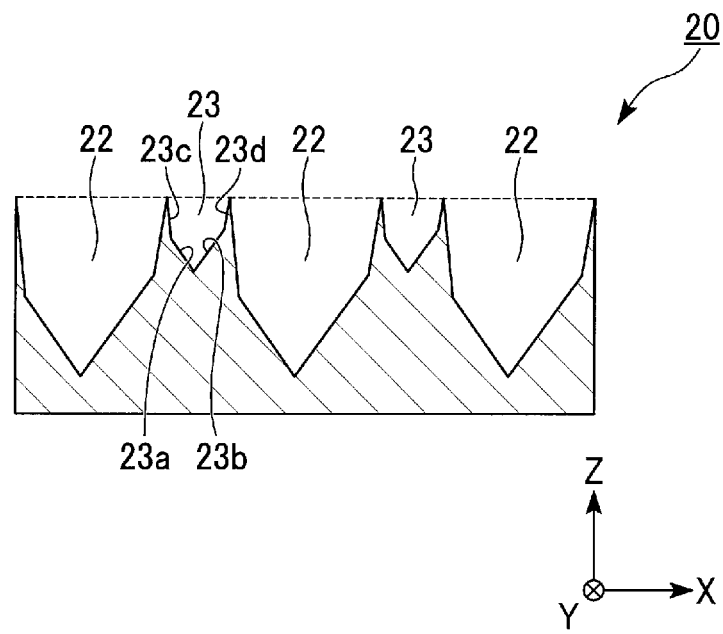
FIG. 16A is a first sectional view illustrating another example of a schematic configuration of the die for forming a daylighting film that is the second embodiment of the invention.
Figure 16B:
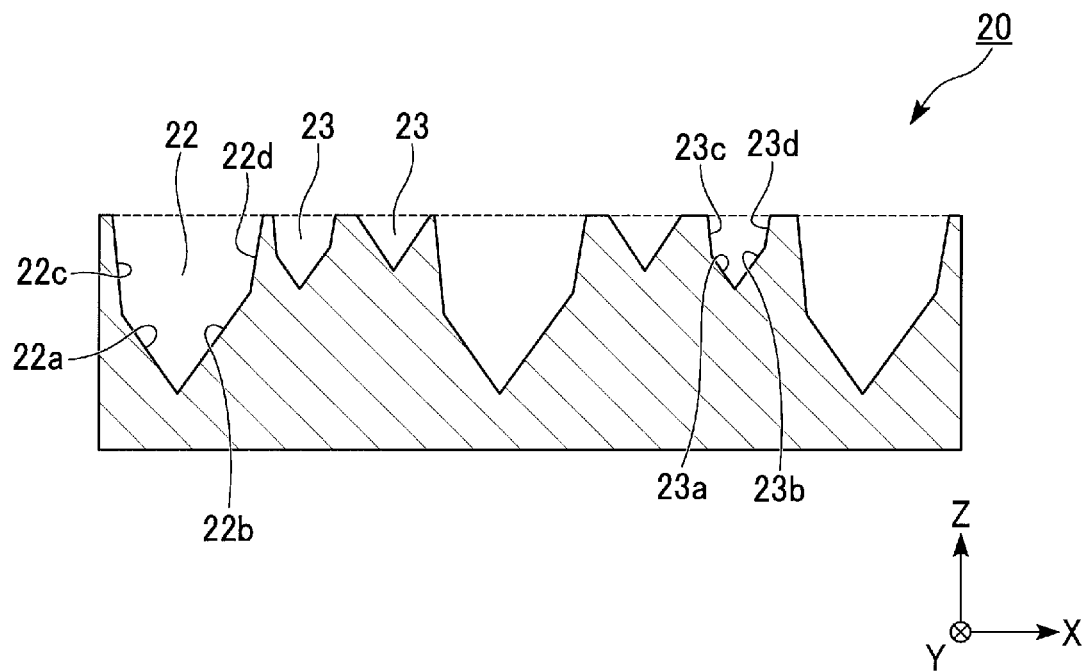
FIG. 16B is a second sectional view illustrating another example of a schematic configuration of the die for forming a daylighting film that is the second embodiment of the invention.

Though a case where each of the second concave portions 23 has a pair of facing inner side surfaces 23a and 23b is exemplified in the present embodiment, the present embodiment is not limited thereto. In the present embodiment, the second concave portion 23 may have two or more pairs of facing inner side surfaces. For example, as illustrated in FIG. 16A, the second concave portion 23 may have a pair of facing inner side surfaces 23a and 23b and a pair of facing inner side surfaces 23c and 23d. In addition, as illustrated in FIG. 16B, the second concave portion 23 having a pair of facing inner side surfaces and the second concave portion 23 having two or more pairs of facing inner side surfaces may be mixed.

Third Embodiment (Manufacturing Method for Daylighting Film)

Figure 17:
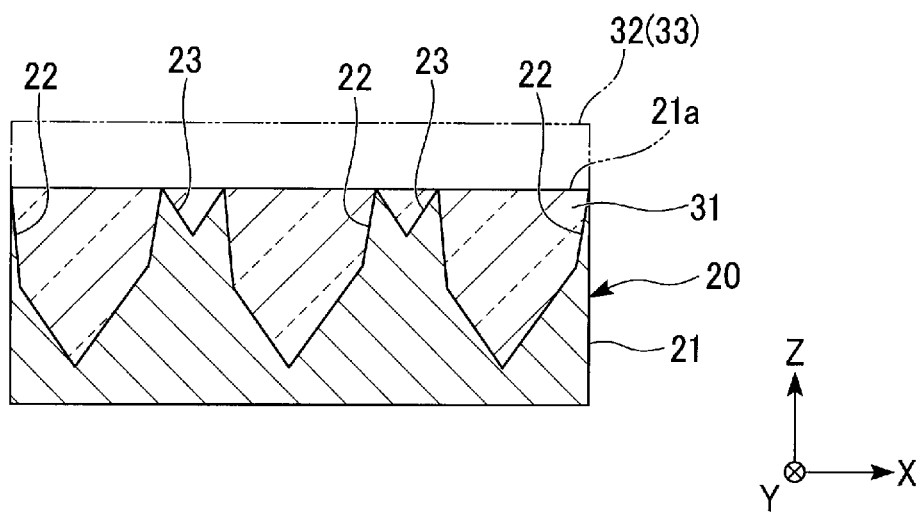
FIG. 17 is a schematic sectional view illustrating a manufacturing method for a daylighting film that is a third embodiment of the invention.
Figure 18:
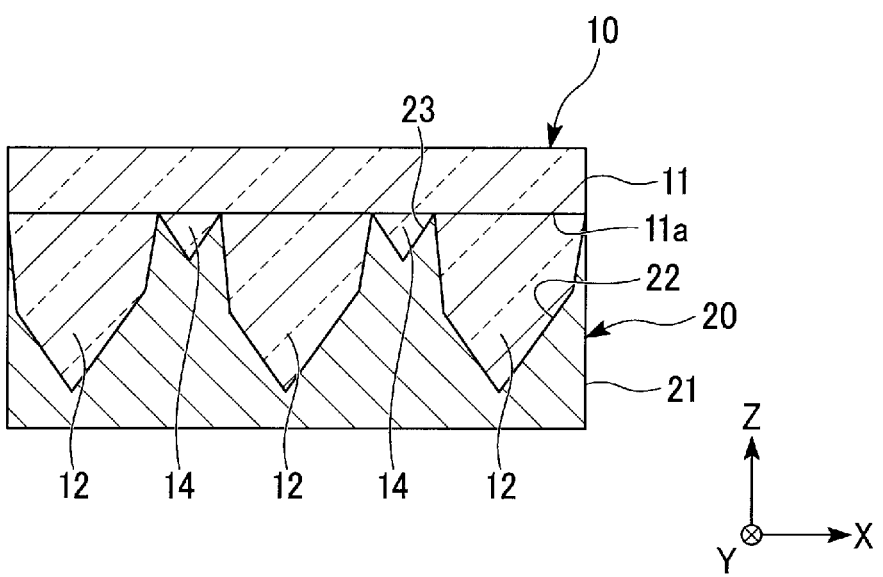
FIG. 18 is a schematic sectional view illustrating the manufacturing method for a daylighting film that is the third embodiment of the invention.
Figure 19:
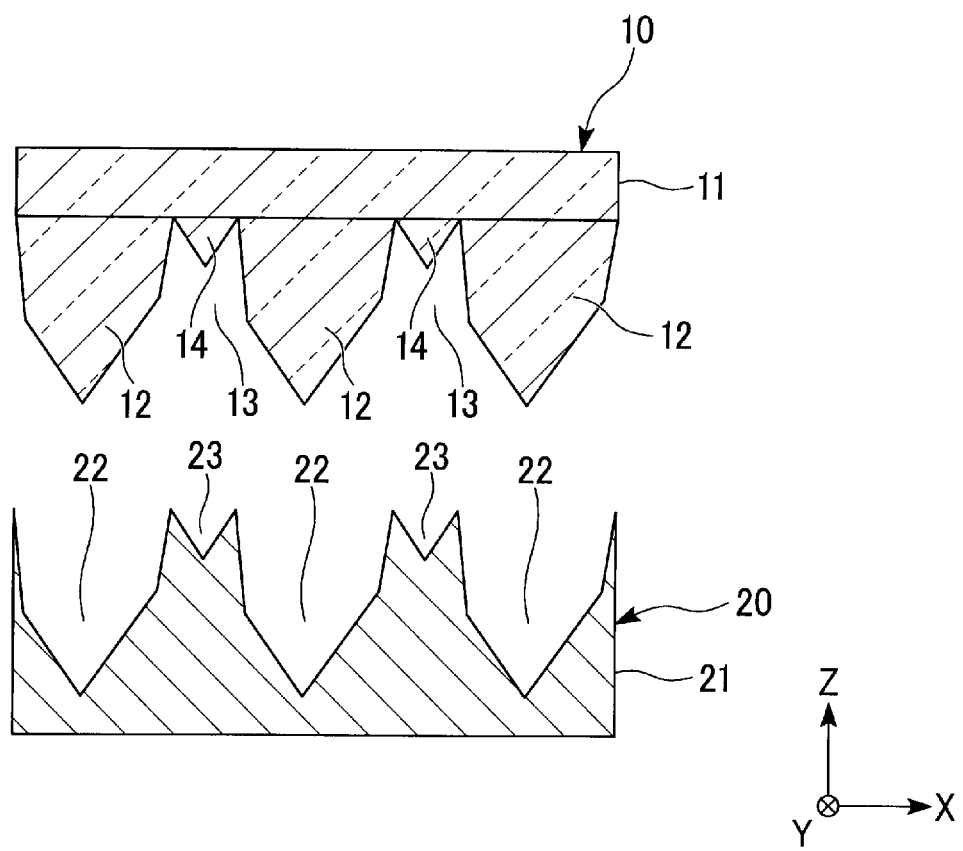
FIG. 19 is a schematic sectional view illustrating the manufacturing method for a daylighting film that is the third embodiment of the invention.

FIGS. 17 to 19 are schematic sectional views illustrating a manufacturing method for a daylighting film that is a third embodiment of the invention. In FIGS. 17 to 19, the same components as those of the daylighting film of the first embodiment illustrated in FIG. 1 and the die for forming a daylighting film of the second embodiment illustrated in FIG. 10 are given the same reference signs and description thereof will be omitted.

In FIGS. 17 to 19, it is assumed that a Z-direction is a normal direction of the main body portion of the die for forming a daylighting film, a Y-direction is a direction orthogonal to the Z-direction, and an X-direction is a direction orthogonal to the Z-direction and the Y-direction.

The manufacturing method for a daylighting film of the present embodiment is a method using the die for forming a daylighting film of the second embodiment described above.

As illustrated in FIG. 17, resin 31 having light-transmissive performance is applied onto the one surface 21a of the main body portion 21 of the die 20, and the resin 31 is filled in the first concave portions 22 and the second concave portions 23 (filling step).

As the resin 31 having light-transmissive performance, resin such as a thermoplastic polymer, thermosetting resin, or photopolymerizable resin is generally used. Examples of such resin 31 include an acrylic polymer, an olefinic polymer, a vinyl-based polymer, a cellulosic polymer, an amide-based polymer, a fluorinated polymer, a urethane-based polymer, a silicone-based polymer, and an imide-based polymer.

At the filling step, as illustrated in FIG. 17, the resin 31 is filled in the first concave portions 22 and the second concave portions 23, and resin 32 having light-transmissive performance and serving as a base of the daylighting film is applied onto the resin 31, which is filled in the first concave portions 22 and the second concave portions 23, to have a predetermined thickness.

As the resin 32 having light-transmissive performance, resin similar to the resin 31 having light-transmissive performance is used.

Note that, as another method, there is also a method by which the resin 31 and the resin 32 are integrally molded. The resin 31 is applied also onto the one surface 21a of the main body portion 21 of the die 20 and the resin 31 that is cured on a surface of the die 20 becomes a base 33. The resin 31 and the base 33 are molded by performing curing once.

In addition, at the filling step, as illustrated in FIG. 17, after the resin 31 is filled in the first concave portions 22 and the second concave portions 23, the base 33 that has light-transmissive performance, has a predetermined thickness, and serves as a base of the daylighting film may be attached onto the resin 31 that is filled in the first concave portions 22 and the second concave portions 23.

Next, as illustrated in FIG. 18, the resin 31 and the resin 32 are cured, so that the daylighting film 10 that includes the base 11 formed of the resin 32, the plurality of first protrusion portions 12 formed of the resin 31 and provided to be adjacent to each other on the one surface 11a of the base 11, and the plurality of second protrusion portions 14 formed of the resin 31 and provided to be adjacent to the first protrusion portions 12 on the one surface 11a of the base 11 is formed (daylighting film formation step).

In addition, at the daylighting film formation step, the resin 31 may be cured and the resin 31 may be bonded to the base 33, so that the daylighting film 10 that includes the base 11 (base 33), the plurality of first protrusion portions 12 formed of the resin 31 and provided to be adjacent to each other on the one surface 11a of the base 11, and the plurality of second protrusion portions 14 formed of the resin 31 and provided to be adjacent to the first protrusion portions 12 on the one surface 11a of the base 11 is formed.

Next, as illustrated in FIG. 19, the daylighting film 10 is separated from the die for forming a daylighting film 20 and the daylighting film 10 is obtained (separation step).

With the manufacturing method for a daylighting film of the present embodiment, it is possible to easily form the daylighting film 10.

Fourth Embodiment (Daylighting Film)

Figure 20:
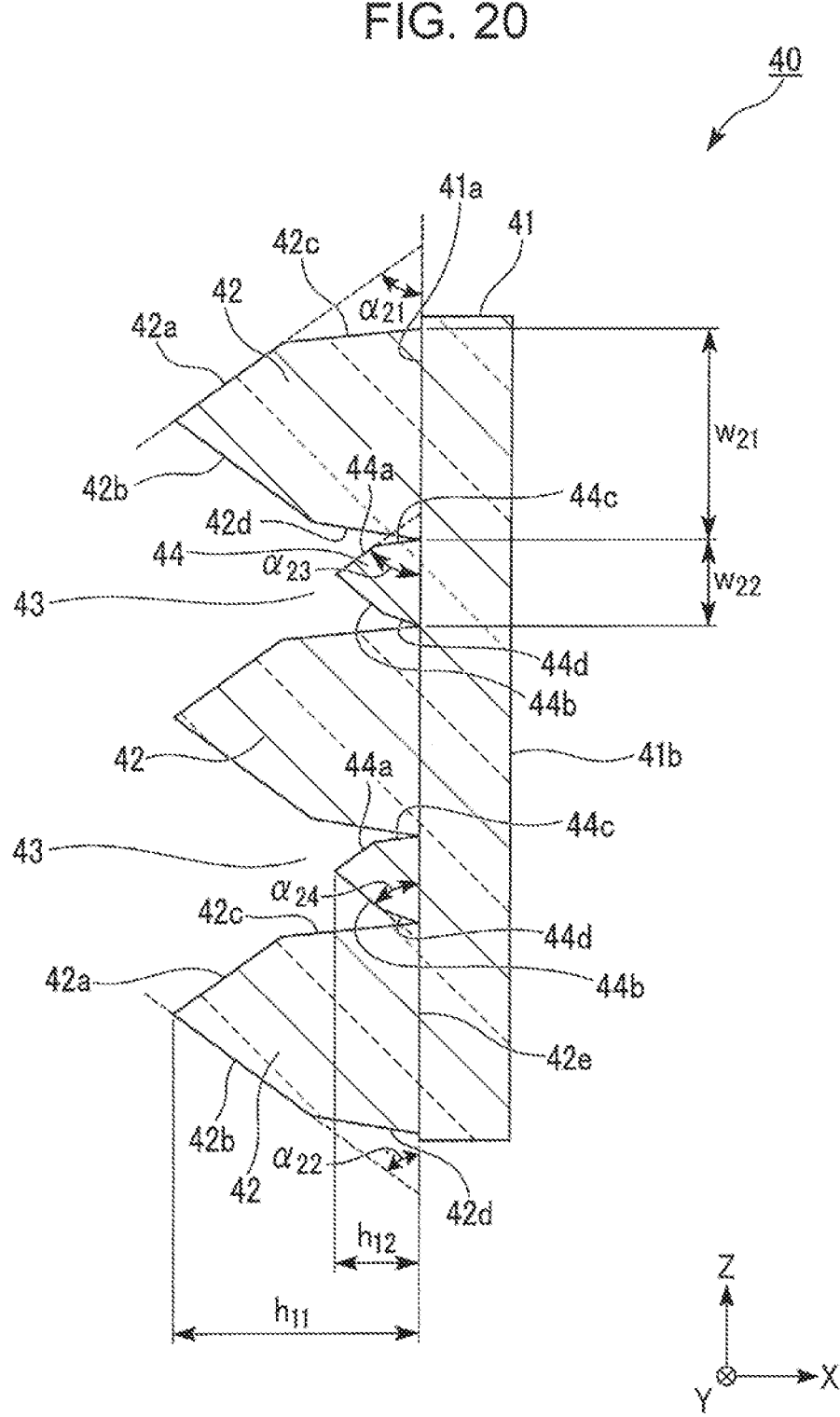
FIG. 20 is a sectional view illustrating a schematic configuration of a daylighting film that is a fourth embodiment of the invention.

FIG. 20 is a sectional view illustrating a schematic configuration of a daylighting film that is a fourth embodiment of the invention.

Figure 21:
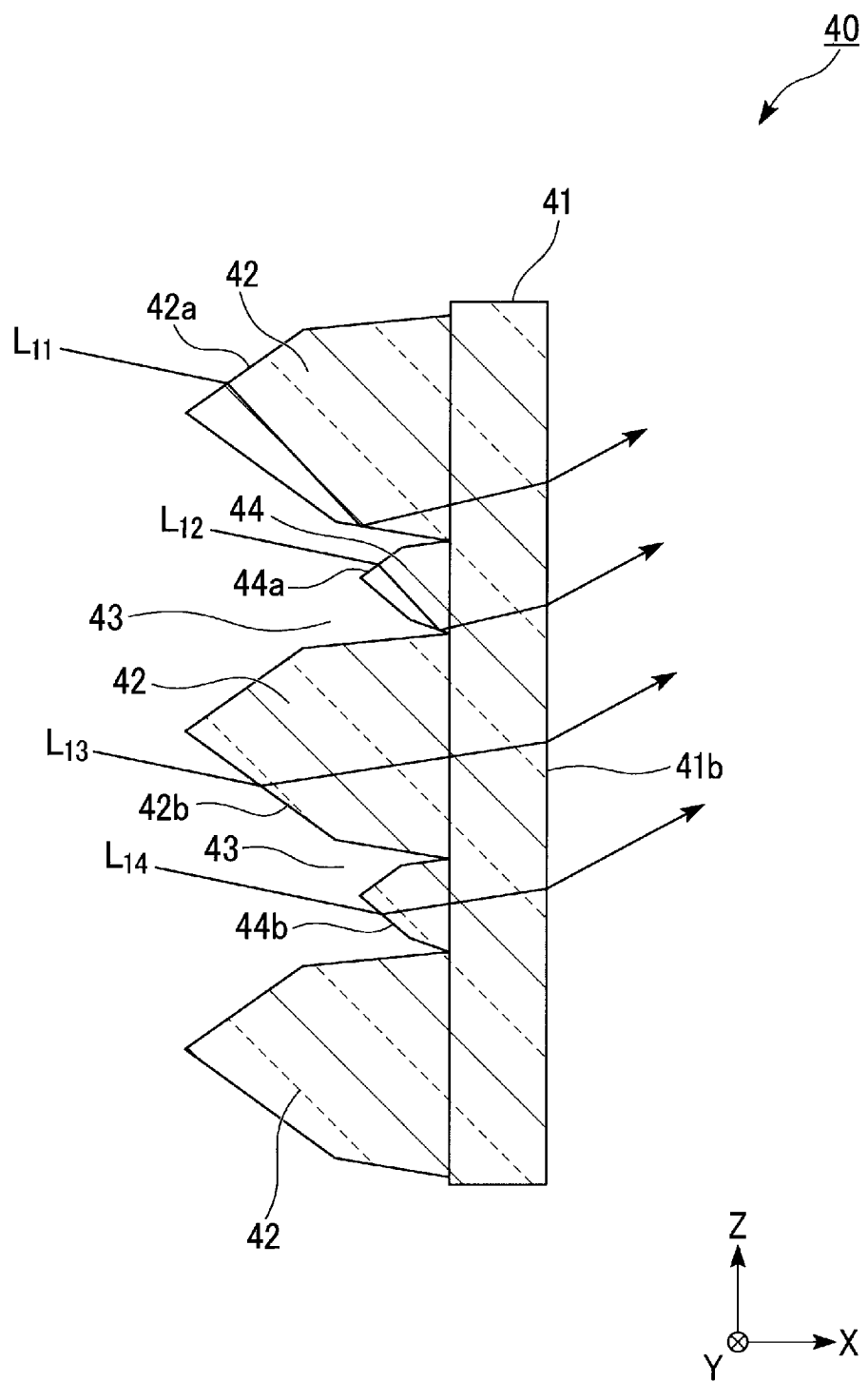
FIG. 21 is a schematic sectional view illustrating a traveling direction of a light ray in the daylighting film that is the fourth embodiment of the invention.

FIG. 21 is a schematic sectional view illustrating a traveling direction of a light ray in the daylighting film that is the fourth embodiment of the invention.

In FIG. 20, it is assumed that an X-direction is a normal direction of a base of the daylighting film, a Y-direction is a direction orthogonal to the X-direction, and a Z-direction is a direction orthogonal to the X-direction and the Y-direction.

As illustrated in FIG. 20, a daylighting film 42 of the present embodiment includes a base 41 having light-transmissive performance, a plurality of first protrusion portions 42 that have light-transmissive performance and are provided to be adjacent to each other on one surface 41a of the base 41, gap portions 43 provided between the first protrusion portions 42, and a plurality of second protrusion portions 44 each of which is provided in each of the gap portions 43 so as to be adjacent to the first protrusion portions 42 on the one surface 41a of the base 41 and is formed of the same material as that of the first protrusion portions 42.

In the daylighting film 40, a height (a height of the second protrusion portion 44 in the normal direction (X-direction) of the base 41) $h_{12}$ of the second protrusion portion 44 from the one surface 41a of the base 41 is smaller than a height (a height of the first protrusion portion 42 in the normal direction (X-direction) of the base 41) $h_{11}$ of the first protrusion portion 42 from the one surface 41a of the base 41.

In the daylighting film 40, an edge of the first protrusion portion 42 and an edge of the second protrusion portion 44 that are adjacent to each other are in contact.

Each of the first protrusion portions 42 has a pair of inclined surfaces (side surfaces) 42a and 42b and a pair of inclined surfaces (side surfaces) 42c and 42d, in which the inclined surfaces of each pair are inclined in mutually different directions with respect to the one surface 41a of the base 41 and face each other.

Each of the second protrusion portions 44 has a pair of inclined surfaces (side surfaces) 44a and 44b and a pair of inclined surfaces (side surfaces) 44c and 44d, in which the inclined surfaces of each pair are inclined in mutually different directions with respect to the one surface 41a of the base 41 and face each other.

The first protrusion portion 42 and the second protrusion portion 44 are preferably similar in a shape.

That is, the inclined surface 42a of the first protrusion portion 42 and the inclined surface 44a of the second protrusion portion 44 are preferably equal in inclination with respect to the one surface 41a of the base 41.

The inclined surface 42b of the first protrusion portion 42 and the inclined surface 44b of the second protrusion portion 44 are preferably equal in inclination with respect to the one surface 41a of the base 41.

The inclined surface 42c of the first protrusion portion 42 and the inclined surface 44c of the second protrusion portion 44 are preferably equal in inclination with respect to the one surface 41a of the base 41.

The inclined surface 42d of the first protrusion portion 42 and the inclined surface 44d of the second protrusion portion 44 are preferably equal in inclination with respect to the one surface 41a of the base 41.

As the base 41, a base similar to the base 11 described above is used.

The light-transmissive performance of the base 41 in the present embodiment means that the total light transmittance defined by JIS K7361-1 is 90% or more. When the base 41 has the total light transmittance of 90% or more, the base 41 obtains sufficient transparency.

Each of the first protrusion portion 42 and the second protrusion portion 44 is made of an organic material similar to that of each of the first protrusion portion 12 and the second protrusion portion 14 described above.

Each of the first protrusion portion 42 and the second protrusion portion 44 preferably has the total light transmittance of 90% or more under the provisions of JIS K7361-1. When each of the first protrusion portion 42 and the second protrusion portion 44 has the total light transmittance of 90% or more, the first protrusion portion 42 and the second protrusion portion 44 are able to obtain sufficient transparency.

Each of the plurality of first protrusion portions 42 substantially has one direction (Y-direction) as a longitudinal direction and the one direction is disposed in a direction parallel to one side of the base 41 that has a rectangular shape. In the case of the present embodiment, each of the plurality of first protrusion portions 42 is constituted as a protrusion portion which is extended in the Y-direction and has a stripe shape with a constant width. The longitudinal direction of each of the plurality of first protrusion portions 42 is disposed in a direction parallel to one side of the base 41 that has the rectangular shape. In each of the plurality of first protrusion portions 42, a shape of a cross section (X-Z cross section) parallel to a width direction of the first protrusion portion 42 is a trapezoid, triangle, or polygon with at least five vertexes. FIG. 20 illustrates a case where the shape of the cross section parallel to the width direction of the first protrusion portion 42 is a pentagon.

Each of the plurality of second protrusion portions 44 substantially has one direction (Y-direction) as a longitudinal direction and the one direction is disposed in a direction parallel to one side of the base 41 that has a rectangular shape. In the case of the present embodiment, each of the plurality of second protrusion portions 44 is constituted as a protrusion portion which is extended in the Y-direction and has a stripe shape with a constant width. The longitudinal direction of each of the plurality of second protrusion portions 44 is disposed in a direction parallel to one side of the base 41 that has the rectangular shape. In each of the plurality of second protrusion portions 44, a shape of a cross section (X-Z cross section) parallel to a width direction of the second protrusion portion 44 is a trapezoid, triangle, or polygon with at least five vertexes. FIG. 20 illustrates a case where the shape of the cross section parallel to the width direction of the second protrusion portion 44 is a pentagon.

When a width of the first protrusion portion 42 in the transverse direction is $w_{21}$, the widths $w_{21}$ of the plurality of first protrusion portions 42 in the transverse direction are almost equal. The width $w_{21}$ of the first protrusion portion 42 in the transverse direction is, for example, 10 μm to 50 μm.

Heights (heights of the first protrusion portions 42 in the normal direction (X-direction) of the base 41) $h_{11}$ of the plurality of first protrusion portions 42 from the one surface 41a of the base 41 are almost equal. The height $h_{11}$ of the first protrusion portion 42 is, for example, 10 μm to 100 μm.

When an angle formed by the inclined surface (side surface) 42a of the first protrusion portion 42 and the one surface 41a of the base 41 is an angle $\alpha_{21}$, the angles $\alpha_{21}$ of the plurality of first protrusion portions 42 are all equal. When an angle formed by the inclined surface (side surface) 42b of the first protrusion portion 42 and the one surface 41a of the base 41 is an angle $\alpha_{22}$, the angles $\alpha_{22}$ of the plurality of first protrusion portions 42 are all equal. The angle $\alpha_{21}$ of the first protrusion portion 42 is, for example, 60° to 80°. The angle $\alpha_{22}$ of the first protrusion portion 42 is, for example, 35° to 60°.

When a width of the second protrusion portion 44 in the transverse direction is $w_{22}$, the widths $w_{22}$ of the plurality of second protrusion portions 44 in the transverse direction may not be equal. The first protrusion portions 42 are formed in a nonuniform manner, resulting that the widths $w_{22}$ of the plurality of second protrusion portions 44 in the transverse direction may be different from each other. The width $w_{22}$ of the second protrusion portion 44 in the transverse direction is smaller than the width $w_{21}$ of the first protrusion portion 42 in the transverse direction ($w_{22} < w_{21}$).

When an angle formed by the inclined surface (side surface) 44a of the second protrusion portion 44 and the one surface 41a of the base 41 is an angle $\alpha_{23}$, the angles $\alpha_{23}$ of the plurality of second protrusion portions 44 are almost equal. When an angle formed by the inclined surface (side surface) 44b of the second protrusion portion 44 and the one surface 41a of the base 41 is an angle $\alpha_{24}$, the angles $\alpha_{24}$ of the plurality of second protrusion portions 44 are almost equal.

The angle $\alpha_{23}$ of the second protrusion portion 44 is almost equal to the angle $\alpha_{21}$ of the first protrusion portion 42. The angle $\alpha_{24}$ of the second protrusion portion 44 is almost equal to the angle $\alpha_{22}$ of the first protrusion portion 42.

Each of the gap portions 43 is filled with gas such as the air and a refractive index thereof is about 1. When the refractive index of the gap portion 43 is 1, the gap portion 43 is configured such that a critical angle in an interface (the inclined surface (side surface) 42a, 42b, 42c, or 42d of the first protrusion portion 42, the inclined surface (side surface) 44a, 44b, 44c, or 44d of the second protrusion portion 44) between the gap portion 43 and each of the first protrusion portion 42 and the second protrusion portion 44 becomes minimum. In the case of the present embodiment, the gap portion 43 serves as an air layer which is formed from the air, but the gap portion 43 may serve as an inert gas layer which is formed from an inert gas such as nitrogen or may serve as a decompressive layer which is in a decompressive state.

The daylighting film 40 is attached to a glass base of a window glass such that an arrangement direction of the first protrusion portions 42 and the second protrusion portions 44 becomes a vertical direction.

As illustrated in FIG. 21, for example, a light $L_{11}$ which is incident into the first protrusion portion 42 from the inclined surface 42a of the first protrusion portion 42 among light coming from the upper part of the daylighting film 40 is totally reflected by the interface between the first protrusion portion 42 and the gap portion 43, changes a traveling direction to the upward direction, and then is refracted by the other surface 41b of the base 41, and output toward the upper part of the daylighting film 40. In addition, a light $L_{12}$ which is incident into the second protrusion portion 44 from the inclined surface 44a of the second protrusion portion 44 among light coming from the upper part of the daylighting film 40 is totally reflected by the interface between the second protrusion portion 44 and the gap portion 43, changes a traveling direction to the upward direction, and then is refracted by the other surface 41b of the base 41, and output toward the upper part of the daylighting film 40.

On the other hand, a light $L_{13}$ which is incident into the first protrusion portion 42 from the inclined surface 42b of the first protrusion portion 42 among light coming from the upper part of the daylighting film 40 is refracted by the other surface 41b of the base 41, and output toward the upper part of the daylighting film 40. A light $L_{14}$ which is incident into the second protrusion portion 44 from the inclined surface 44b of the second protrusion portion 44 among light coming from the upper part of the daylighting film 40 is refracted by the other surface 41b of the base 41, and output toward the upper part of the daylighting film 40.

The light that is output toward the upper part of the daylighting film 40 as described above is introduced to the ceiling in the room or the deep inside of the room and illuminates the inside of the room brightly.

In the present embodiment, the inclined surfaces 42a, 42b, 42c, and 42d of the first protrusion portion 42 on the opposite side to the base 41 are constituted as light incoming end surfaces and an end surface 42e of the first protrusion portion 42 on the base 41 side is constituted as a light outgoing end surface. The inclined surfaces 44a, 44b, 44c, and 44d of the second protrusion portion 44 on the opposite side to the base 41 are constituted as light incoming end surfaces and an end surface 44e of the second protrusion portion 44 on the base 41 side is constituted as a light outgoing end surface.

The daylighting film 40 of the present embodiment includes the base 41 having light-transmissive performance, the plurality of first protrusion portions 42 that have light-transmissive performance and are provided to be adjacent to each other on the one surface 41a of the base 41, and the plurality of second protrusion portions 44 each of which is provided so as to be adjacent to the first protrusion portions 42 on the one surface 41a of the base 41 and is formed of the same material as that of the first protrusion portions 42, in which the angle $\alpha_{23}$ of the second protrusion portion 44 is almost equal to the angle $\alpha_{21}$ of the first protrusion portion 42 and the angle $\alpha_{24}$ of the second protrusion portion 44 is almost equal to the angle $\alpha_{22}$ of the first protrusion portion 42, so that the lights $L_{12}$ and $L_{14}$ incident into the second protrusion portion 44 are able to be output toward the upper part of the daylighting film 40 similarly to the lights $L_{11}$ and $L_{13}$ incident into the first protrusion portion 42, thus making it possible to allow external light to travel toward the ceiling in the room and prevent the person in the room from being dazzled.

Figure 22:
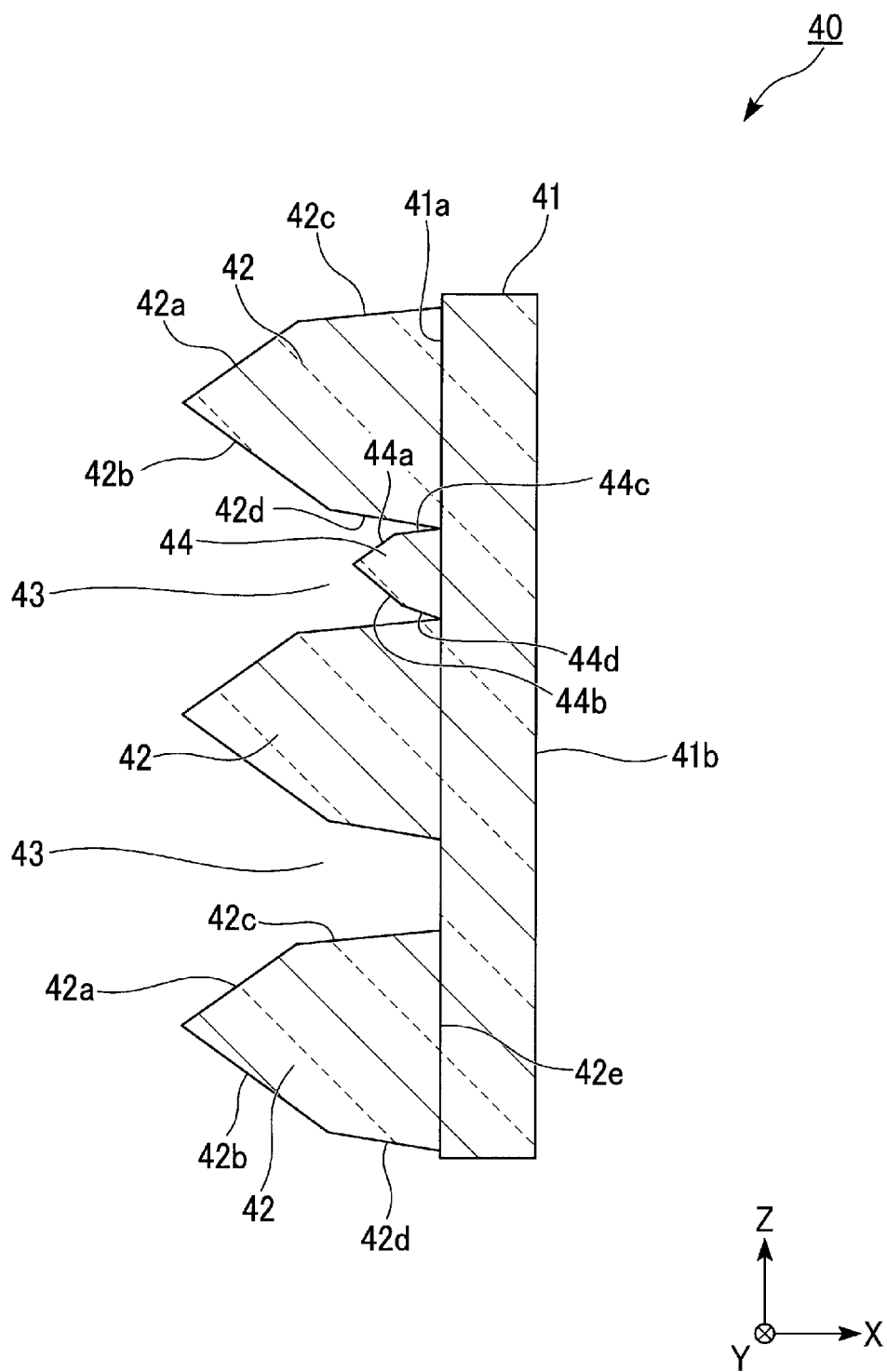
FIG. 22 is a sectional view illustrating another example of a schematic configuration of the daylighting film that is the fourth embodiment of the invention.
Figure 23:
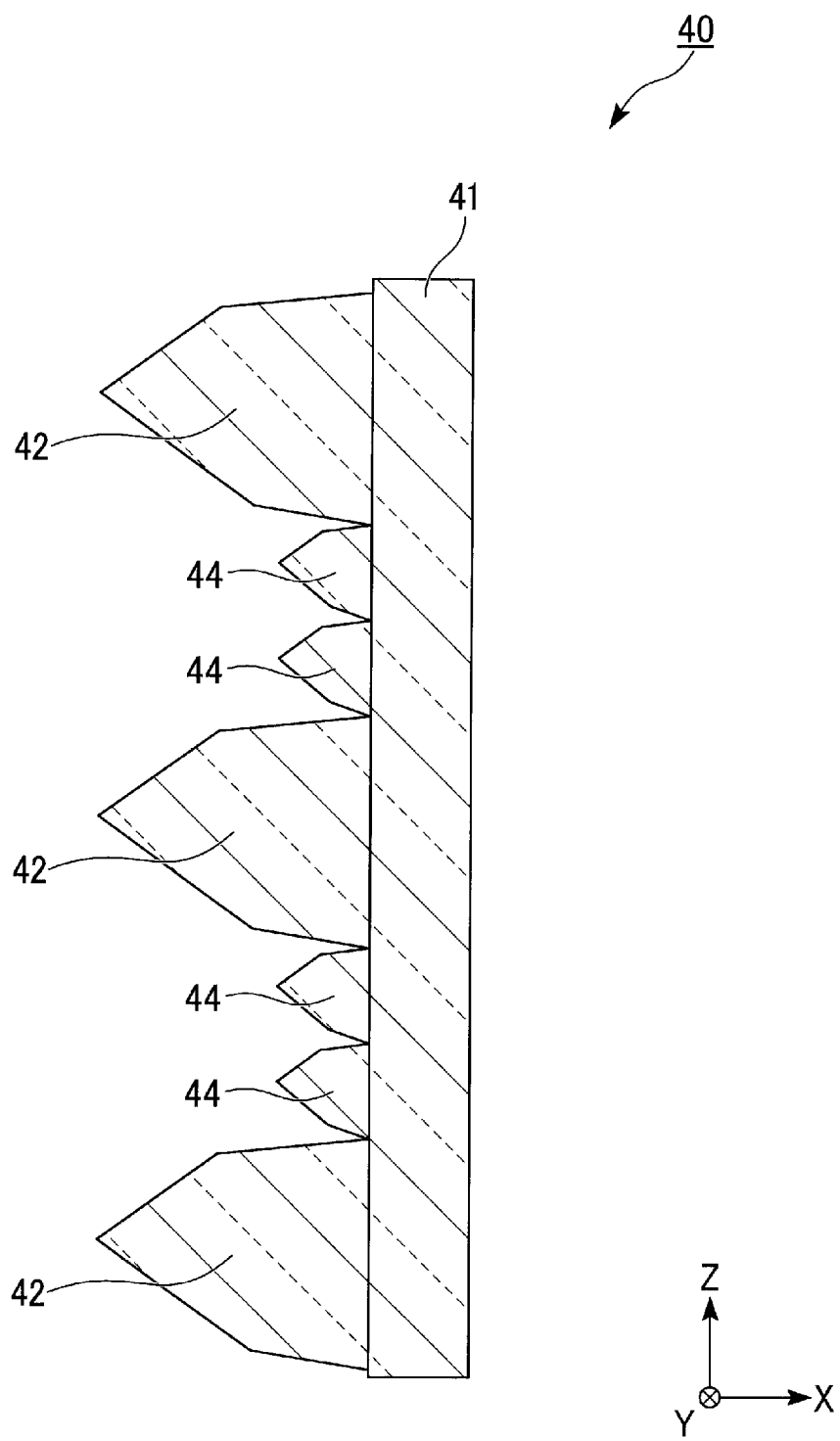
FIG. 23 is a sectional view illustrating another example of a schematic configuration of the daylighting film that is the fourth embodiment of the invention.

Note that, though a case where one second protrusion portion 44 is provided in each of all the gap portions 43 formed between the plurality of first protrusion portions 42 is exemplified in the present embodiment, the present embodiment is not limited thereto. In the present embodiment, as illustrated in FIG. 22, it is only required that the second protrusion portion 44 is provided in at least one of the gap portions 43 formed between the plurality of first protrusion portions 42. In addition, at least one second protrusion portion 44 is only required to be provided in the gap portion 43 as illustrated in FIG. 23, and two or more second protrusion portions 44 may be provided in the gap portion 43.

Figure 24:
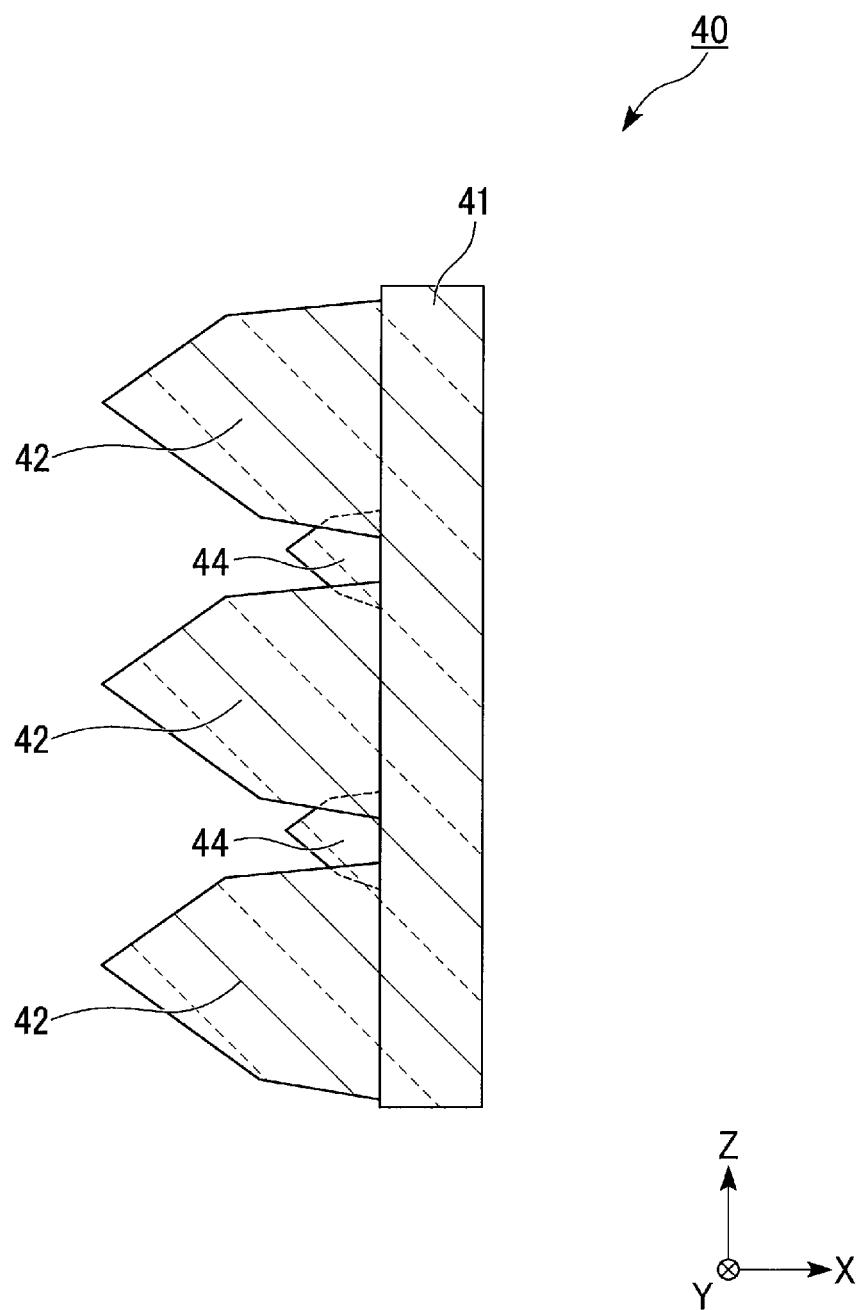
FIG. 24 is a sectional view illustrating another example of a schematic configuration of the daylighting film that is the fourth embodiment of the invention.
Figure 25:
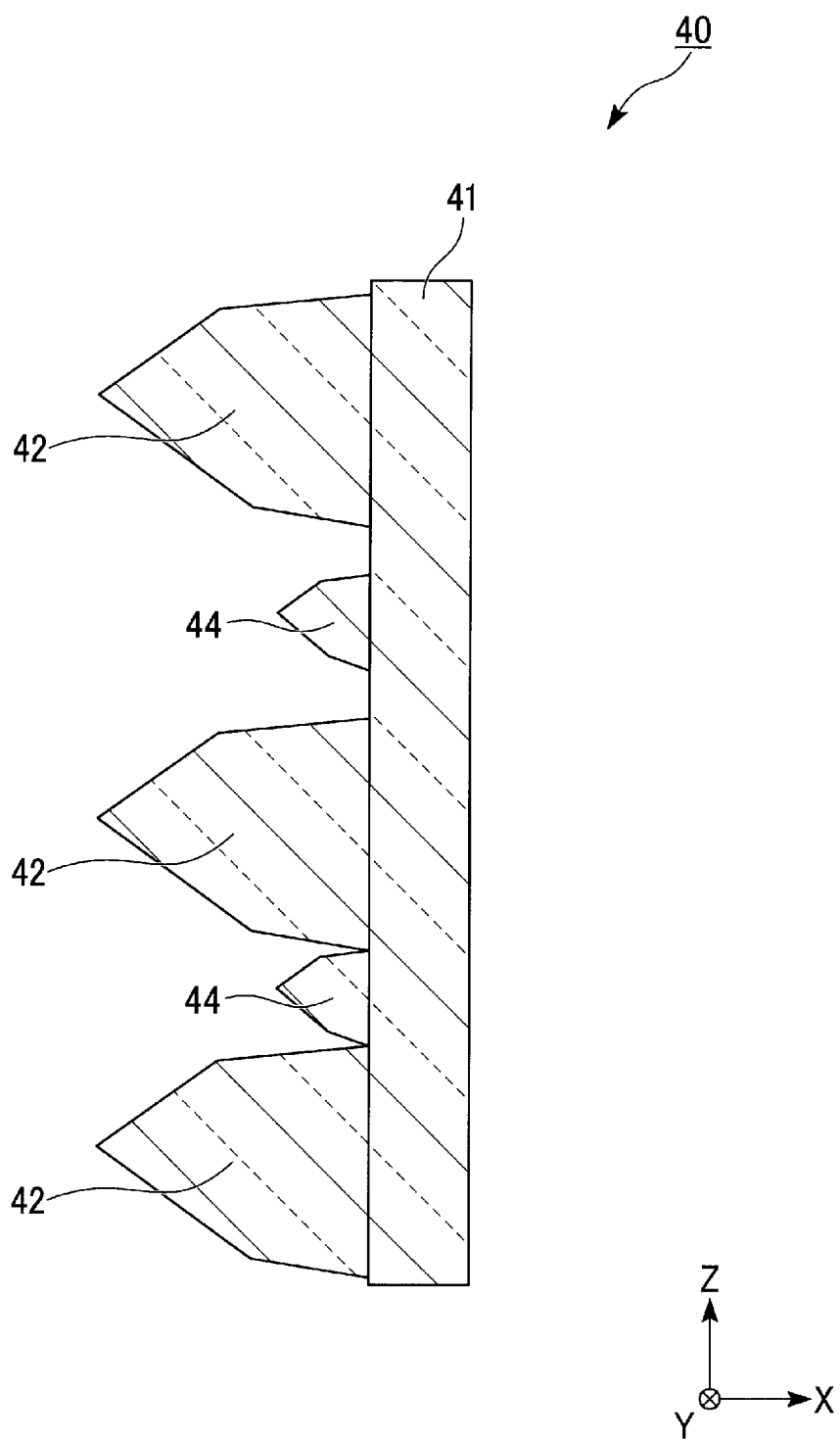
FIG. 25 is a sectional view illustrating another example of a schematic configuration of the daylighting film that is the fourth embodiment of the invention.

Though a case where an edge of the first protrusion portion 42 and an edge of the second protrusion portion 44 that are adjacent to each other are in contact is exemplified in the present embodiment, the present embodiment is not limited thereto. In the present embodiment, the edge of the first protrusion portion 42 and the edge of the second protrusion portion 44 that are adjacent to each other may be connected in such a manner that an end surface of the first protrusion portion 42 on the base 41 side and an end surface of the second protrusion portion 44 on the base 41 side that are adjacent to each other partially overlap each other as illustrated in FIG. 24.

In all the first protrusion portions 42 and second protrusion portions 44 which are adjacent to each other, a part of the first protrusion portions 42 and second protrusion portions 44 which are adjacent to each other may not be in contact. For example, in a part of the first protrusion portions 42 and second protrusion portions 44 among the plurality of first protrusion portions 42 and second protrusion portions 44, a set of the first protrusion portion 42 and the second protrusion portion 44 which are adjacent to each other may be partially in contact. That is, the plurality of first protrusion portions 42 and second protrusion portions 44 include a configuration in which a set of the first protrusion portion 42 and the second protrusion portion 44 which are adjacent to each other is partially in contact, and a part of the other first protrusion portions 42 and second protrusion portions 44 which are adjacent to each other may not be in contact.

Figure 26:
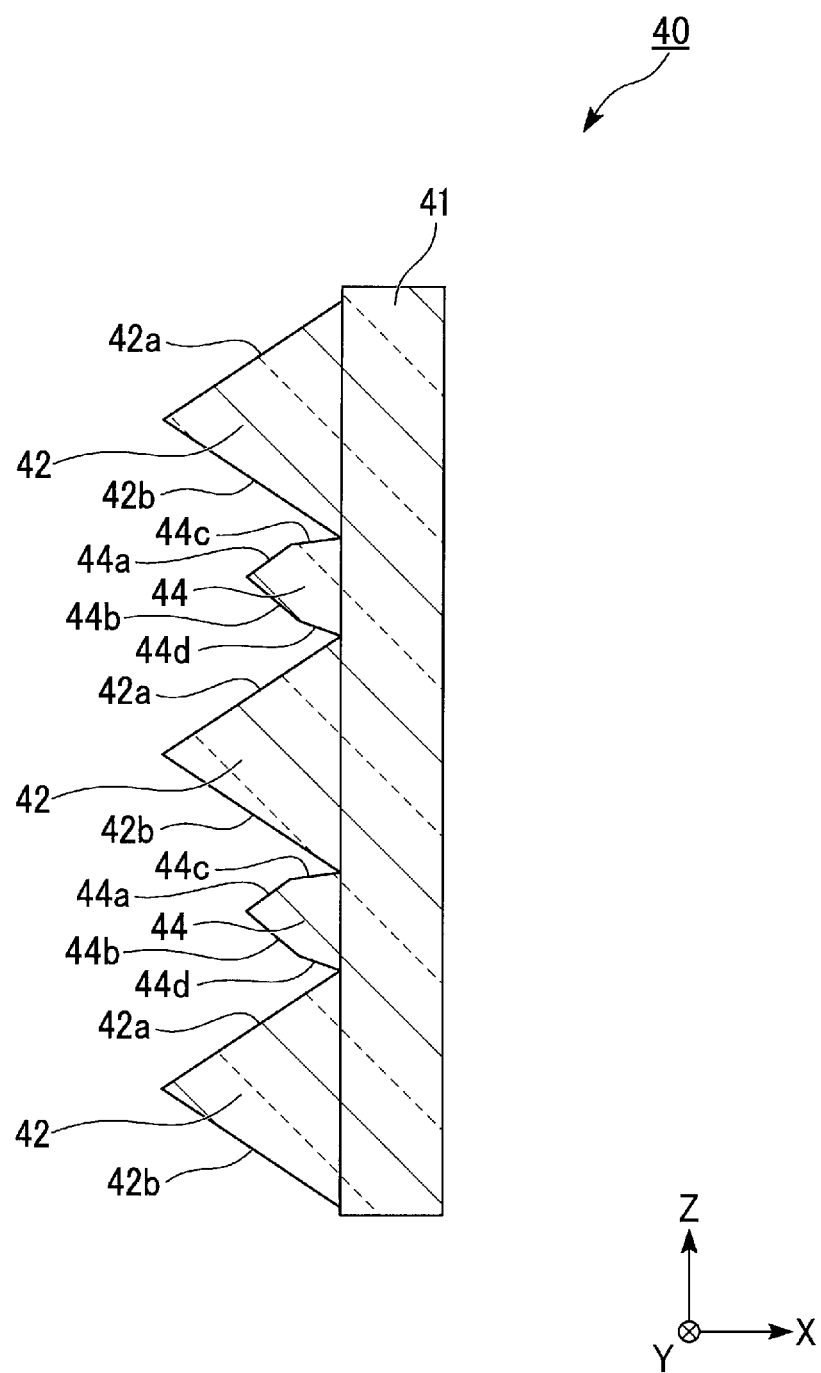
FIG. 26 is a sectional view illustrating another example of a schematic configuration of the daylighting film that is the fourth embodiment of the invention.

Though a case where each of the first protrusion portions 42 has a pair of facing inclined surfaces (side surfaces) 42a and 42b and a pair of facing inclined surfaces (side surfaces) 42c and 42d is exemplified in the present embodiment, the present embodiment is not limited thereto. In the present embodiment, it is only required that the first protrusion portion 42 has at least at a pair of facing inclined surfaces 42a and 42b as illustrated in FIG. 26.

Figure 27:
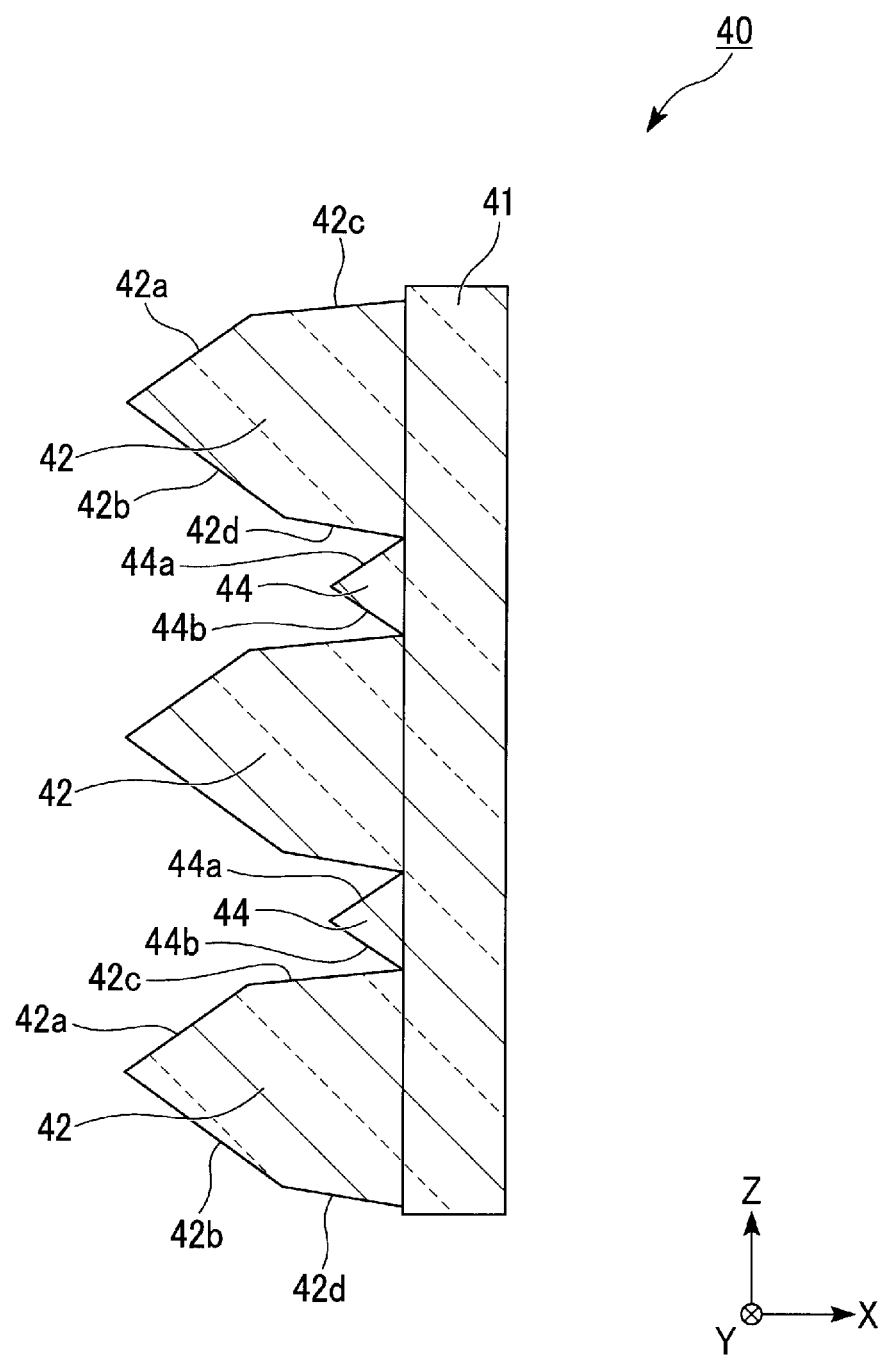
FIG. 27 is a sectional view illustrating another example of a schematic configuration of the daylighting film that is the fourth embodiment of the invention.

Though a case where each of the second protrusion portions 44 has a pair of facing inclined surfaces (side surfaces) 44a and 44b and a pair of facing inclined surfaces (side surfaces) 44c and 44d is exemplified in the present embodiment, the present embodiment is not limited thereto. In the present embodiment, the second protrusion portion 44 is only required to have at least a pair of facing inclined surfaces 44a and 44b as illustrated in FIG. 27.

Though a case where an entire shape of the first protrusion portion 42 and an entire shape of the second protrusion portion 44 are similar is exemplified in the present embodiment, the present embodiment is not limited thereto. In the present embodiment, it is only required that a shape of a part of the first protrusion portion 42, which corresponds to the pair of inclined surface 42a and 42b and the pair of inclined surfaces 42c and 42d as illustrated in FIG. 27 is similar to a shape of a part which corresponds to the pair of inclined surfaces 44a and 44b and the pair of inclined surfaces 44c and 44d of the plurality of second protrusion portions 44 as illustrated in FIG. 26.

Figure 28:
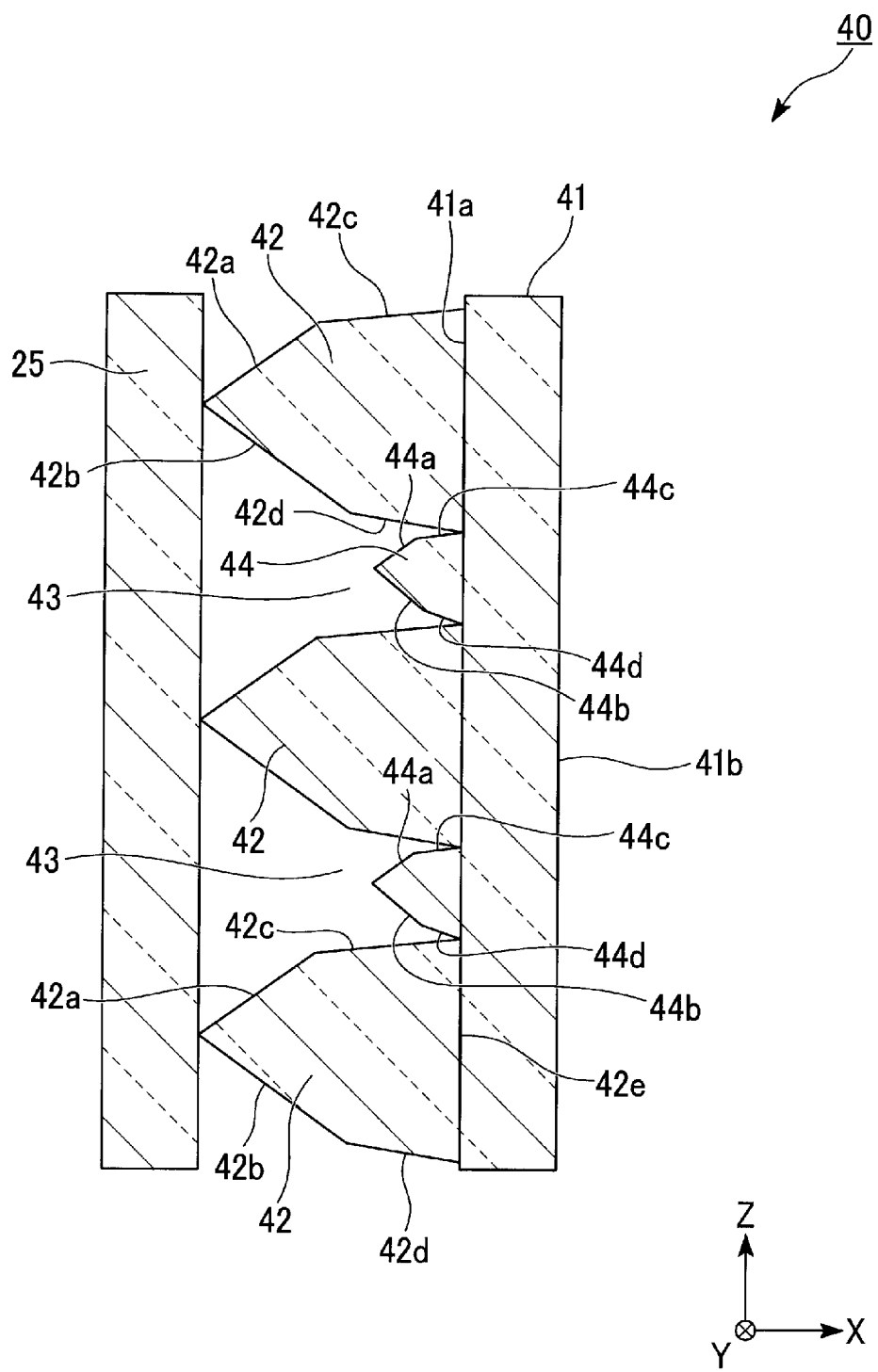
FIG. 28 is a sectional view illustrating another example of a schematic configuration of the daylighting film that is the fourth embodiment of the invention.

Though a case where the first protrusion portions 42 and the second protrusion portions 44 are exposed on the one surface 41a of the base 41 is exemplified in the present embodiment, the present embodiment is not limited thereto. In the present embodiment, a protection member 25 that has light-transmissive performance may be provided on a side of the plurality of first protrusion portions 42 and second protrusion portions 44 opposite to the side on which the base 41 is provided as illustrated in FIG. 28.

Fifth Embodiment (Die for Forming Daylighting Film)

Figure 29:
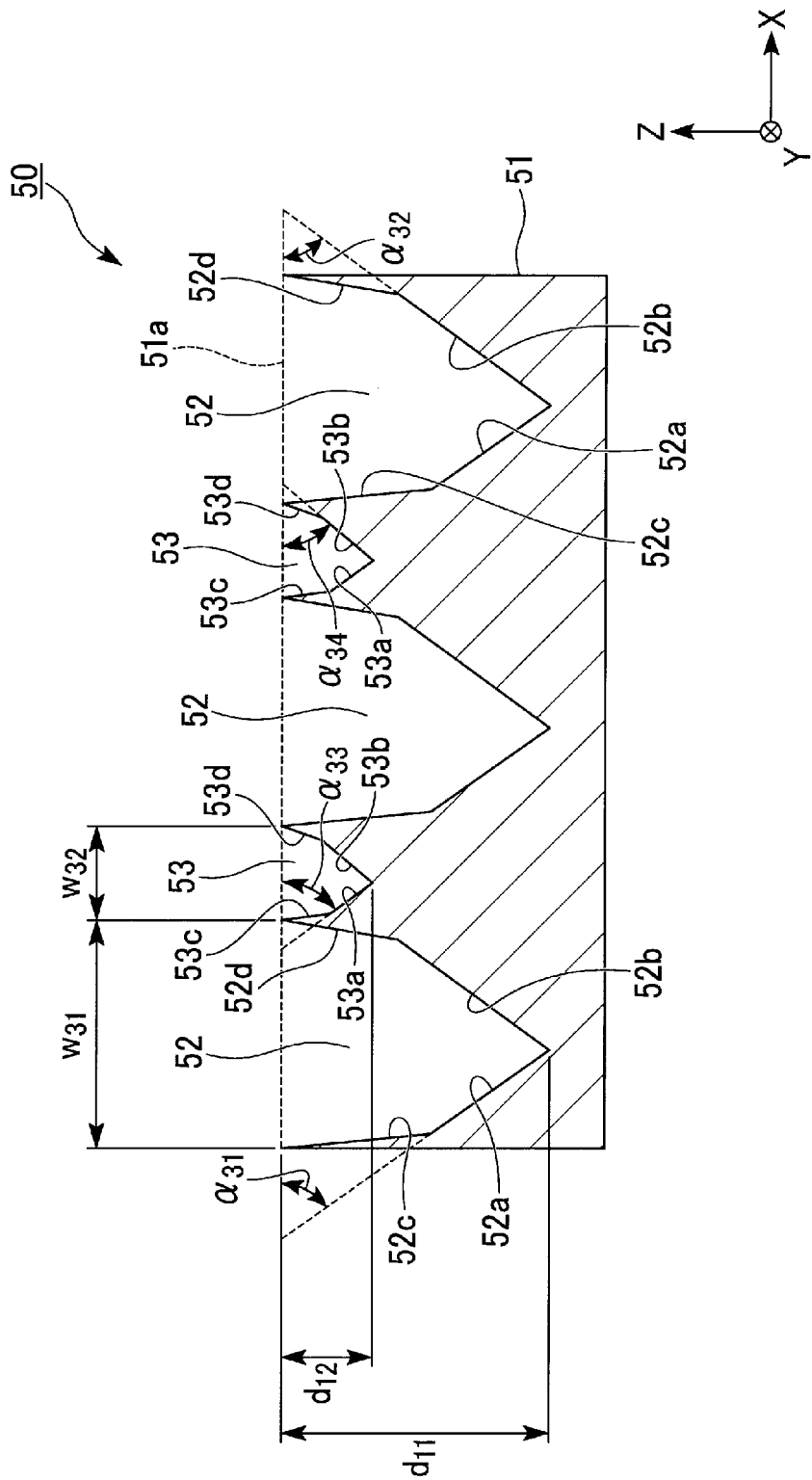
FIG. 29 is a sectional view illustrating a schematic configuration of a die for forming a daylighting film that is a fifth embodiment of the invention.

FIG. 29 is a sectional view illustrating a schematic configuration of a die for forming a daylighting film that is a fifth embodiment of the invention.

In FIG. 29, it is assumed that a Z-direction is a normal direction of a main body portion of the die for forming a daylighting film, a Y-direction is a direction orthogonal to the Z-direction, and an X-direction is a direction orthogonal to the Z-direction and the Y-direction.

As illustrated in FIG. 29, a die for forming a daylighting film (hereinafter, abbreviated as a "die") 50 of the present embodiment includes a main body portion 51 made of metal, a plurality of first concave portions 52 that are provided to be adjacent to each other on a side of one surface 51a (indicated with a broken line in FIG. 29) of the main body portion 51, and second concave portions 53 each of which is provided between the first concave portions 52 so as to be adjacent to the first concave portions 52.

In the die 50, a depth (a depth in the normal direction (Z-direction) of the main body portion 51) $d_{12}$ of the second concave portion 53 from the one surface 51a of the main body portion 51 is smaller than a depth (a depth in the normal direction (Z-direction) of the main body portion 51) $d_{11}$ of the first concave portion 52 from the one surface 51a of the main body portion 51.

In the die 50, an opening edge of the first concave portion 52 and an opening edge of the second concave portion 53 that are adjacent to each other are in contact.

The first concave portion 52 has a pair of inner side surfaces 52a and 52b and a pair of inner side surfaces 52c and 52d, in which the inner side surfaces of each pair are inclined in mutually different directions with respect to the one surface 51a of the main body portion 51 and face each other.

The second concave portion 53 has a pair of inner side surfaces 54a and 54b and a pair of inner side surfaces 54c and 54d, in which the inner side surfaces of each pair are inclined in mutually different directions with respect to the one surface 51a of the main body portion 51 and face each other.

The inner side surface 52a of the first concave portion 52 and the inner side surface 53a of the second concave portion 53 are preferably equal in inclination with respect to the one surface 51a of the main body portion 51.

The inner side surface 52b of the first concave portion 52 and the inner side surface 53b of the second concave portion 53 are preferably equal in inclination with respect to the one surface 51a of the main body portion 51.

The inner side surface 52c of the first concave portion 52 and the inner side surface 53c of the second concave portion 53 are preferably equal in inclination with respect to the one surface 51a of the main body portion 51.

The inner side surface 52d of the first concave portion 52 and the inner side surface 53d of the second concave portion 53 are preferably equal in inclination with respect to the one surface 51a of the main body portion 51.

Each of the plurality of first concave portions 52 substantially has one direction (Y-direction) as a longitudinal direction and the one direction is disposed in a direction parallel to one side of the main body portion 51 that has a rectangular shape, for example. In the case of the present embodiment, each of the plurality of first concave portions 52 is constituted as a concave portion which is extended in the Y-direction and has a stripe shape with a constant width. The longitudinal direction of each of the plurality of first concave portions 52 is disposed in a direction parallel to one side of the main body portion 51 that has the rectangular shape. In each of the plurality of first concave portions 52, a shape of a cross section (X-Z cross section) parallel to a width direction of the first concave portion 52 is a trapezoid, triangle, or polygon with at least five vertexes. FIG. 29 illustrates a case where the shape of the cross section parallel to the width direction of the first concave portion 52 is a pentagon (when the one surface 51a of the main body portion 51 is set to be a bottom side).

Each of the plurality of second concave portions 53 substantially has one direction (Y-direction) as a longitudinal direction and the one direction is disposed in a direction parallel to one side of the main body portion 51 that has a rectangular shape, for example. In the case of the present embodiment, each of the plurality of second concave portions 53 is constituted as a concave portion which is extended in the Y-direction and has a stripe shape with a constant width. The longitudinal direction of each of the plurality of second concave portions 53 is disposed in a direction parallel to one side of the main body portion 51 that has the rectangular shape. In each of the plurality of second concave portions 53, a shape of a cross section (X-Z cross section) parallel to a width direction of the second concave portion 53 is a trapezoid, triangle, or polygon with at least five vertexes. FIG. 29 illustrates a case where the shape of the cross section parallel to the width direction of the second concave portion 53 is a pentagon (when the one surface 51a of the main body portion 51 is set to be a bottom side).

When a width of the first concave portion 52 in the transverse direction is $w_{31}$, the widths $w_{31}$ of the plurality of first concave portions 52 in the transverse direction are almost equal. The width $w_{31}$ of the first concave portion 52 in the transverse direction is, for example, 10 μm to 50 μm.

Depths (depths in the normal direction (Z-direction) of the main body portion 51) $d_{11}$ of the plurality of first concave portions 52 from the one surface 51a of the main body portion 51 are almost equal. The depth $d_{11}$ of the first concave portion 52 is, for example, 10 µm to 100 µm.

When an angle formed by the inner side surface 52a of the first concave portion 52 and the one surface 51a of the main body portion 51 is an angle $\alpha_{31}$, the angles $\alpha_{31}$ of the plurality of first concave portions 52 are all equal. When an angle formed by the inner side surface 52b of the first concave portion 52 and the one surface 51a of the main body portion 51 is an angle $\alpha_{32}$, the angles $\alpha_{32}$ of the plurality of first concave portions 52 are all equal. The angle $\alpha_{31}$ of the first concave portion 52 is, for example, 60° to 80°. The angle $\alpha_{32}$ of the first concave portion 52 is, for example, 35° to 60°.

When a width of the second concave portion 53 in the transverse direction is $w_{32}$, the widths $w_{32}$ of the plurality of second concave portions 53 in the transverse direction may not be equal. The first concave portions 52 are formed in a nonuniform manner, resulting that the widths $w_{32}$ of the plurality of second concave portions 53 in the transverse direction may be different from each other. The width $w_{32}$ of the second concave portion 53 in the transverse direction is smaller than the width $w_{31}$ of the first concave portion 52 in the transverse direction ($w_{32}<w_{31}$).

When an angle formed by the inner side surface 53a of the second concave portion 53 and the one surface 51a of the main body portion 51 is an angle $\alpha_{33}$, the angles $\alpha_{33}$ of the plurality of second concave portions 53 are almost equal. When an angle formed by the inner side surface 53b of the second concave portion 53 and the one surface 51a of the main body portion 51 is an angle $\alpha_{34}$, the angles $\alpha_{34}$ of the plurality of second concave portions 53 are almost equal.

The angle $\alpha_{33}$ of the second concave portion 53 is almost equal to the angle $\alpha_{31}$ of the first concave portion 52. The angle $\alpha_{34}$ of the second concave portion 53 is almost equal to the angle $\alpha_{32}$ of the first concave portion 52.

Metal similar to the metal forming the main body portion 21 is used as the metal forming the main body portion 51.

With the die for forming a daylighting film 50 of the present embodiment, it is possible to easily form the daylighting film 40.

Figure 30:
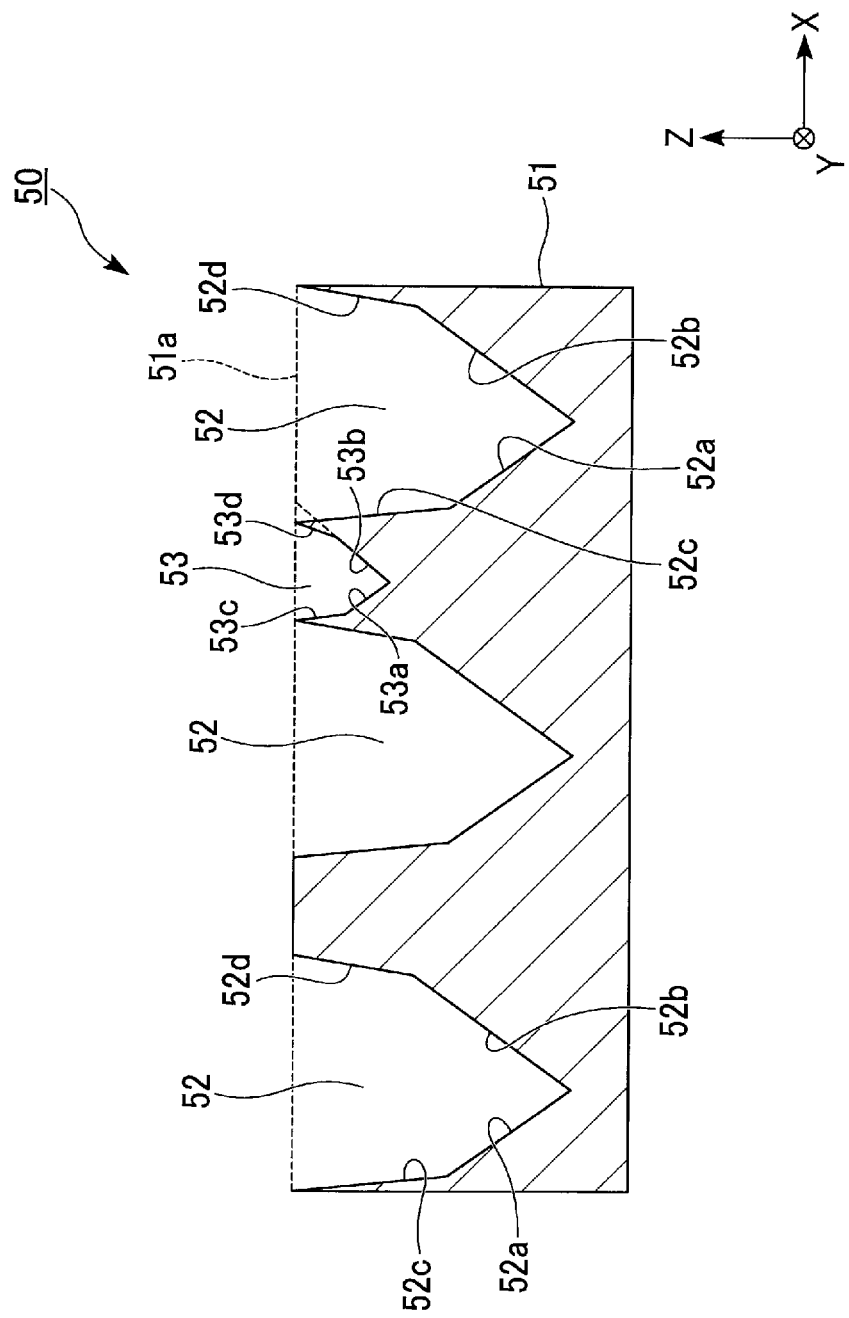
FIG. 30 is a sectional view illustrating another example of a schematic configuration of the die for forming a daylighting film that is the fifth embodiment of the invention.
Figure 31:
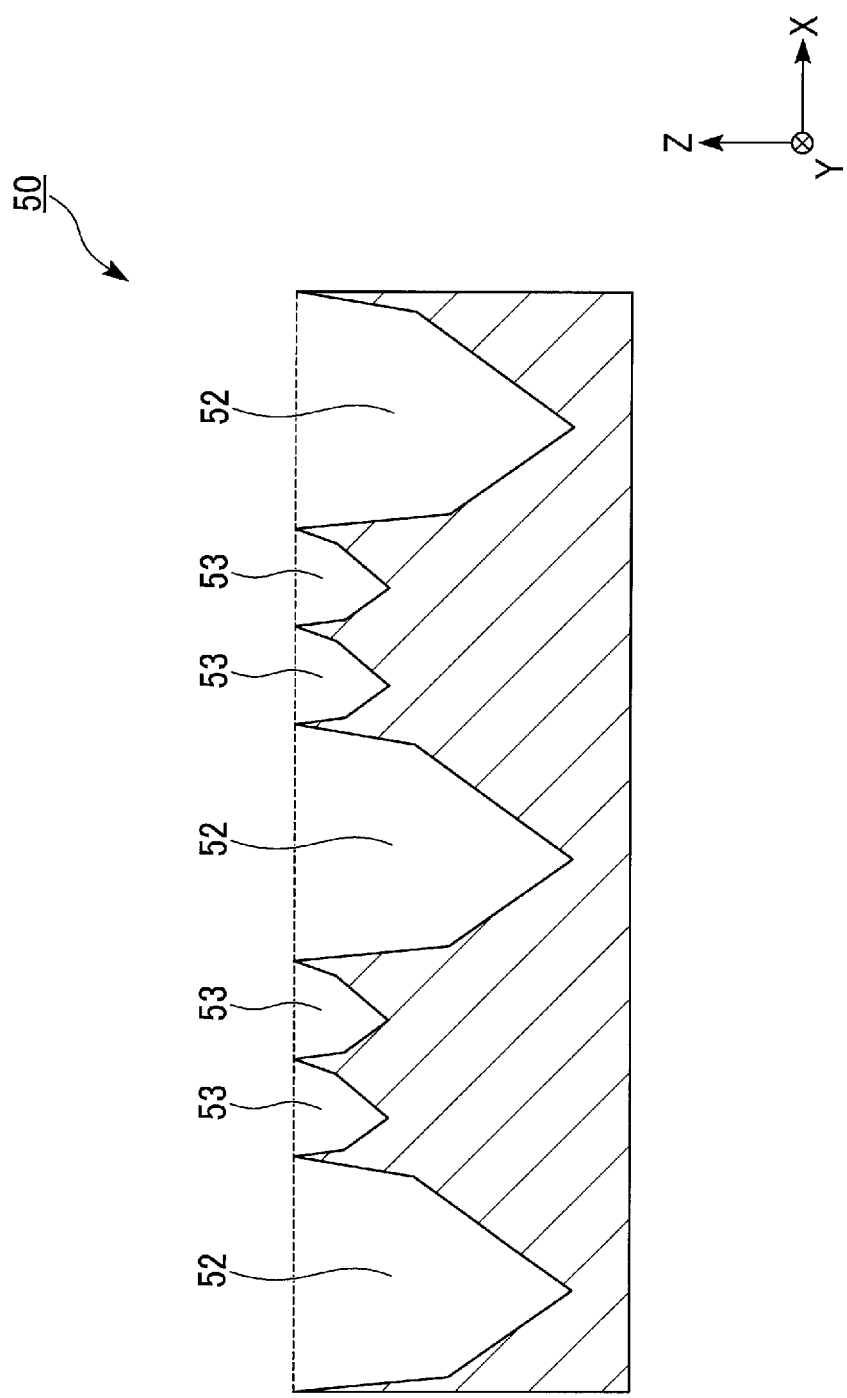
FIG. 31 is a sectional view illustrating another example of a schematic configuration of the die for forming a daylighting film that is the fifth embodiment of the invention.

Note that, though a case where one second concave portion 53 is provided in each of all regions between the plurality of first concave portions 52 in the main body portion 51 is exemplified in the present embodiment, the present embodiment is not limited thereto. In the present embodiment, as illustrated in FIG. 30, it is only required that the second concave portion 53 is provided in at least one of the regions between the plurality of first concave portions 52 in the main body portion 51. In addition, two or more second concave portions 53 may be provided in each of the regions between the plurality of first concave portions 52 in the main body portion 51 as illustrated in FIG. 31.

Figure 32:
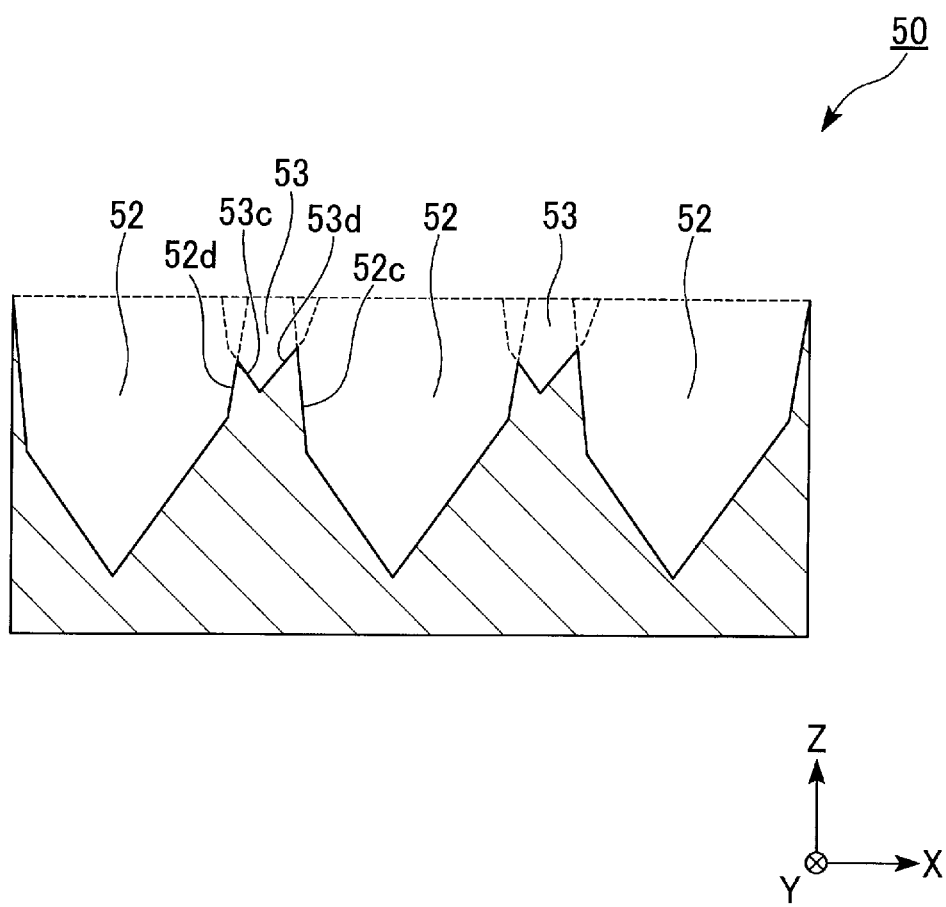
FIG. 32 is a sectional view illustrating another example of a schematic configuration of the die for forming a daylighting film that is the fifth embodiment of the invention.
Figure 33:
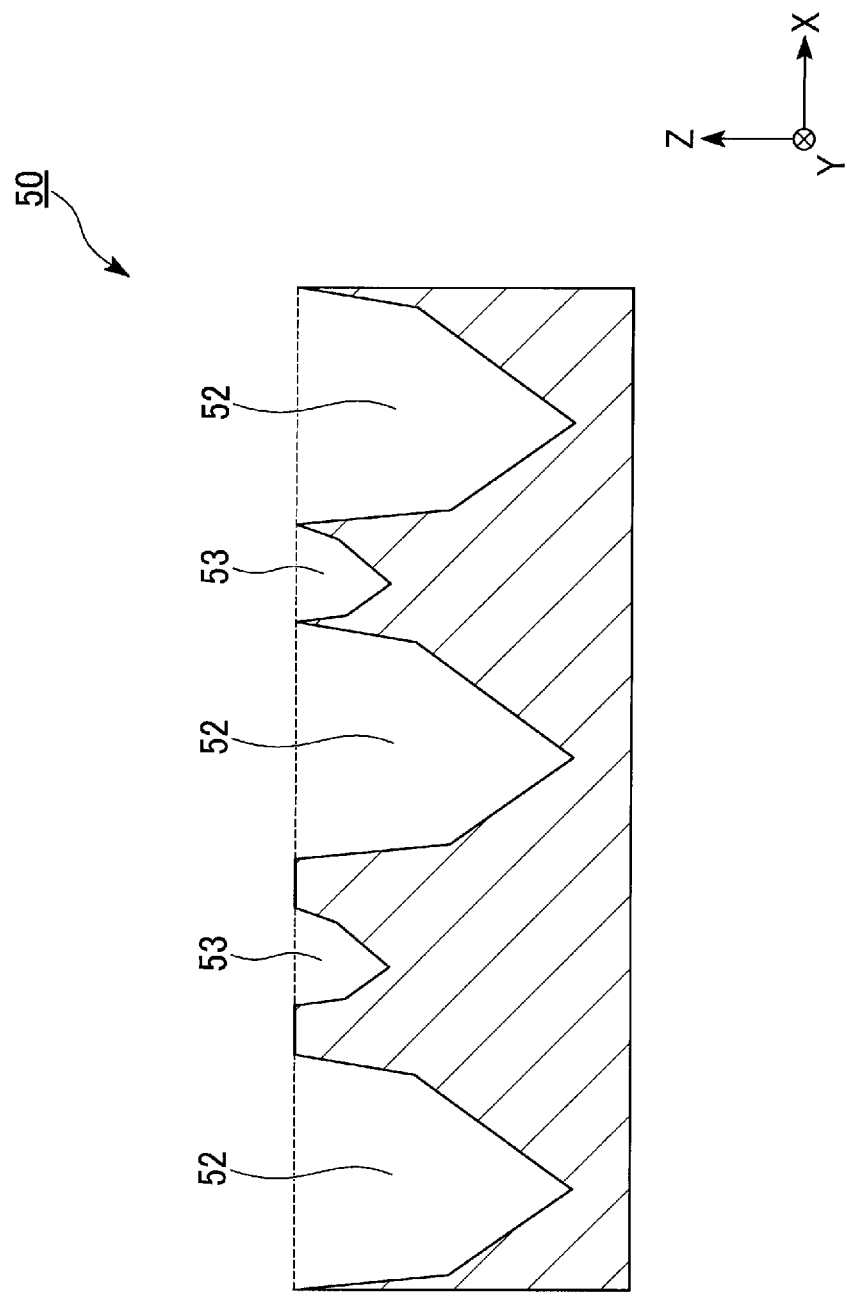
FIG. 33 is a sectional view illustrating another example of a schematic configuration of the die for forming a daylighting film that is the fifth embodiment of the invention.

Though a case where an edge of the first concave portion 52 and an edge of the second concave portion 53 that are adjacent to each other are in contact is exemplified in the present embodiment, the present embodiment is not limited thereto. In the present embodiment, as illustrated in FIG. 32, the edge of the first concave portion 52 and the edge of the second concave portion 53 that are adjacent to each other may be connected in such a manner that the inner side surface 52c of the first concave portion 52 on the side of the one surface 51a of the main body portion 51 and the inner side surface 53d of the second concave portion 53 on the side of the one surface 51a of the main body portion 51 that are adjacent to each other partially overlap each other, and that the inner side surface 52d of the first concave portion 52 on the side of the one surface 51a of the main body portion 51 and the inner side surface 53c of the second concave portion 53 on the side of the one surface 51a of the main body portion 51 that are adjacent to each other partially overlap each other.

In all the first concave portions 52 and second concave portions 53 which are adjacent to each other, a part of the first concave portions 52 and the second concave portions 53 which are adjacent to each other may not be in contact. For example, in a part of the first concave portions 52 and second concave portions 53 among the plurality of first concave portions 52 and second concave portions 53, a set of the first concave portion 52 and the second concave portion 53 which are adjacent to each other may be partially in contact. That is, the plurality of first concave portions 52 and second concave portions 53 include a configuration in which a set of the first concave portion 52 and the second concave portion 53 which are adjacent to each other is partially in contact, and a part of the other first concave portions 52 and second concave portions 53 which are adjacent to each other may not be in contact.

Figure 34:
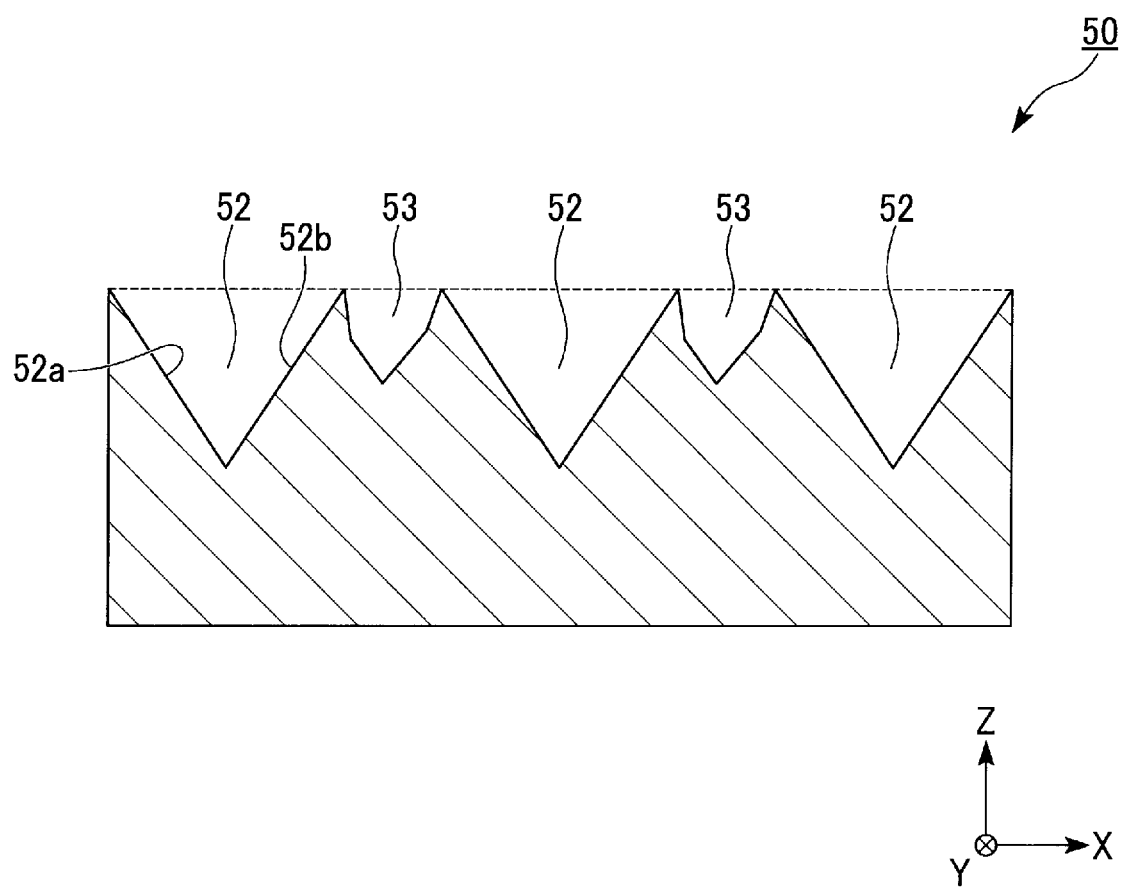
FIG. 34 is a sectional view illustrating another example of a schematic configuration of the die for forming a daylighting film that is the fifth embodiment of the invention.

Though a case where each of the first concave portions 52 has a pair of facing inner side surfaces 52a and 52b and a pair of facing inner side surfaces 52c and 52d is exemplified in the present embodiment, the present embodiment is not limited thereto. In the present embodiment, it is only required that the first concave portion 52 has at least a pair of facing inner side surfaces 52a and 52b as illustrated in FIG. 34.

Figure 35:
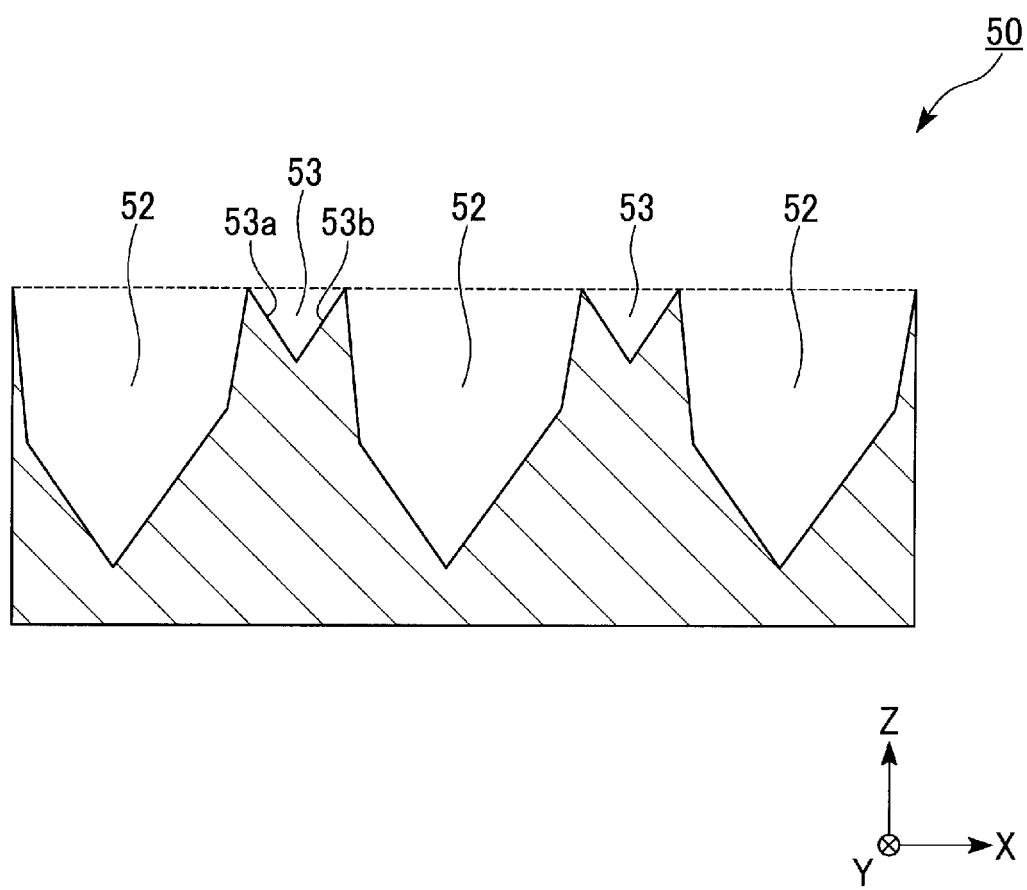
FIG. 35 is a sectional view illustrating another example of a schematic configuration of the die for forming a daylighting film that is the fifth embodiment of the invention.

Though a case where each of the second concave portions 53 has a pair of facing inner side surfaces 53a and 53h and a pair of facing inner side surfaces 53c and 53d is exemplified in the present embodiment, the present embodiment is not limited thereto. In the present embodiment, the second concave portion 53 is only required to have at least a pair of facing inner side surfaces. For example, as illustrated in FIG. 35, the second concave portion 53 is only required to have at least a pair of facing inner side surfaces 53a and 53b.

Sixth Embodiment (Manufacturing Method for Daylighting Film)

Figure 36:
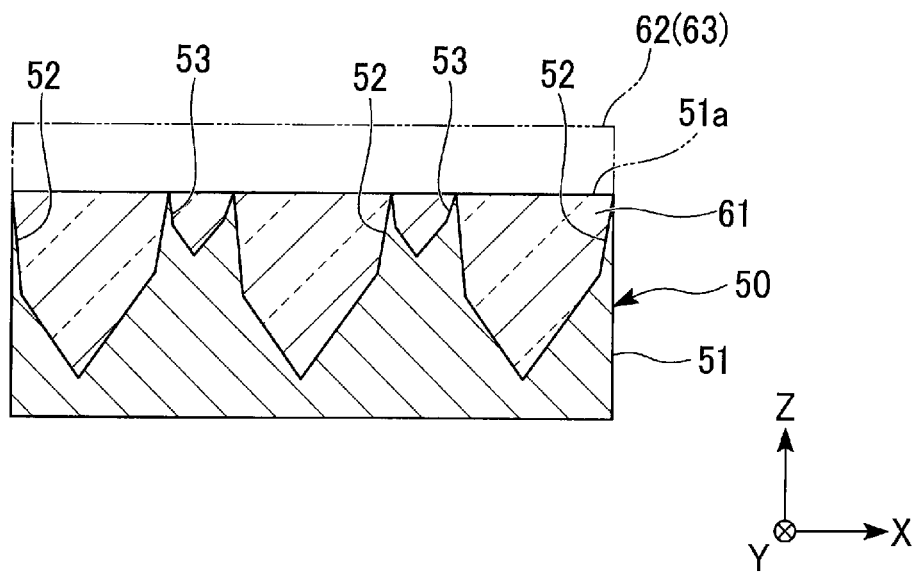
FIG. 36 is a schematic sectional view illustrating a manufacturing method for a daylighting film that is a sixth embodiment of the invention.
Figure 37:
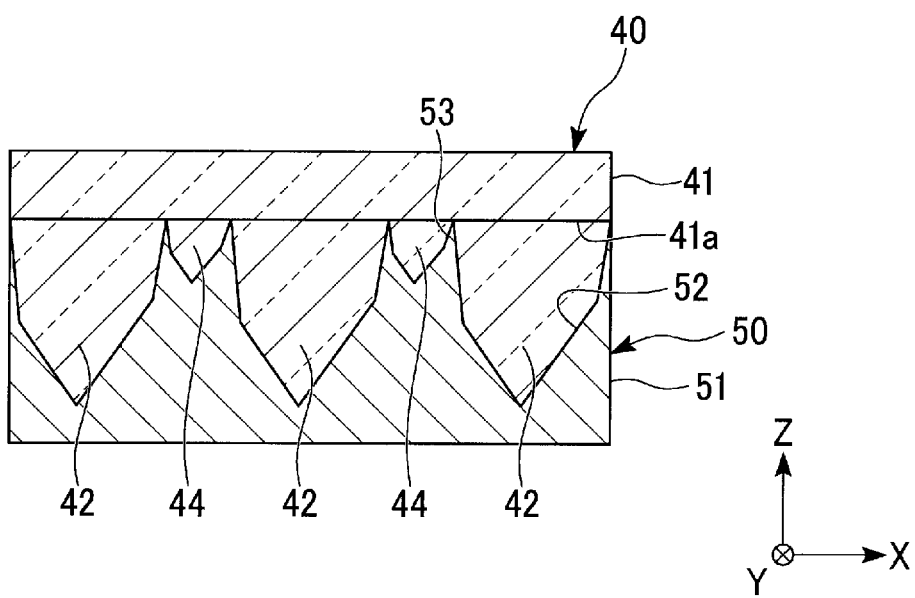
FIG. 37 is a schematic sectional view illustrating the manufacturing method for a daylighting film that is the sixth embodiment of the invention.
Figure 38:
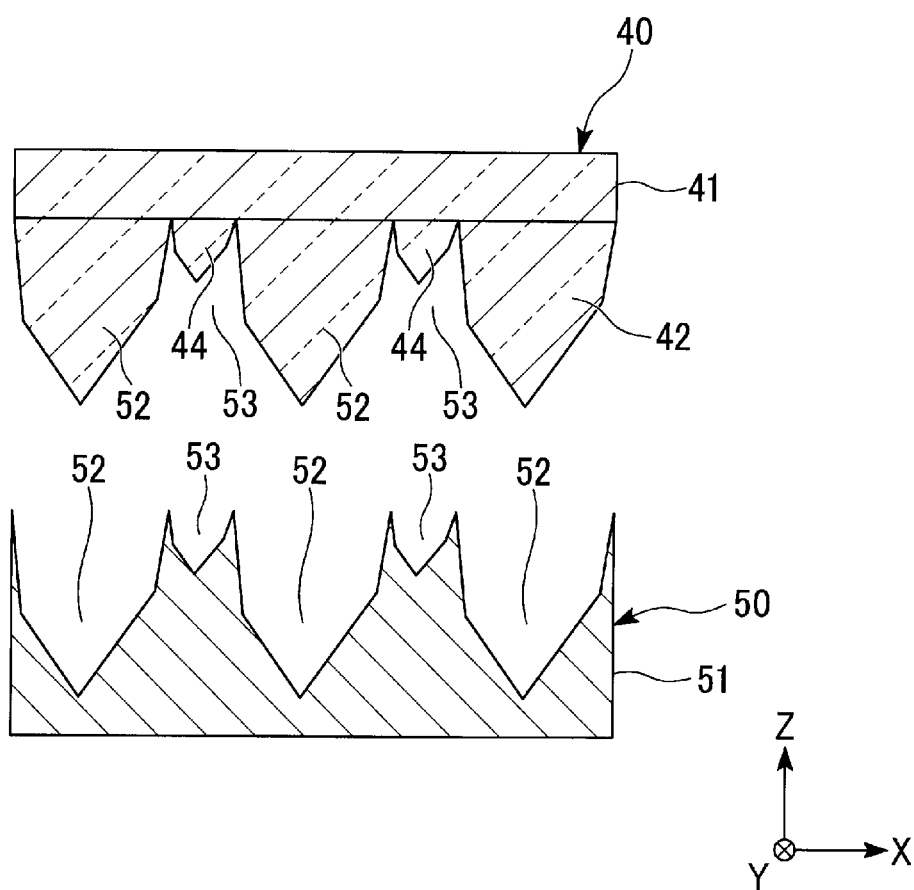
FIG. 38 is a schematic sectional view illustrating the manufacturing method for a daylighting film that is the sixth embodiment of the invention.

FIGS. 36 to 38 are schematic sectional views illustrating a manufacturing method for a daylighting film that is a sixth embodiment of the invention. In FIGS. 36 to 38, the same components as those of the daylighting film of the fourth embodiment illustrated in FIG. 20 and the die for forming a daylighting film of the fifth embodiment illustrated in FIG. 29 are given the same reference signs and description thereof will be omitted.

In FIGS. 36 to 38, it is assumed that a Z-direction is a normal direction of the main body portion of the die for forming a daylighting film, a Y-direction is a direction orthogonal to the Z-direction, and an X-direction is a direction orthogonal to the Z-direction and the Y-direction.

The manufacturing method for a daylighting film of the present embodiment is a method using the die for forming a daylighting film of the fifth embodiment described above.

As illustrated in FIG. 36, resin 61 having light-transmissive performance is applied onto the one surface 51a of the main body portion 51 of the die 50, and the resin 61 is filled in the first concave portions 52 and the second concave portions 53 (filling step).

As the resin 61 having light-transmissive performance, resin similar to the resin 31 is used.

At the filling step, as illustrated in FIG. 36, the resin 61 is filled in the first concave portions 52 and the second concave portions 53, and resin 62 having light-transmissive performance and serving as a base of the daylighting film is applied onto the resin 61, which is filled in the first concave portions 52 and the second concave portions 53, to have a predetermined thickness.

As the resin 62 having light-transmissive performance, resin similar to the resin 61 having light-transmissive performance is used.

In addition, at the filling step, as illustrated in FIG. 36, after the resin 61 is filled in the first concave portions 52 and the second concave portions 53, a base 63 that has light-transmissive performance, has a predetermined thickness, and serves as a base of the daylighting film may be attached onto the resin 61 that is filled in the first concave portions 52 and the second concave portions 53.

Next, as illustrated in FIG. 37, the resin 61 and the resin 62 are cured, so that the daylighting film 40 that includes the base 41 formed of the resin 62, the plurality of first protrusion portions 42 formed of the resin 61 and provided to be adjacent to each other on the one surface 41a of the base 41, and the plurality of second protrusion portions 44 formed of the resin 61 and provided to be adjacent to the first protrusion portions 42 on the one surface 41a of the base 41 is formed (daylighting film formation step).

In addition, at the daylighting film formation step, the resin 61 may be cured and the resin 61 may be bonded to the base 63, so that the daylighting film 40 that includes the base 41 (base 63), the plurality of first protrusion portions 42 formed of the resin 61 and provided to be adjacent to each other on the one surface 41a of the base 41, and the plurality of second protrusion portions 44 formed of the resin 61 and provided to be adjacent to the first protrusion portions 42 on the one surface 41a of the base 41 is formed.

Note that, the resin 61 is applied also onto a surface of the die 50 and the resin 61 that is cured on the surface of the die 50 becomes the base 41. The second protrusion portions 44 and the base 41 are molded by performing curing once.

Next, as illustrated in FIG. 38, the daylighting film 40 is separated from the die for forming a daylighting film 50 and the daylighting film 40 is obtained (separation step).

With the manufacturing method for a daylighting film of the present embodiment, it is possible to easily form the daylighting film 40.

In a case where a plurality of daylighting films formed as described above are arranged to be installed on a window surface, a shape of first protrusion portions, a shape or the like of second protrusion portions, a shape of the daylighting films may be different between bases.

Other Application

In addition to arrangement in which daylighting films are densely arranged to be installed on a window surface, a plurality of daylighting films with a unit length may be arranged to be applied to a product, such as a rolling screen or a blind, that controls a light amount on the window surface.

Seventh Embodiment (Rolling Screen)

Next, a rolling screen (daylighting device) 301 illustrated in FIGS. 39 and 40 will be described as a seventh embodiment of the invention, for example.

Figure 39:
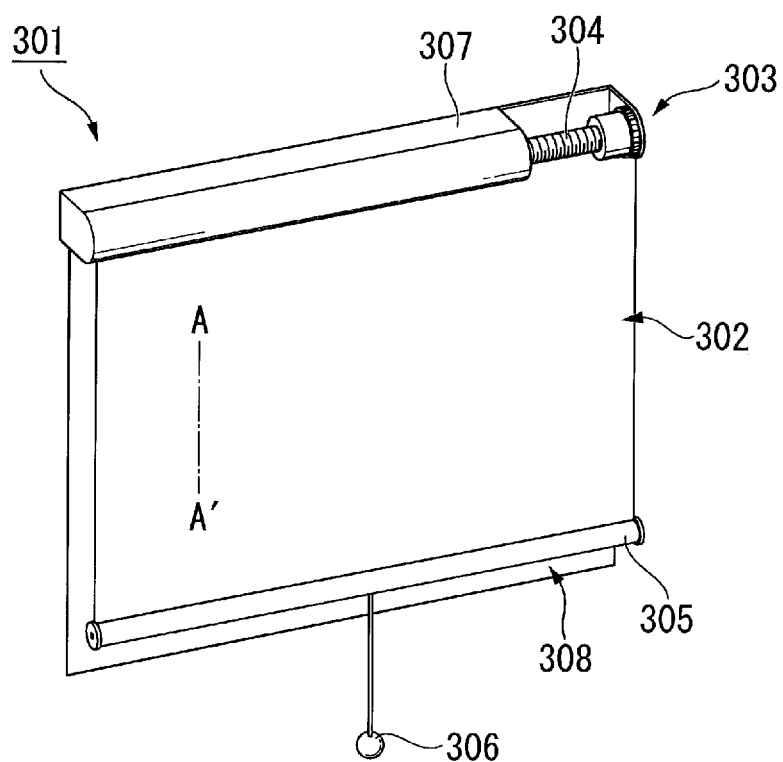
FIG. 39 is a perspective view illustrating a schematic configuration of a rolling screen.

FIG. 39 is a perspective view illustrating a schematic configuration of the rolling screen 301. FIG. 40 is a sectional view taken along a line A-A' of the rolling screen 301 illustrated in FIG. 39. In the following description, the description of the parts equivalent to those of the daylighting film described above will be omitted and the same reference signs are given in the drawings.

As illustrated in FIG. 39, the rolling screen 301 includes a daylighting screen 302 and a winding mechanism 303 which supports the daylighting screen 302 to be freely wound up.

Figure 40:
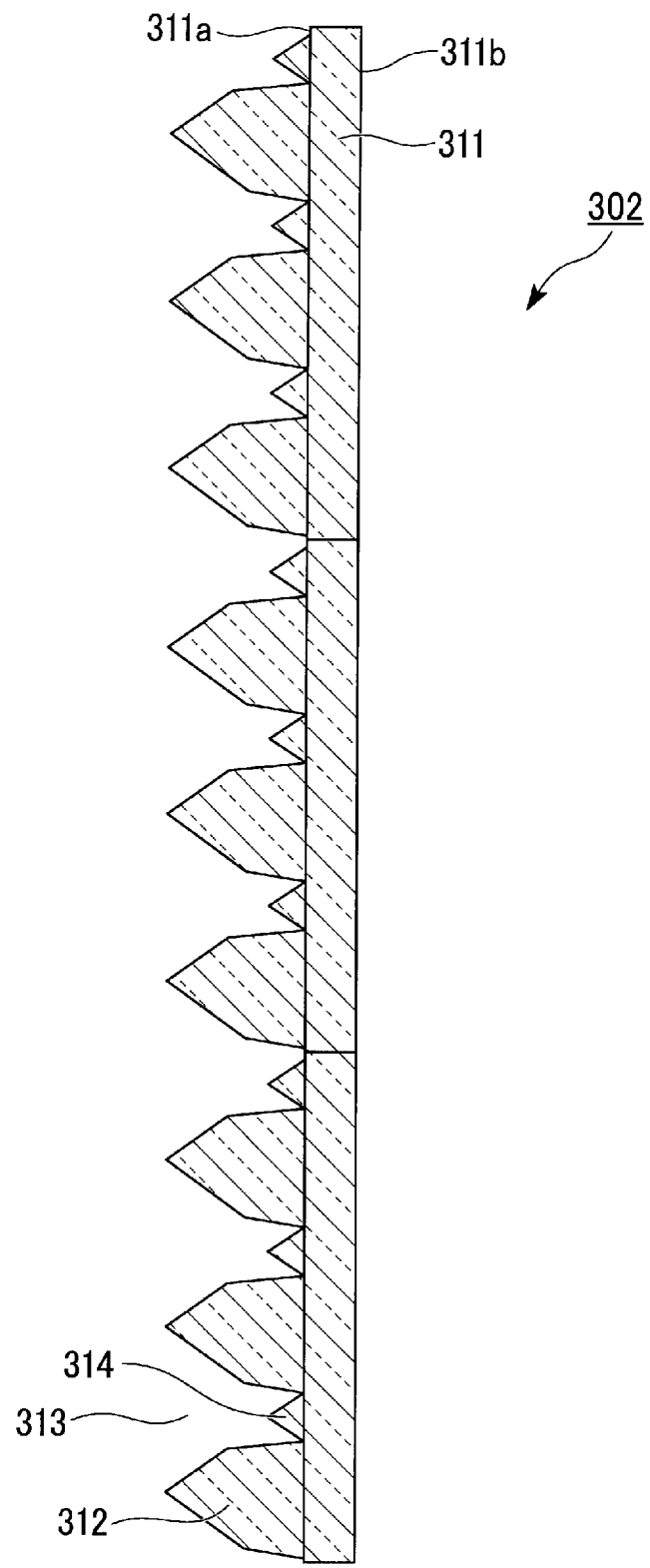
FIG. 40 is a sectional view taken along a line A-A' of the rolling screen illustrated in FIG. 39.

As illustrated in FIG. 40, the daylighting screen 302 includes a base 311 that has light-transmissive performance and has a film shape (sheet shape), a plurality of first protrusion portions 312 that have light-transmissive performance and are provided to be adjacent to each other on one surface 311a of the base 311, gap portions 313 each of which is provided between the first protrusion portions 312, and a plurality of second protrusion portions 314 each of which is provided in each of the gap portions 313 so as to be adjacent to the first protrusion portions 312 on the one surface 311a of the base 311 and is formed of the same material as that of the first protrusion portions 312, and takes external light through the first protrusion portions 312, the second protrusion portions 314, and the base 311. The daylighting screen 302 basically has the same structure as that of the daylighting film 10, 20, 30, or 40. However, a thickness of the base 311 is a thickness suitable for the rolling screen 301.

As illustrated in FIG. 39, the winding mechanism 303 includes a core (support member) 304 attached along an upper end part of the daylighting screen 302, a bottom tube (support member) 305 attached along a lower end part of the daylighting screen 302, a pulling cord 306 attached to the center of the lower end part of the daylighting screen 302, and an accommodation case 307 which accommodates the daylighting screen 302 wound around the core 304.

As a pull-cord type, the winding mechanism 303 is able to fix the daylighting screen 302 at a pulled position, or automatically wind the daylighting screen 302 around the core 304 by further pulling the pulling cord 306 from the pulled position and thereby releasing the fixation. The winding mechanism 303 is not limited to such a pull-cord type, and may be, for example, a winding mechanism of a chain type that rotates the core 304 with a chain or an automatic winding mechanism that rotates the core 304 with a motor.

The rolling screen 301 having such a configuration is used in a state where the accommodation case 307 is fixed to the upper part of the window glass 308 and the daylighting screen 302 accommodated in the accommodation case 307 opposes the inner surface of the window glass 308 while pulling the daylighting screen 302 with the pulling cord 306. At this time, the daylighting screen 302 is disposed in a direction in which an arrangement direction of a plurality of first protrusion portions 312 and a plurality of second protrusion portions 314 with respect to the window glass 308 coincides with a vertical direction (perpendicular direction) of the window glass 308. That is, the daylighting screen 302 is disposed so that the longitudinal direction of the plurality of first protrusion portions 312 and the plurality of second protrusion portions 314 with respect to the window glass 308 coincides with the transverse direction (horizontal direction) of the window glass 308.

The daylighting screen 302 opposing the inner surface of the window glass 308 directs the light, which has entered into the room through the window glass 308, toward the ceiling in the room, while changing a travelling direction of the light with the plurality of first protrusion portions 312 and the plurality of second protrusion portions 314. The light travelling to the ceiling is reflected by the ceiling and illuminates the inside of the room, and thus the light is used instead of illumination light. Accordingly, in a case where such a rolling screen 301 is used, it is possible to expect an energy saving effect of saving energy consumed by lighting equipment in a building in the daytime.

As described above, in a case where the rolling screen 301 of the present embodiment is used, it is possible to efficiently guide outdoor natural light (sunlight) into the room, cause a person in the room to feel that the deep inside of the room is bright, without being dazzled, and prevent fluctuation of an illumination position accompanied with the altitude change of the sun.

Although not illustrated, as the rolling screen according to the present embodiment of the invention, in addition to the configuration of the rolling screen 301, a functional film such as a light diffusion film for diffusing light in a direction facing the glare region G or a heat insulation film having light-transmissive performance for insulating radiant heat of natural light (sunlight) may be disposed on the other surface 311b side of the first base 311, for example.

Eighth Embodiment (Blind)

Next, a blind (daylighting device) 401 illustrated in FIG. 41 will be described as an eighth embodiment of the invention, for example.

Figure 41:
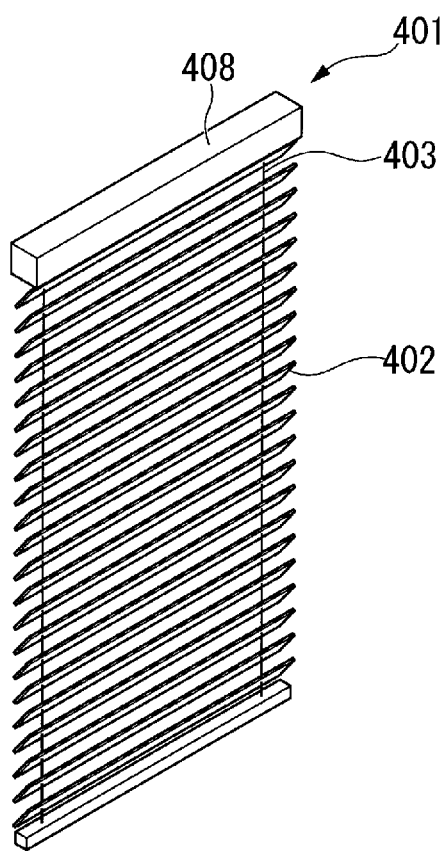
FIG. 41 is a perspective view illustrating a schematic configuration of a blind.
Figure 42A:
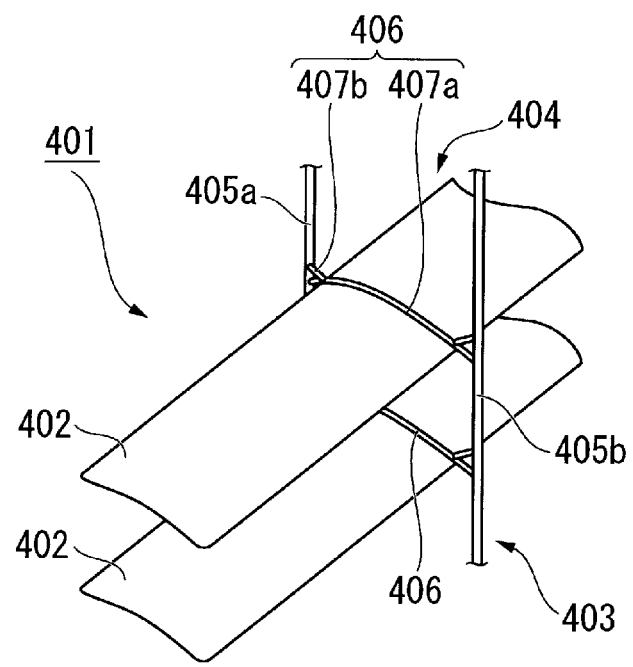
FIG. 42A is a first perspective view illustrating a schematic configuration of the blind.
Figure 42B:
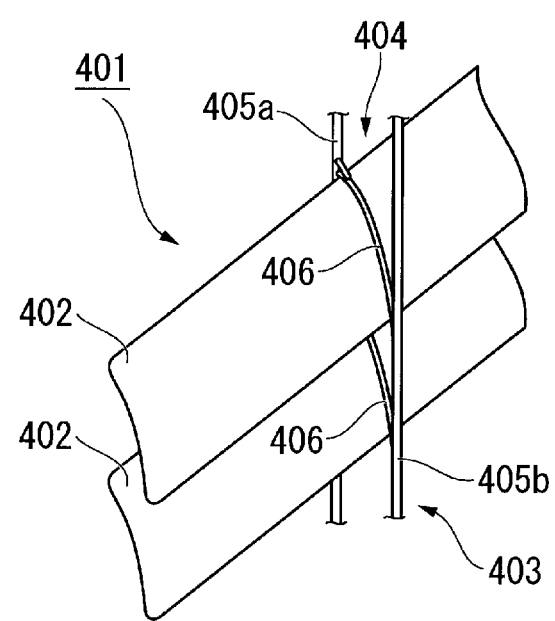
FIG. 42B is a second perspective view illustrating a schematic configuration of the blind.

FIG. 41 is a perspective view illustrating a schematic configuration of a blind. FIGS. 42A and 42B are perspective views each illustrating a schematic configuration of the blind 401. FIG. 42A illustrates an opened state of the blind 401 and FIG. 42B illustrates a closed state of the blind 401.

In the following description, the description of similar parts to those of the daylighting film 10, 20, 30, or 40 will be omitted and the same reference signs are given in the drawings.

As illustrated in FIG. 41, the blind 401 includes a plurality of daylighting slats 402 disposed to be arranged at predetermined intervals, a tilting mechanism (support mechanism) 403 which supports the plurality of daylighting slats 402 to be freely tilted, and an accommodation mechanism 408 which folds and accommodates the plurality of daylighting slats 402 linked with the tilting mechanism (support mechanism) 403 so as to be able to be input and output.

Figure 43:
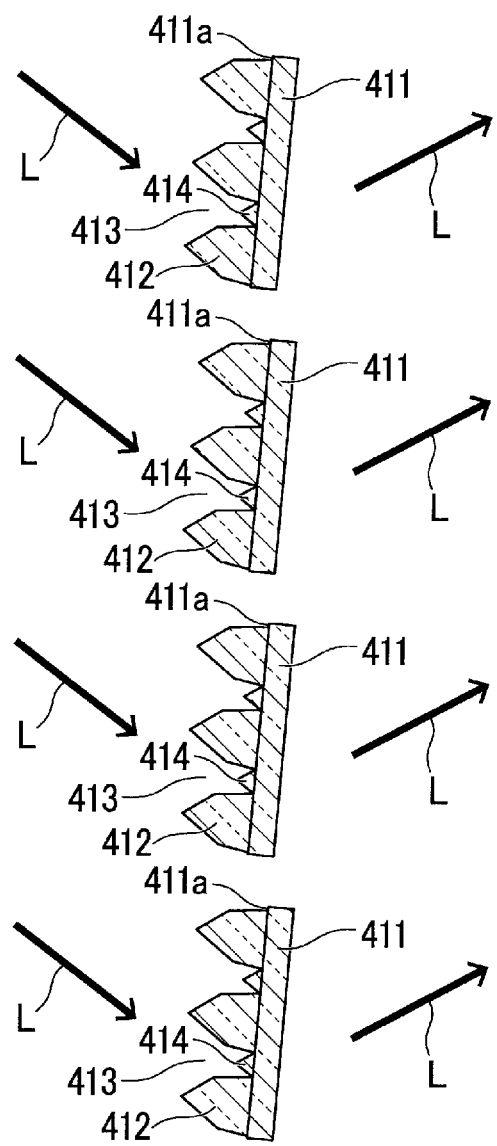
FIG. 43 is a sectional view illustrating a schematic configuration of daylighting slats included in the blind.

As illustrated in FIG. 43, each of the plurality of daylighting slats 402 is a daylighting member including a base 411 that has light-transmissive performance and has a film shape (sheet shape), a plurality of first protrusion portions 412 that have light-transmissive performance and are provided to be adjacent to each other on one surface 411a of the base 411, gap portions 413 each of which is provided between the first protrusion portions 412, and a plurality of second protrusion portions 414 each of which is provided in each of the gap portions 413 so as to be adjacent to the first protrusion portions 412 on the one surface 411a of the base 411 and is formed of the same material as that of the first protrusion portions 412. Each of the daylighting slats 402 basically has the same structure as that of the daylighting film 10, 20, 30, or 40.

However, a shape of the base 411 is different from that of the daylighting film of each of the embodiments described above.

The tilting mechanism 403 includes a plurality of ladder cords 404. Although not illustrated, the plurality of ladder cords 404 are arranged in a longitudinal direction of the daylighting slats 402 to thereby support the plurality of daylighting slats 402. Specifically, the ladder cords 404 include a pair of vertical cords 405a and 405b arranged in parallel to each other, and a plurality of horizontal cords 406 each of which is stretched between the vertical cords 405a and 405b and which are arranged at equivalent intervals in the longitudinal direction of the vertical cords 405a and 405b. In the ladder cord 404, the daylighting slat 402 is held between the vertical cords 405a and 405b while the daylighting slat 402 is interposed with a pair of holding cords 407a and 407b constituting the horizontal cord 406.

Although not illustrated, the tilting mechanism 403 includes an operation mechanism that moves the pair of vertical cords 405a and 405b in a vertical direction to be reverse to each other. In the tilting mechanism 403, it is possible to tilt the plurality of daylighting slats 402 while synchronizing the daylighting slats 402 with each other, with the movement operation of the pair of vertical cords 405a and 405b performed by the operation mechanism.

The blind 401 having the configuration as described above is used in a state of being suspended from an upper part of a window glass (not illustrated) and opposing an inner surface of the window glass. At that time, each of the daylighting slats 402 is disposed in a direction in which the arrangement direction of the plurality of first protrusion portions 312 and the plurality of second protrusion portions 314 with respect to the window glass coincides with the vertical direction (perpendicular direction) of the window glass. In other words, the daylighting slat 402 is disposed so that an extending direction of the plurality of first protrusion portions 312 and the plurality of second protrusion portions 314 with respect to the window glass coincides with the transverse direction (horizontal direction) of the window glass.

As illustrated in FIG. 43, the blind 401 opposing the inner surface of the window glass directs the light L, which has entered into the room through the window glass, toward the ceiling in the room, while changing a travelling direction of the light with the plurality of first protrusion portions 312 and the plurality of second protrusion portions 314. The light L travelling to the ceiling is reflected by the ceiling and illuminates the inside of the room, and thus the light is used instead of illumination light. Accordingly, in a case where such a blind 401 is used, it is possible to expect an energy saving effect of saving energy consumed by lighting equipment in a building in the daytime.

In the blind 401, it is possible to adjust an angle of the light L travelling to the ceiling by tilting the plurality of daylighting slats 402. In addition, it is possible to adjust the light incident from between the plurality of daylighting slats 402.

[Daylighting System]

Figure 44:
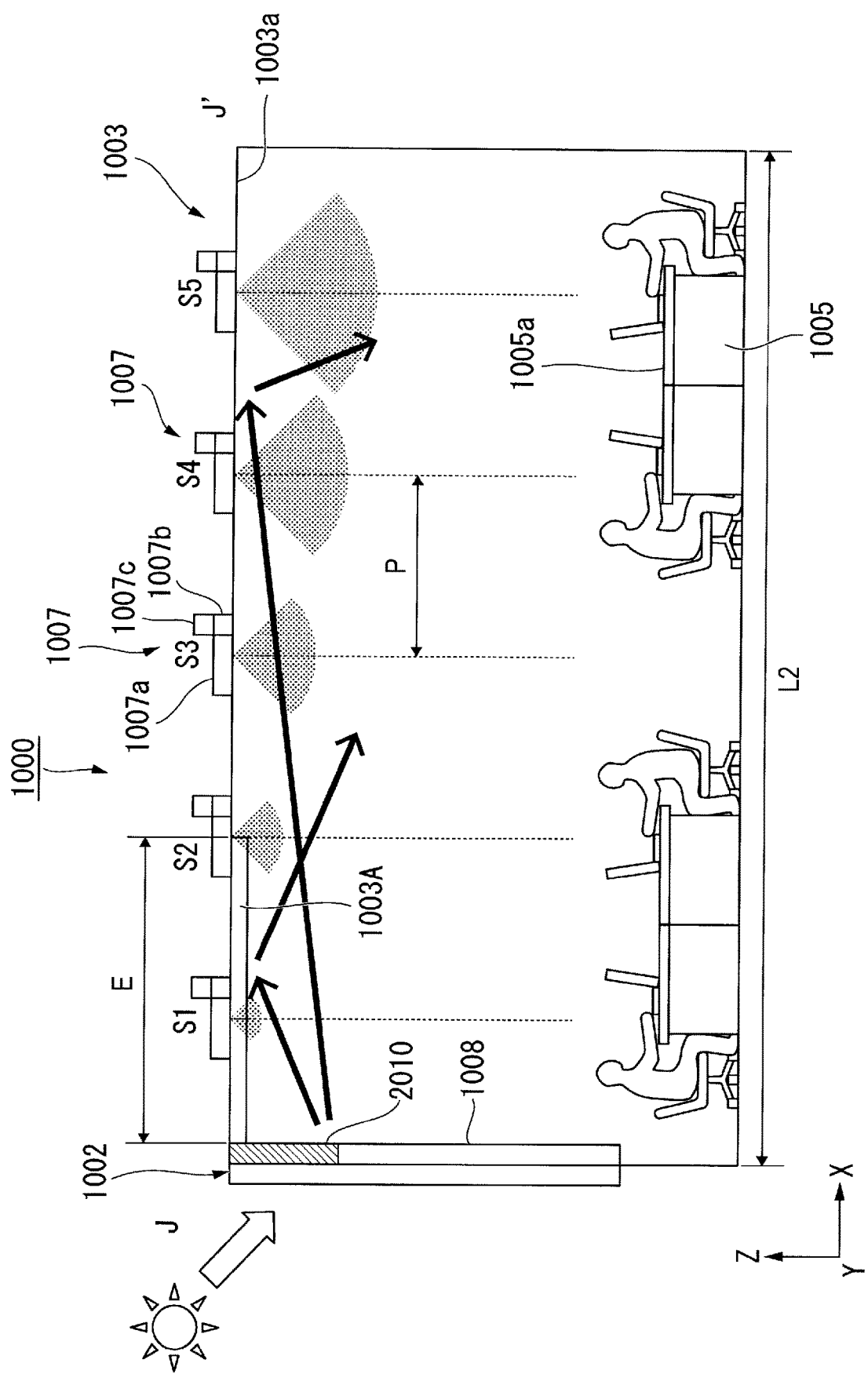
FIG. 44 illustrates a room model including a daylighting film and a lighting control system and is a sectional view taken along a line J-J' of FIG. 45.
Figure 45:
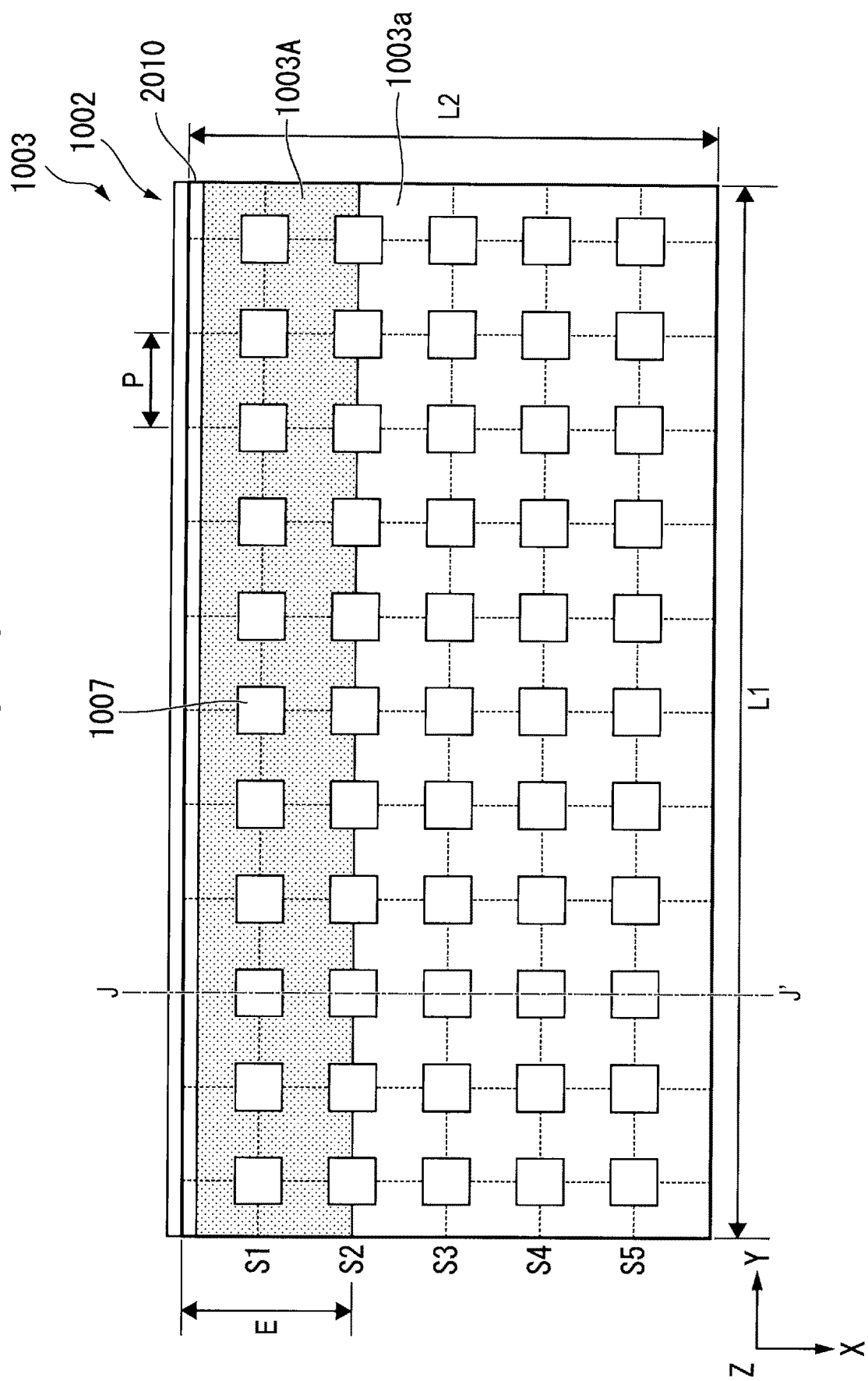
FIG. 45 is a plan view illustrating a ceiling of the room model.
Figure 46:
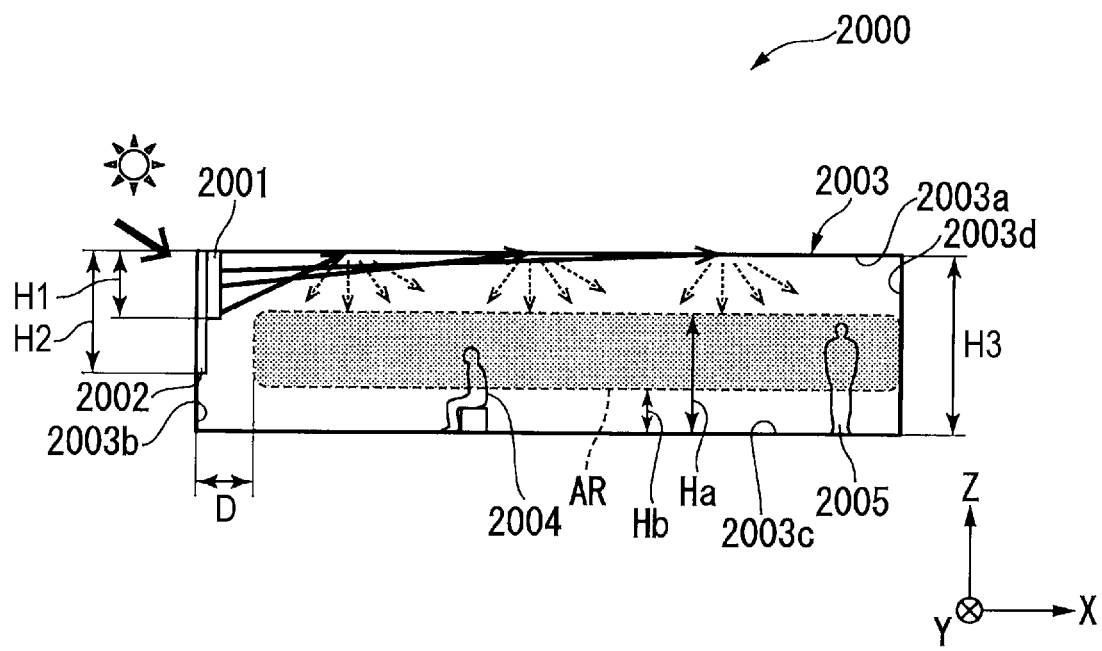
FIG. 46 illustrates an example of the room model.
Figure 47:
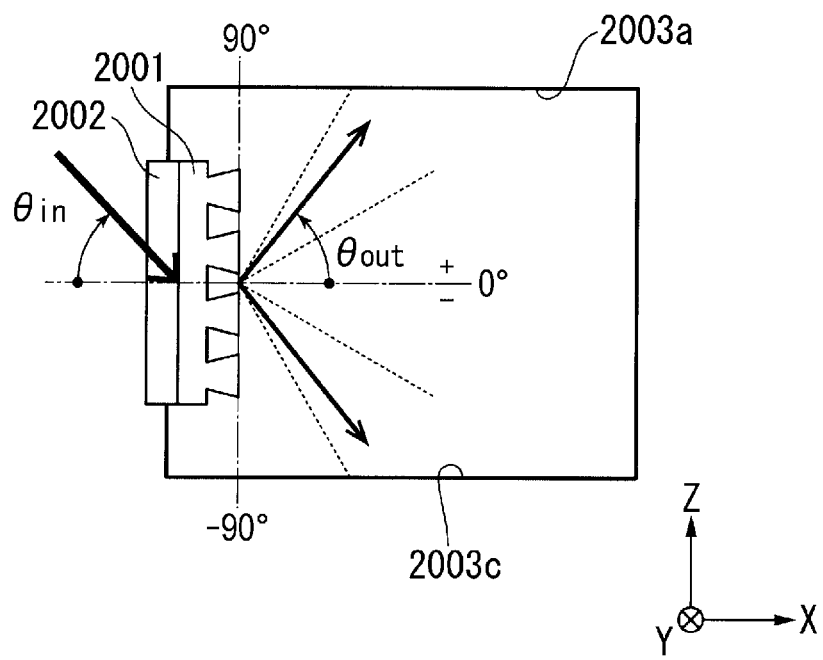
FIG. 47 is an explanatory view of a light incoming angle and a light outgoing angle.
Figure 48:
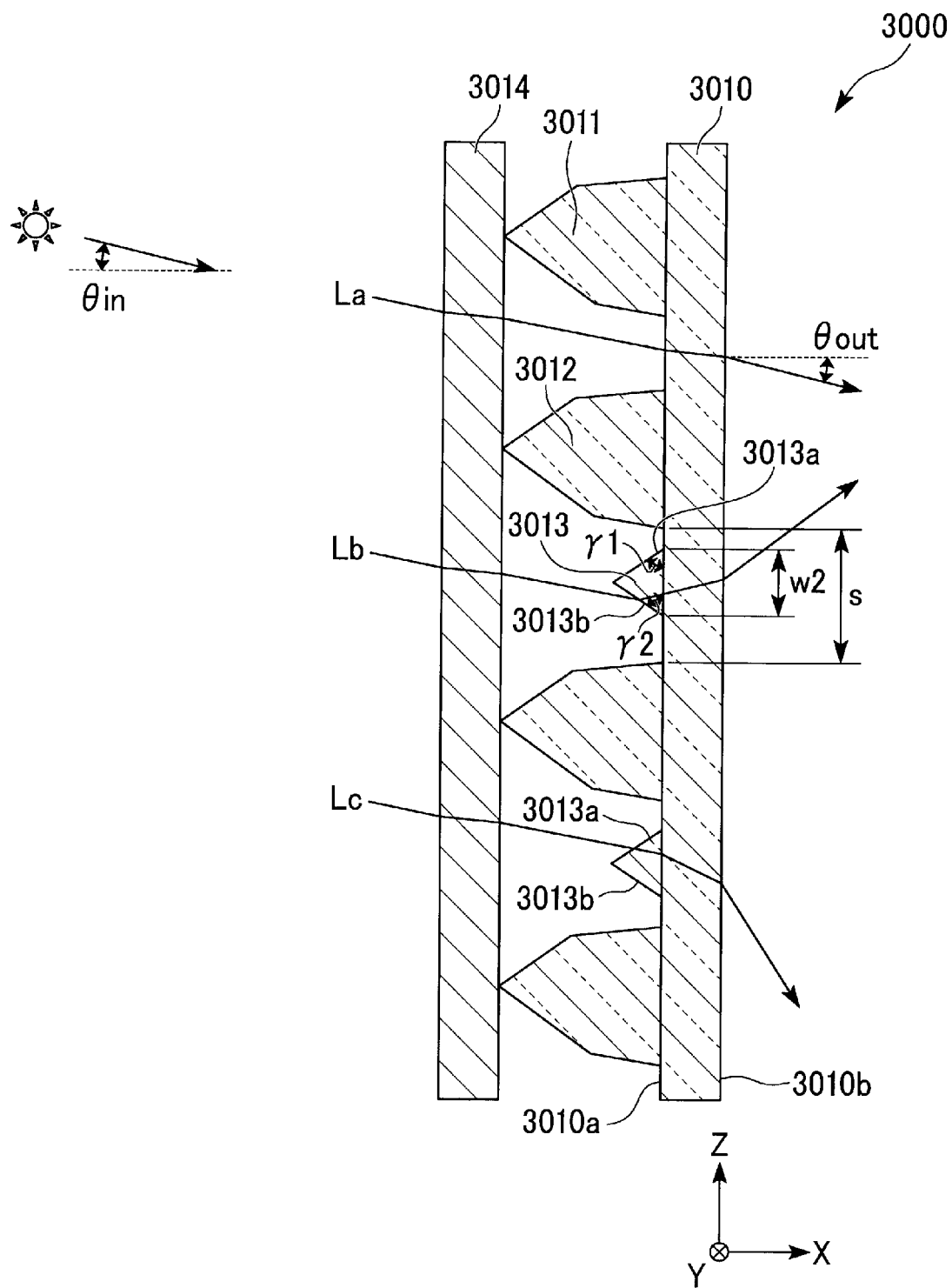
FIG. 48 is a sectional view illustrating a schematic configuration of a conventional daylighting film.
Figure 49A:
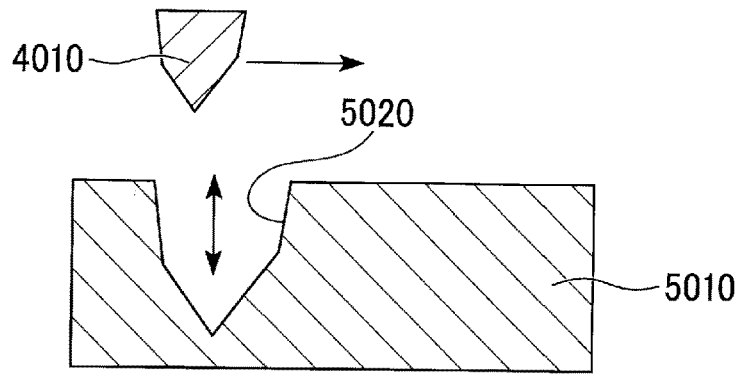
FIG. 49A is a first schematic sectional view illustrating a conventional manufacturing method for a daylighting film.
Figure 49B:
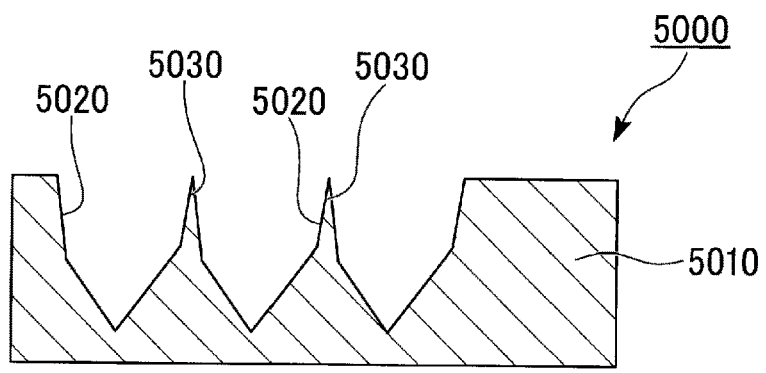
FIG. 49B is a second schematic sectional view illustrating the conventional manufacturing method for a daylighting film.
Figure 49C:
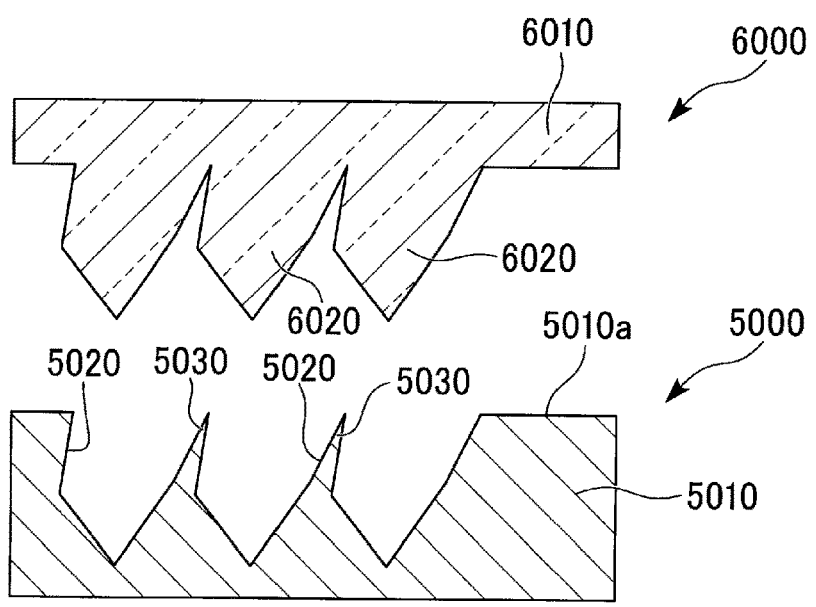
FIG. 49C is a third schematic sectional view illustrating the conventional manufacturing method for a daylighting film.

FIG. 44 illustrates a room model 1000 including a daylighting film and a lighting control system and is a sectional view taken along a line J-J' of FIG. 45. FIG. 45 is a plan view illustrating a ceiling of the room model 1000.

In the room model 1000, a ceiling material constituting a ceiling 1003a of a room 1003 into which external light is guided may have high light reflectivity. As illustrated in FIGS. 44 and 45, a light-reflective ceiling material 1003A is installed on the ceiling 1003a of the room 1003 as a ceiling material having light reflectivity. The light-reflective ceiling material 1003A is used for the purpose of promoting the guiding of external light from a daylighting film 1010 installed on a window 1002 into deep inside the room, and therefore installed on the ceiling 1003a on a window side.

Specifically, the light-reflective ceiling material 1003A is installed in a predetermined region E (a region within about 3 m from the window 1002) of the ceiling 1003a.

As described above, the light-reflective ceiling material 1003A functions to efficiently guide, to deep inside the room, external light which is guided into the room through the window 1002 on which the daylighting film 1010 (the daylighting film of any embodiment described above) is installed. The external light guided to the ceiling 1003a in the room from the daylighting film 1010 is reflected by the light-reflective ceiling material 1003A and a direction of the light is changed to illuminate a desk top surface 1005a of a desk 1005 which is placed in the deep inside of the room, so that an effect of making the desk top surface 1005a bright is exhibited.

The light-reflective ceiling material 1003A may have diffusion reflectivity or may have specular reflectivity, but preferably has both properties mixed appropriately in order to achieve both the effect of making the desk top surface 1005a of the desk 1005 placed in the deep inside of the room bright and the effect of suppressing glare light uncomfortable for a person in the room.

Though most of the light guided into the room by the daylighting film 1010 travels to the ceiling near the window 1002, an amount of light is sufficient near the window 1002 in many cases. Thus, the light-reflective ceiling material 1003A as described above is used in combination, and thereby it is possible to allocate the light incident on the ceiling (region E) near the window to the deep inside of the room where an amount of light is less than that near the window side.

The light-reflective ceiling material 1003A is able to be created, for example, by embossing a metal plate made of aluminum or the like with unevenness of about several tens of microns or by applying vapor deposition of a metal thin film made of aluminum or the like to a surface of a resin base on which similar unevenness is formed. Alternatively, unevenness may be formed by embossing a curved surface with longer intervals.

Further, by appropriately changing an embossing shape to be formed on the light-reflective ceiling material 1003A, it is possible to control light distribution characteristics of light and distribution of light in the room. For example, when the embossment is performed in a stripe shape extending to the deep inside of the room, the light reflected by the light-reflective ceiling material 1003A expands in a right-and-left direction (a direction intersecting a longitudinal direction of unevenness) of the window 1002. When a size and a direction of the window 1002 of the room 1003 are limited, by using such a property, it is possible to diffuse the light in a horizontal direction and reflect the light toward the deep inside of the room by the light-reflective ceiling material 1003A.

The daylighting film 1010 is used as a part of a lighting control system of the room 1003.

The lighting control system is constituted by components of the entire room, for example, including the daylighting film 1010, a plurality of indoor lighting devices 1007, a solar radiation adjustment device 1008 installed on the window, a control system for those components, and the light-reflective ceiling material 1003A installed on the ceiling 1003a.

The window 1002 of the room 1003 has the daylighting film 1010 installed on an upper side thereof and has the solar radiation adjustment device 1008 installed on a lower side thereof. Here, a blind is installed as the solar radiation adjustment device 1008, but there is no limitation thereto.

In the room 1003, the plurality of indoor lighting devices 1007 are arranged in a lattice manner in the right-and-left direction (Y-direction) of the window 1002 and in a depth direction (X-direction) of the room. The plurality of indoor lighting devices 1007 constitute the entire lighting system of the room 1003 along with the daylighting film 1010.

As illustrated in FIGS. 44 and 45, for example, the ceiling 1003a of an office in which a length $L_1$ of the window 1002 in the right-and-left direction (Y-direction) is 18 m and a length $L_2$ of the room 1003 in the depth direction (X-direction) is 9 m is illustrated. Here, the indoor lighting devices 1007 are arranged in a lattice manner at each interval P of 1.8 m in the transverse direction (Y-direction) and a depth direction (X-direction) of the ceiling 1003a.

More specifically, fifty indoor lighting devices 1007 are arrayed with 11 rows (Y-direction)×5 columns (X-direction).

Each of the indoor lighting devices 1007 includes indoor lighting equipment 1007a, a brightness detection portion 1007b, and a control portion 1007c, and is formed with the brightness detection portion 1007b and the control portion 1007c integrated with the indoor lighting equipment 1007a.

The indoor lighting devices 1007 may include a plurality of pieces of indoor lighting equipment 1007a and a plurality of brightness detection portions 1007b. However, one brightness detection portion 1007b is provided for each piece of indoor lighting equipment 1007a. The brightness detection portion 1007b receives light reflected by a surface to be illuminated by the indoor lighting equipment 1007a and detects illuminance of the illuminated surface. Here, the illuminance on the desk top surface 1005a of the desk 1005 placed in the room is detected by the brightness detection portion 1007b.

The control portions 1007c each of which is provided in each of the indoor lighting devices 1007 are connected to each other. Each of the indoor lighting devices 1007 performs feedback control, by the control portions 1007c connected to each other, to adjust a light output of an LED lamp of each indoor lighting equipment 1007a so that the illuminance on the desk top surface 1005a that is detected by each brightness detection portion 1007b is a certain target illuminance L0 (for example, average illuminance: 750 lx).

According to the daylighting system of the present embodiment, by linking daylighting from the daylighting film 1010, which varies with the sunlight, and the indoor lighting devices 1007, it is possible to obtain constant illuminance regardless of time or a position of the room 1003 and achieve both a comfortable environment and efficient power saving.

INDUSTRIAL APPLICABILITY

Some aspects of the invention are able to be used for a daylighting film, a window glass, a rolling screen, and a daylighting louver.

REFERENCE SIGNS LIST 10, 40 daylighting film
11, 41 base
12, 42 first protrusion portion
13, 43 gap portion
14, 44 second protrusion portion
15, 25 protection member
20, 50 die for forming daylighting film (die)
21, 51 main body portion
22, 52 first concave portion 23, 53 second concave portion
31, 32, 61, 62 resin
33, 63 base

The invention claimed is:

1. A daylighting film, the daylighting film comprising:
a base having light-transmissive performance;
a plurality of first protrusion portions that have light-transmissive performance and are provided to be adjacent to each other on one surface of the base;
a gap portion provided between the plurality of first protrusion portions; and
a second protrusion portion that is provided in the gap portion to be adjacent to the plurality of first protrusion portions on the one surface of the base and that is formed of the same material as that of the plurality of first protrusion portions, wherein
a height of the second protrusion portion from the one surface of the base is smaller than a height of each of the plurality of first protrusion portions from the one surface of the base,
a width of the second protrusion portion is smaller than a width of each of the plurality of first protrusion portions, and
a shape of a cross section parallel to a width direction of each of the plurality of first protrusion portions is a polygon with at least five vertexes,
wherein each of the plurality of first protrusion portions includes:
one pair of inclined surfaces that are inclined in mutually different directions with respect to the one surface of the base and face each other, the one pair of inclined surfaces being not in contact with the one surface of the base, and
another pair of inclined surfaces that are inclined in mutually different directions with respect to the one surface of the base and face each other,
wherein the second protrusion portion has one pair of inclined surfaces that are inclined in mutually different directions with respect to the one surface of the base and face each other, and
wherein one of the one pair of inclined surfaces of the plurality of first protrusion portions and one of the one pair of inclined surfaces of the second protrusion portion are equal in inclination with respect to the one surface of the base, or
other of the one pair of inclined surfaces of the plurality of first protrusion portions and other of the one pair of inclined surfaces of the second protrusion portion are equal in inclination with respect to the one surface of the base.

2. The daylighting film according to claim 1, wherein
each of the plurality of the first protrusion portions and the second protrusion portions are similar in a shape of at least a part corresponding to the one pair of inclined surfaces.

3. The daylighting film according to claim 1, wherein
a shape of a cross section parallel to a width direction of the second protrusion portion is a trapezoid, triangle, or polygon with at least five vertexes.

4. The daylighting film according to claim 3, wherein
the shape of the cross section parallel to the width direction of each of the plurality of first protrusion portions is a pentagon, and
the shape of the cross section parallel to the width direction of the second protrusion portion is a triangle.

5. The daylighting film according to claim 1, wherein
the one of the one pair of inclined surfaces of the plurality of first protrusion portions and the one of the one pair of inclined surfaces of the second protrusion portion are equal in inclination with respect to the one surface of the base, and
the other of the one pair of inclined surfaces of the plurality of first protrusion portions and the other of the one pair of inclined surfaces of the second protrusion portion are equal in inclination with respect to the one surface of the base.

* * * * *